(12) United States Patent
Loyall et al.

(10) Patent No.: US 7,478,047 B2
(45) Date of Patent: Jan. 13, 2009

(54) INTERACTIVE CHARACTER SYSTEM

(75) Inventors: A. Bryan Loyall, Cambridge, MA (US); Joseph Bates, Newton, MA (US); W. Scott Neal Reilly, Framingham, MA (US); Mark Russell Leone, Holliston, MA (US)

(73) Assignee: Zoesis, Inc., Newton, MA (US)

( * ) Notice: Subject to any disclaimer, the term of this patent is extended or adjusted under 35 U.S.C. 154(b) by 328 days.

(21) Appl. No.: 10/415,851

(22) PCT Filed: Oct. 29, 2001

(86) PCT No.: PCT/US01/50915

§ 371 (c)(1),
(2), (4) Date: Nov. 14, 2003

(87) PCT Pub. No.: WO02/37471

PCT Pub. Date: May 10, 2002

(65) Prior Publication Data

US 2004/0075677 A1    Apr. 22, 2004

Related U.S. Application Data

(60) Provisional application No. 60/245,823, filed on Nov. 3, 2000, provisional application No. 60/246,034, filed on Nov. 3, 2000, provisional application No. 60/246,054, filed on Nov. 3, 2000.

(51) Int. Cl.
*G10L 13/00* (2006.01)
*G10L 21/00* (2006.01)

(52) U.S. Cl. .................. 704/258; 704/265; 704/277

(58) Field of Classification Search ........... 704/258, 704/265, 269, 277, 278
See application file for complete search history.

(56) References Cited

U.S. PATENT DOCUMENTS

| | | | | |
|---|---|---|---|---|
| 5,111,409 | A | * 5/1992 | Gasper et al. | 434/185 |
| 5,367,454 | A | * 11/1994 | Kawamoto et al. | 715/706 |
| 5,749,073 | A | * 5/1998 | Slaney | 704/278 |
| 5,860,064 | A | 1/1999 | Henton | |
| 5,983,190 | A | 11/1999 | Trower, II et al. | |
| 6,031,549 | A | 2/2000 | Hayes-Roth | |
| 6,250,928 | B1 | * 6/2001 | Poggio et al. | 434/185 |
| 6,285,380 | B1 | 9/2001 | Perlin et al. | |
| 6,307,576 | B1 | * 10/2001 | Rosenfeld | 715/700 |

(Continued)

OTHER PUBLICATIONS

A. Bryan Loyall, Ph.D., *Believable Agents: Building Interactive Personalities*, May 1997, Technical Report CMU-CS-97-123, School of Computer Science, Carnegie Mellon University, Pittsburgh, PA.

(Continued)

*Primary Examiner*—Michael N Opsasnick
(74) *Attorney, Agent, or Firm*—Fish & Richardson P.C.

(57) ABSTRACT

A system and method for controlling a synthetic character using a control system displays the character engaged in an activity, receiving a first input from a user, determines whether the input is relevant to the activity, if the input is relevant to the activity, and shows the character react to the input, the character being highly expressive and highly reactive. A system and method for displaying a synthetic character provides speech data, creates modified speech data by modifying at least one of the pitch or duration of at least a portion of the speech data and generates modified speech sounds associated with the character using the modified speech data.

71 Claims, 37 Drawing Sheets

STRUCTURE OF AN INTERACTIVE CHARACTER SYSTEM

U.S. PATENT DOCUMENTS

| | | | |
|---|---|---|---|
| 6,539,354 B1* | 3/2003 | Sutton et al. | 704/260 |
| 6,570,555 B1* | 5/2003 | Prevost et al. | 345/156 |
| 6,766,299 B1* | 7/2004 | Bellomo et al. | 704/276 |
| 6,934,684 B2* | 8/2005 | Alpdemir et al. | 704/265 |
| 7,333,969 B2* | 2/2008 | Lee et al. | 706/52 |
| 7,379,871 B2* | 5/2008 | Shimakawa et al. | 704/260 |
| 7,412,390 B2* | 8/2008 | Kobayashi et al. | 704/267 |
| 2002/0198717 A1* | 12/2002 | Oudeyer et al. | 704/270 |

OTHER PUBLICATIONS

A. Bryan Loyall and Joseph Bates, *Personality-Rich Believable Agents That Use Language*, Feb. 1997, Proceedings of the First International Conference on Autonomous Agents, Marina del Rey, CA.

W. Scott Neal Reilly, Ph.D., *Believable Social and Emotional Agents*, May 1996, Technical Report CMU-CS-96-138, School of Computer Science, Carnegie Mellon University, Pittsburgh, PA.

A. Bryan Loyall and Joseph Bates, *Real-time Control of Animated Broad Agents*, Jun. 1993, Proceedings of the Fifteenth Annual Conference of the Cognitive Science Society, Boulder, CO.

Joseph Bates, A. Bryan Loyall, and W. Scott Reilly, *Broad Agents*, Mar. 1991, Proceedings of the AAAI Spring Symposium on Integrated Intelligent Architectures, Stanford University. These proceedings are available in *SIGART Bulletin*, vol. 2, No. 4, Aug. 1992.

Joseph Bates, A. Bryan Loyall, and W. Scott Reilly, *Integrating Reactivity, Goals, and Emotion in a Broad Agent*, May 1992, Technical Report CMU-CS-92-142, School of Computer Science, Carnegie Mellon University, Pittsburgh, PA. Also appeared in the *Proceedings of the Fourteenth Annual Conference of the Cognitive Science Society*, Bloomington, Indiana, Jul. 1992.

Joseph Bates, A. Bryan Loyall, and W. Scott Reilly, *An Architecture for Action, Emotion, and Social Behavior*, May 1992, Technical Report CMU-CS-92-144, School of Computer Science, Carnegie Mellon University, Pittsburgh, PA. Also appearing in *Artificial Social Systems: Fourth European Workshop on Modeling Autonomous Agents in a Multi-Agent World*, Springer-Verlag, Berlin, 1994.

K. Perlin, A. Goldberg, *Improv: A System for Scripting Interactive Actors in Virtual Worlds*, 1996, Computer Graphics; vol. 29 No. 3.

Lester, J. C. and Stone, B.A., *Increasing believability in animated pedagogical agents*, Feb. 5-8, 1997, In *Proceedings of the First international Conference on Autonomous Agents* (Marina del Rey, California, United States). Agents '97. ACM Press, New York, NY, 16-21.

P. Maes, T. Darrell, B. Blumberg, A. Pentland, *The ALIVE System: Wireless, Full-Body Interaction with Autonomous Agents*, 1996, In the ACM Special Issue on Multimedia and Multisensory Virtual Worlds.

Cassell, J.; Pelachaud, C.; Badler, N.; Steedman, M.; Achorn, B.; Becket, T.; Douville, B.; Prevost, S.; and Stone, M., *Animated conversation: Rule-based generation of facial expression, gesture and spoken intonation for multiple conversational agents*, 1994, In Proceedings of ACM SIGGRAPH '94.

Breazeal, C., *Sociable Machines: Expressive Social Exchange Between Humans and Robots*, 2000, Sc.D. dissertation, Department of Electrical Engineering and Computer Science, MIT.

Thórisson, K. R., *Layered Modular Action Control for Communicative Humanoids*, 1997, Computer Animation '97, Geneva, Switzerland, Jun. 5-6, 134-143.

Kristinn Rúnar Thórisson, *Communicative Humanoids, A Computational Model of Psychosocial Dialogue Skills*, Sep. 1996, Massachusetts Institute of Technology.

Gene Ball, Dan Ling, David Kurlander, John Miller, David Pugh, Tim Skelly, Andy Stankosky, David Thiel, Maarten Van Dantzich, Trace Wax, *Lifelike Computer Characters: The Persona Project at Microsoft Research, Software Agents*, 1997, edited by Jeffrey M. Bradshaw, AAAI Press/The MIT Press, pp. 191-222.

Extempo, Online Ambassadors as eCRM Agents, White Paper from Extempo Systems, Inc, eLearning Forum Meeting, May 2001.

Rousseau D, Hayes-Roth B. *Interacting with personality-rich characters*, Sep. 1997, Technical Report No. KSL 97-06, Knowledge Systems Laboratory, Department of Computer Science, Stanford University, Stanford, CA.

Stern, A.; Frank, A.; and Resner, B., Virtual Petz: A Hybrid Approach to Creating Autonomous, Lifelike Dogz and Catz, 1998, In Proceedings of the Second Intl. Conference on Autonomous Agents, pp. 334-335. Menlo Park: AAAI Press.

* cited by examiner

STRUCTURE OF AN INTERACTIVE CHARACTER SYSTEM

INTERACTIVE CHARACTER SYSTEM

The present application claims the benefit of U.S. provisional patent applications Nos. 60/245,823, 60/246,034 and 60/246,054, all filed on Nov. 3, 2000, which are each incorporated in their entirety herein by reference.

BACKGROUND

Interactive media systems, such as Internet web pages, interactive television, and the like, have become important modes of providing entertainment and information to consumers. It is therefore desirable to be able to present advertising and other types of messages through these media that present in an interactive and apparently seamless fashion. It is also desirable to be able to present synthetic interactive characters to users of these systems that appear to have a broad range of emotional states, and to be able to use such characters to present advertising and other types of information to a user.

Previous approaches to this have been poor in a number of ways.

Static and animated banner advertising does not deliver compelling interactive characters. This is one of the reasons why banner ads typically cannot give the customer an emotional pull.

Interstitial ads (a pop-up window with movie-like ad content) can deliver an emotional pull in the same way as a television ad, but the user is not interacting with the characters.

Prior art includes interactive games for the purpose of advertising that do not include interactive characters. An example of this is the games on www.candystand.com. Such systems typically contain background art or functional elements that are based on the product or other branded marks. However, they do not allow the consumer to interact with interactive characters, instead interacting with the mechanism of the game. For example, the consumer might play a simulated game of miniature golf on a course that has company logos on it.

Prior art includes interactive games or activities for the purpose of advertising that do use characters. An example of this is the Coca Cola Bears advertisement from togglethis.com. However, these characters have limited interactivity, and the characters are not products brought to life.

Web browsers enable a user to download content from a network and display it on a display system. Oftentimes, it is useful to download program code to execute on the user's display system. Prior art display systems include web browsers that allow users to download code for running on a virtual machine or interpreted in a controlled environment (e.g. Java code for running on a Java virtual machine), thus preventing downloaded code from gaining full access to system resources. Example browsers include Netscape Navigator and Internet Explorer.

Prior art delivery systems also allow native code, i.e., machine code (including relocatable code) for executing on a computer processor, to be launched by the user's web browser. These browsers currently use mechanisms such as plug-ins or Active X components to allow native code to run in the browser. However, these mechanisms require special permission to run the code to be granted prior to downloading the plug-in or component, resulting in a delay or confusing moment in the user's browsing experience.

In presenting interactive advertising to users, it is important that the display of such advertising occur as seamlessly, and without delay, as possible. One technique for avoided delays when a program module is downloaded to a user's computer is "code streaming." "Code streaming" means downloading code in sequence, running the earlier downloaded code and linking the later code with the running code. Rudimentary support for streaming program code is provided in languages such as Java: for example, when a Java applet first instantiates a class, the code for that class can be downloaded automatically from a specified server on the Internet. However, for security reasons such Java classes are not compiled to native code, but rather to bytecode that must be verified and either interpreted or compiled after downloading. This overhead renders bytecode impractical for many applications.

SUMMARY OF THE INVENTION

The invention provides an enhanced capability and techniques for presenting interactive characters to a user In general, in one aspect, the invention features a method for controlling a synthetic character using a control system that includes displaying the character engaged in an activity, receiving a first input from a user determining whether the input is relevant to the activity, if the input is relevant to the activity, showing the character react to the input, the character being highly expressive and highly reactive.

Implementations of the invention may include one or more of the following features. The character has a specified personality. A characteristic of a user avatar is changed in response to the user input, and determining whether the input is relevant to the activity includes determining whether the change in the characteristic of the user avatar is relevant to the activity. Displaying the character includes displaying an animated character on a display screen. Displaying the character includes controlling a robotic embodiment of the character. Showing the character react to the input includes having the character look out of the screen or at an avatar. Showing the character react to the input includes changing the emotional expression of the character to correspond to a first emotion. Changing the emotional expression includes changing the facial expression of the character. Changing the emotional expression includes changing the tone of the character's voice. Changing the emotional expression of the character includes changing the speed of motion of the character. Changing the emotional expression of the character includes changing the body posture of the character. Over a period of time, after the emotional expression of the character is changed, the appearance of the character is gradually altered to diminish the expression of the emotion by the character. A second input is received from the user after receiving the first input, it is determined whether the second input is relevant to the activity, and if the input is relevant to the activity, the emotional expression of the character is changed to correspond to a combination of the first emotional expression and a second emotional expression.

In general, in another aspect the invention features a method for displaying a synthetic character that includes providing speech data, creating modified speech data by modifying at least one of the pitch or duration of at least a portion of the speech data, and generating modified speech sounds associated with the character using the modified speech data.

Implementations of the invention may include one or more of the following features. Modifying at least a portion of the speech data includes modifying the speech data with respect to at least selected portions of the frequency spectrum. Displaying the synthetic character includes displaying an animated character on a display screen. Displaying the synthetic character includes providing a robotic embodiment of the character. Creating modified speech data includes modifying at least two of the pitch, duration or volume of at least a portion of the speech data. The speech data is modified in real time. The at least a portion of the speech data includes data representing at least one complete word of speech. The at least a portion of the speech data includes data representing at least two contiguous words of speech. An input is received from a user and the display of the character is modified based on the user input. A user avatar is displayed and a characteristic of the user avatar is changed in response to the input from the user, and modifying the display of the character based on the user input includes modifying the display of the character based on the change in the characteristic of the user avatar. The characters are fully autonomous. The speech data or the modification of the speech data is selected based on the user input. Motion data describing a motion of the character is provided, the motion date is modified in real time, and the character is displayed according to the modified motion data. Modifying the motion data includes generating motion data for coordinating the display of the character with the generation of the modified speech sounds. The displaying of the character is tightly coupled with the generated speech sounds. Creating the modified speech data includes providing first sample speech data, providing second sample speech data, comparing the first sample speech data and the second sample speech data, and using the results of the comparison to create the modified speech data. A function of one or more parameters of the speech data is generated, and creating the modified speech data includes applying the function to at least a portion of the speech data. Generating the modification function includes providing a first base function of the one or more parameters, selecting, from a continuous range of values, a weighting factor, and generating the modification function using the base function and the weighting factor. Applying the modification function to at least a portion of the speech data includes providing a first base function of the one or more parameters, selecting, from a continuous range of values, a weighting factor, and using the first base function and the weighting factor to modify the speech data. The base function represents a modification of the characteristics of the speech data with respect to at least one of the characteristics in the group inflection, emphasis, emotional quality, stylistic quality, and accent, and the modification function represents a different degree of modification of the at least one characteristic than the base function. The base function represents a modification of the characteristics of the speech data with respect to at least one of the characteristics in the group inflection, emphasis, emotional quality, stylistic quality, and accent, and using the first base function and the weighting factor to modify the speech data results in a different degree of modification of the at least one characteristic than the base function. The at least one characteristic is sadness or happiness. Distortion limits for limiting the modification of the speech data are provided, modification parameters for modifying the speech data are computed, the modification parameters to the distortion limits are compared, and the modification parameters are modified if they exceed any of the distortion limits. The modified speech data is always within pre-determined distortion limits. A representation of an emotional state is associated with the character and the speech of the character is based on the emotional state representation. The character is highly expressive. The character is highly reactive. The character has a specified personality. The character is highly expressive, highly reactive and has a specified personality. The character is highly reactive and has at least one of the following group of characteristics: highly expressive, appearing to be intelligent, exhibiting common sense, exhibiting social knowledge, exhibiting knowledge of social norms, having a specified personality.

In general, in another aspect, the invention features a method for modifying speech data that includes providing first sample speech data, providing second sample speech data, comparing the first sample speech data and the second sample speech data, and using the results of the comparison to create modified speech data.

Implementations of the invention may have one or more of the following features The comparing step includes generating a function of one or more parameters of the speech data, and creating the modified speech data includes modifying at least a portion of the speech data based on the function. Modifying at least a portion of the speech data based on the function includes applying the function to the speech data. The first sample speech data and the second sample speech data are representations of the same utterance. Creating the modified speech data includes modifying any one of the following: pitch of the speech data or duration of the speech data. Creating the modified speech data includes modifying any two of the group pitch, duration and volume of the speech data. The first sample speech data and the second sample speech data differ in at least one of the following qualities: inflection, emphasis, emotional quality, stylistic quality, and accent. The modified speech data differs from the speech data in at least one of the following qualities: inflection, emphasis, emotional quality, stylistic quality, or accent. A second function of one or more parameters of the speech data is generated and creating the modified speech data further includes modifying the speech data based on the first function and the second function. The first function and the second function each modify at least one of the group of inflection, emphasis, emotional quality, stylistic quality, or accent of the speech data. Modifying the speech data based on the first function and the second function includes generating a third function based on the first function and the second function and applying the third function to the speech data. Generating the modification function further includes providing a second base function of the one or more parameters, selecting, from a continuous range of values, a second weighting factor, and generating the modification function using the second base function and the second weighting factor. Applying the modification function to at least a portion of the speech data includes providing a second base function of the one or more parameters, selecting, from a continuous range of values, a second weighting factor, and using the second base function and the second weighting factor to modify the speech data. The base function and the second base function each represent a modification of the characteristics of the speech data with respect to at least one of the characteristics in the group inflection, emphasis, emotional quality, stylistic quality, and accent, and the modification function represents a different degree of modification of the at least one characteristic than the base function or the second base function. The base function and the second base function each represent a modification of the characteristics of the speech data with respect to at least one of the characteristics in the group inflection, emphasis, emotional quality, stylistic quality, and accent, and using the second base function and the second weighting factor to modify the speech data results in a different degree of modification of the at least one characteristic than the second base function.

In general, in another aspect, the invention features a method of advertising a product that includes designing a fully autonomous synthetic character that represents an animated version of the product or product packaging, the product or product packaging not otherwise having the appearance of a character, displaying the synthetic character to a user, and permitting the user to interact with the character.

Implementations of the invention may include one or more of the following features. Displaying the synthetic character includes displaying an animated character on a display screen. Displaying the synthetic character includes providing a robotic embodiment of the character. The character inhabits an environment and the user interacts with the character in the environment. The character has eyes, and the eyes appear to track objects in the on-screen world or the real world. The character's eyes appear to track objects only at selected moments. The selected moments are determined by the fully autonomous character. Motions for the character are generated in real-time. The character is highly expressive. The character is highly reactive. The character has a specified personality. The character is highly expressive, highly reactive and has a specified personality. The character is highly reactive and has at least one of the following group of characteristics: highly expressive, appearing to be intelligent, exhibiting common sense, exhibiting social knowledge, exhibiting knowledge of social norms, having a specified personality.

In general, in another aspect, the invention features a method for loading an executable native code program into a computer system that includes loading a first portion of the program into the computer system from a non-local network, beginning execution of the first portion of the program, during execution of the first portion of the program, loading a second portion of the program into the computer system from the non-local network and linking the second portion of the program to the first portion of the program, and executing code in the second portion of the program.

Implementations of the invention may include one or more of the following features. Hyperlinked information is displayed in a display on the computer system, and the first portion of the program is loaded in response user selection of a hyperlink in the display. A component list is loaded into the computer system in response to a user input, the first portion of the program is loaded according to information in the component list, and the second portion of the program is loaded according to information in the component list. Linking the second portion of the program to the first portion of the program includes determining that the second portion of the program has been completely loaded into the computer system, and notifying the first portion of the program that the second portion has been loaded. During execution of the second portion of the program a third portion of the program is loaded into the computer system, the third portion of the program is linked to the first or second portion of the program, and code in the third portion of the program is executed. In response to a user input, content other than native code is loaded into the system and that content is displayed to the user and the first portion of the program is loaded during display of that content to the user. The program includes an interactive system for displaying an on-screen environment and, during execution of the first portion of the program, a first version of the on-screen environment is displayed and, in response to the progress of loading of the second portion of the program, the on-screen environment is modified. The on-screen environment is modified after completion of the loading of the second portion of the program. Modifying the on-screen environment includes changing the set of potential user acts in the environment. Modifying the on-screen environment includes changing the appearance of a particular location in the on-screen environment to show the additional set of potential user acts. Modifying the on-screen environment includes changing the potential behaviors of one or more characters in the environment. At least a portion of the changed potential behavior of the one or more characters is implemented by the second portion of the program. The non-local network includes a wide area network. The non-local network includes a broadcast network. The non-local network includes a wireless network. The non-local network includes a dialup network. The non-local network includes a cable TV network.

In general, in another aspect, the invention features a method for loading data into a computer system that includes starting to receive a stream of data from a network connection, during receipt of the data stream, monitoring the use of network resources by the computer system, and adjusting the rate of receipt of the data stream based on the use of network resources.

Implementations of the invention may include one or more of the following features. The network is a non-local network Monitoring the use of network resources includes detecting a request to load additional data onto the computer system from the network. Adjusting the rate of receipt of the data stream includes temporarily suspending the receipt of the data stream while the requested additional data is loaded onto the computer system, and continuing to receive the data stream after at least a pre-defined portion of the requested additional data has been loaded onto the computer system. Adjusting the rate of receipt of the data stream includes reducing the rate of receipt of the data stream while the additional data is being loaded onto the system. Detecting a request to load additional data onto the computer system includes detecting a request to load content into a web browser. The at least a pre-defined portion of the requested additional data is displayed on the computer system to a user while the data stream continues to be received after the requested additional data has been loaded onto the computer system. The data stream includes native code for execution on the computer system. Monitoring the use of network resources by the computer system includes monitoring the throughput of a download process.

In general, in another aspect, the invention features a method for loading data onto a computer system that includes, in response to a user input, loading first content for display to the user, in response to the same user input, and after at least a predefined portion of the first content has been loaded, starting to receive a first stream of data that includes native code from a network connection, the first stream of data not being part of the first content.

Implementations of the invention may include one or more of the following features. Display of the first content provides the user with selectable options. The first content is a hyperlinked page. During display of the first content and the receipt of the first stream of data, in response to a second user input, the rate of receipt of the first stream of data is temporarily reduced, and, during the temporary reduction of the rate of receipt of the first stream of data, second content for display to the user is loaded. After loading at least a predefined portion of the second content, the rate of receipt of the first stream of data is increased. In response to the second user input, a second stream of data from a network connection is loaded. Temporarily reducing the rate of receipt of the first stream of data includes suspending receipt of the first stream of data.

In general, in another aspect, the invention features a method for presenting a dynamic visual model using a data processing system that includes generating in the data processing system a first representation of at least one structural element of the model, displaying the at least one structural element of the model on a display, and modifying the appearance of the displayed at least one structural element by modifying a curvature of the element over a continuous portion of the element.

Implementations of the invention may include one or more of the following features. The dynamic visual model is an animated character. The continuous portion of the element includes substantially all of the element. The modification of the appearance includes modifying the representation of the structural element in real time. The representation of the at least one structural element includes a representation of a spline curve. The representation of the at least one structural element includes or is linked to a representation of a surface defining a volume surrounding the spline curve, and displaying the at least one structural element of the model on a display includes displaying the surface on the display. Modifying the appearance of the displayed at least one structural element includes modifying the shape of the surface of the element. A representation of at least a second structural element of the model distinct from the first structural element is generated in the data processing system, and a representation of a linkage between the first structural element and the second structural element is generated. The second structural element is displayed on the display, and the appearance of the displayed second structural element is modified by modifying a curvature of the element over a continuous portion of the element. The second structural element is a rigid structural element. The representations of the at least one structural element and the second structural element include respective representations of spline curves, the representations of the at least one structural element and the second structural element are linked to a representation of a surface defining a volume surrounding the respective represented spline curves, and displaying the at least one structural element and the second structural element of the model on the display includes displaying the surface on the display. Modifying the appearance of the at least one structural element includes modifying the length of the structural element. The representation of the structural element includes a representation of a spline curve, and modifying the length of the structural element includes changing the length of the spline curve. The representation of the at least one structural element includes or is linked to a representation of a surface defining a volume, and modifying the appearance of the at least one structural element further includes modifying the representation of the surface to maintain a substantially constant defined volume when the length of the structural element is modified. A second representation of the at least one structural element of the model having a different shape from the first representation is generated and, on the display, the first representation is morphed using the second representation. A third representation of the at least one structural element of the model having a different shape from the first and second representations is generated, and both the second and third representations of the structural element are used to morph the first representation on the display. Differences between the first representation and both the second representation and the third representation are determined, and a weighted sum of the differences is used to morph the first representation. The at least one structural element has an outer surface and a central axis, and the appearance of the at least one structural element is modified by rotating portions of the outer surface of the element relative to the central axis, the degree of rotation varying at locations adjacent to different points along the axis. The central axis of the element is defined by a spline curve.

In general, in another aspect, the invention features a system for controlling a synthetic character using a control system that includes means for displaying the character as a highly expressive, highly reactive, character engaged in an activity, means for receiving a first input from a user, means for determining whether the input is relevant to the activity, and means for, if the input is relevant to the activity, showing the character react to the input.

In general, in another aspect, the invention features a computer software product, embedded on a computer readable medium, for controlling a synthetic character using a control system that includes instructions for causing a computer system to display the character as a highly expressive, highly reactive, character engaged in an activity, instructions for causing the computer to receive a first input from a user, instructions for causing the computer to determine whether the input is relevant to the activity, and instructions for causing the computer to, if the input is relevant to the activity, show the character react to the input.

In general, in another aspect, the invention features a method of transmitting to a system a computer software product for controlling a synthetic character using a control system that includes transmitting to the system instructions for causing a computer system to display the character as a highly expressive, highly reactive, character engaged in an activity, transmitting to the system instructions for causing the computer to receive a first input from a user, transmitting to the system instructions for causing the computer to determine whether the input is relevant to the activity, and transmitting to the system instructions for causing the computer to, if the input is relevant to the activity, show the character react to the input.

In general, in another aspect, the invention features a system for displaying a synthetic character that includes means for providing speech data, means for creating modified speech data by modifying at least one of the pitch or duration of at least a portion of the speech data, and means for generating modified speech sounds associated with the character using the modified speech data.

In general, in another aspect, the invention features a computer software product, embedded on a computer readable medium, for displaying a synthetic character that includes instructions for causing a computer to provide speech data, instructions for causing a computer to create modified speech data by modifying at least one of the pitch or duration of at least a portion of the speech data, and instructions for causing a computer to generate modified speech sounds associated with the character using the modified speech data.

In general, in another aspect, the invention features a method of transmitting to a system a computer software product for displaying a synthetic character that includes transmitting to the system instructions for causing a computer to provide speech data, transmitting to the system instructions for causing a computer to create modified speech data by modifying at least one of the pitch or duration of at least a portion of the speech data, and transmitting to the system instructions for causing a computer to generate modified speech sounds associated with the character using the modified speech data.

In general, in another aspect, the invention features a system for modifying speech data that includes means for providing first sample speech data, means for providing second sample speech data, means for comparing the first sample speech data and the second sample speech data, and means for using the results of the comparison to create modified speech data.

In general, in another aspect, the invention features a computer program product, embedded on a computer readable medium, for modifying speech data that includes instructions for causing a computer to provide first sample speech data, instructions for causing a computer to provide second sample speech data, instructions for causing a computer to compare the first sample speech data and the second sample speech data, and instructions for causing a computer to use the results of the comparison to create modified speech data.

In general, in another aspect, the invention features a method for transmitting to a system a computer program product, embedded on a computer readable medium, for modifying speech data that includes transmitting to the system instructions for causing a computer to provide first sample speech data, transmitting to the system instructions for causing a computer to provide second sample speech data, transmitting to the system instructions for causing a computer to compare the first sample speech data and the second sample speech data, and transmitting to the system instructions for causing a computer to use the results of the comparison to create modified speech data.

In general, in another aspect, the invention features a system for advertising a product that includes means for enabling a user to design a fully autonomous synthetic character that represents an animated version of the product or product packaging, the product or product packaging not otherwise having the appearance of a character, means for displaying the synthetic character to a user, and means for permitting the user to interact with the character.

In general, in another aspect, the invention features a computer program product, embedded on a computer readable medium, for advertising a product that includes instructions for causing a computer to enable a user to design a fully autonomous synthetic character that represents an animated version of the product or product packaging, the product or product packaging not otherwise having the appearance of a character, instructions for causing a computer to display the synthetic character to a user, and instructions for causing a computer to permit the user to interact with the character.

In general, in another aspect, the invention features a method for transmitting to a system a computer program product for advertising a product that includes transmitting to the system instructions for causing a computer to enable a user to design a fully autonomous synthetic character that represents an animated version of the product or product packaging, the product or product packaging not otherwise having the appearance of a character, transmitting to the system instructions for causing a computer to display the synthetic character to a user, and transmitting to the system instructions for causing a computer to permit the user to interact with the character.

In general, in another aspect, the invention features a system for loading an executable native code program into a computer system that includes means for loading a first portion of the program into the computer system from a non-local network, means for beginning execution of the first portion of the program, means for, during execution of the first portion of the program, loading a second portion of the program into the computer system from the non-local network and linking the second portion of the program to the first portion of the program, and means for executing code in the second portion of the program.

In general, in another aspect, the invention features a computer program product, embedded on a computer readable medium, for loading an executable native code program into a computer system that includes instructions for causing a computer to load a first portion of the program into the computer system from a non-local network, instructions for causing a computer to begin execution of the first portion of the program, instructions for causing a computer to, during execution of the first portion of the program, load a second portion of the program into the computer system from the non-local network and link the second portion of the program to the first portion of the program, and instructions for causing a computer to execute code in the second portion of the program.

In general, in another aspect, the invention features a method for transmitting to a system a computer program product, for loading an executable native code program into a computer system that includes transmitting to the system instructions for causing a computer to load a first portion of the program into the computer system from a non-local network, transmitting to the system instructions for causing a computer to begin execution of the first portion of the program, transmitting to the system instructions for causing a computer to, during execution of the first portion of the program, load a second portion of the program into the computer system from the non-local network and link the second portion of the program to the first portion of the program, and transmitting to the system instructions for causing a computer to execute code in the second portion of the program.

In general, in another aspect, the invention features a system for loading data into a computer system that includes means for starting to receive a stream of data from a network connection, means for, during receipt of the data stream, monitoring the use of network resources by the computer system, and means for adjusting the rate of receipt of the data stream based on the use of network resources.

In general, in another aspect, the invention features a computer program product, embedded on a computer readable medium, for loading data into a computer system that includes instructions for causing a computer to start to receive a stream of data from a network connection, instructions for causing a computer to, during receipt of the data stream, monitor the use of network resources by the computer system, and instructions for causing a computer to adjust the rate of receipt of the data stream based on the use of network resources.

In general, in another aspect, the invention features a method for transmitting to a system a computer program product for loading data into a computer system that includes transmitting to the system instructions for causing a computer to start to receive a stream of data from a network connection, transmitting to the system instructions for causing a computer to, during receipt of the data stream, monitor the use of network resources by the computer system, and transmitting to the system instructions for causing a computer to adjust the rate of receipt of the data stream based on the use of network resources.

In general, in another aspect, the invention features a system for loading data onto a computer system that includes means for, in response to a user input, loading first content for display to the user, means for, in response to the same user input, and after at least a predefined portion of the first content has been loaded, starting to receive a first stream of data that includes native code from a network connection, the first stream of data not being part of the first content.

In general, in another aspect, the invention features a computer program product, embedded on a computer readable medium, for loading data onto a computer system that includes instructions for causing a computer to, in response to a user input, load first content for display to the user, instructions for causing a computer to, in response to the same user input, and after at least a predefined portion of the first content has been loaded, start to receive a first stream of data that includes native code from a network connection, the first stream of data not being part of the first content.

In general, in another aspect, the invention features a method for transmitting to a system a computer program product for loading data onto a computer system that includes transmitting to the system instructions for causing a computer to, in response to a user input, load first content for display to the user, transmitting to the system instructions for causing a computer to, in response to the same user input, and after at least a predefined portion of the first content has been loaded, start to receive a first stream of data that includes native code from a network connection, the first stream of data not being part of the first content.

In general, in another aspect, the invention features a system for presenting a dynamic visual model using a data processing system that includes means for generating in the data processing system a first representation of at least one structural element of the model, means for displaying the at least one structural element of the model on a display, means for modifying the appearance of the displayed at least one structural element by modifying a curvature of the element over a continuous portion of the element.

In general, in another aspect, the invention features a computer software product, embedded on a computer readable medium, for presenting a dynamic visual model using a data processing system that includes instructions for causing a computer to generate in the data processing system a first representation of at least one structural element of the model, instructions for causing a computer to display the at least one structural element of the model on a display, instructions for causing a computer to modify the appearance of the displayed at least one structural element by modifying a curvature of the element over a continuous portion of the element.

In general, in another aspect, the invention features a method for transmitting to a system a computer software product for presenting a dynamic visual model using a data processing system that includes transmitting to the system instructions for causing a computer to generate in the data processing system a first representation of at least one structural element of the model, transmitting to the system instructions for causing a computer to display the at least one structural element of the model on a display, transmitting to the system instructions for causing a computer to modify the appearance of the displayed at least one structural element by modifying a curvature of the element over a continuous portion of the element.

In general, in another aspect, the invention features a method for controlling a synthetic character using a control system that includes displaying the character engaged in an activity, receiving a first input from a user, determining whether the input is relevant to the activity, if the input is relevant to the activity, and showing the character react to the input, the character being highly reactive and having at least one of the following group of characteristics: appearing to be intelligent, exhibiting common sense, exhibiting social knowledge, exhibiting knowledge of social norms, having a specified personality.

In general, in another aspect, the invention features a system for controlling a synthetic character using a control system that includes means for displaying the character engaged in an activity, means for receiving a first input from a user, means for determining whether the input is relevant to the activity, and means for, if the input is relevant to the activity, showing the character react to the input, the character being highly reactive and having at least one of the following group of characteristics: appearing to be intelligent, exhibiting common sense, exhibiting social knowledge, exhibiting knowledge of social norms, having a specified personality.

In general, in another aspect, the invention features a computer software product, embedded on a computer readable medium, for controlling a synthetic character using a control system that includes instructions for causing a computer to display the character engaged in an activity, instructions for causing a computer to receive a first input from a user, instructions for causing a computer to determine whether the input is relevant to the activity, and instructions for causing a computer to, if the input is relevant to the activity, show the character react to the input, the character being highly reactive and having at least one of the following group of characteristics: appearing to be intelligent, exhibiting common sense, exhibiting social knowledge, exhibiting knowledge of social norms, having a specified personality.

In general, in another aspect, the invention features a method for transmitting to a system a computer software product, embedded on a computer readable medium, for controlling a synthetic character using a control system that includes transmitting to the system instructions for causing a computer to display the character engaged in an activity, transmitting to the system instructions for causing a computer to receive a first input from a user, transmitting to the system instructions for causing a computer to determine whether the input is relevant to the activity, and transmitting to the system instructions for causing a computer to, if the input is relevant to the activity, show the character react to the input, the character being highly reactive and having at least one of the following group of characteristics: appearing to be intelligent, exhibiting common sense, exhibiting social knowledge, exhibiting knowledge of social norms, having a specified personality.

In general, in another aspect, the invention features a method for controlling a synthetic character using a control system that includes displaying the character engaged in an activity and receiving an input from a user.

In general, in another aspect, the invention features a system for controlling a synthetic character using a control system that includes means for displaying the character engaged in an activity and means for receiving an input from a user.

In general, in another aspect, the invention features a computer software product, embedded on a computer readable medium, for controlling a synthetic character using a control system that includes instructions for causing a computer to display the character engaged in an activity and instructions for causing a computer to receive an input from a user.

In general, in another aspect, the invention features a method of transmitting to a system a computer software product for controlling a synthetic character using a control system that includes transmitting to the system instructions for causing a computer to display the character engaged in an activity and transmitting to the system instructions for causing a computer to receive an input from a user.

In general, in another aspect, the invention features a method for displaying a character on a display that includes receiving a specification of an action to be performed by the character, and generating movement for the character appropriate for the specification.

Other advantages and features will become apparent from the following description and from the claims.

DESCRIPTION

Figure 1:
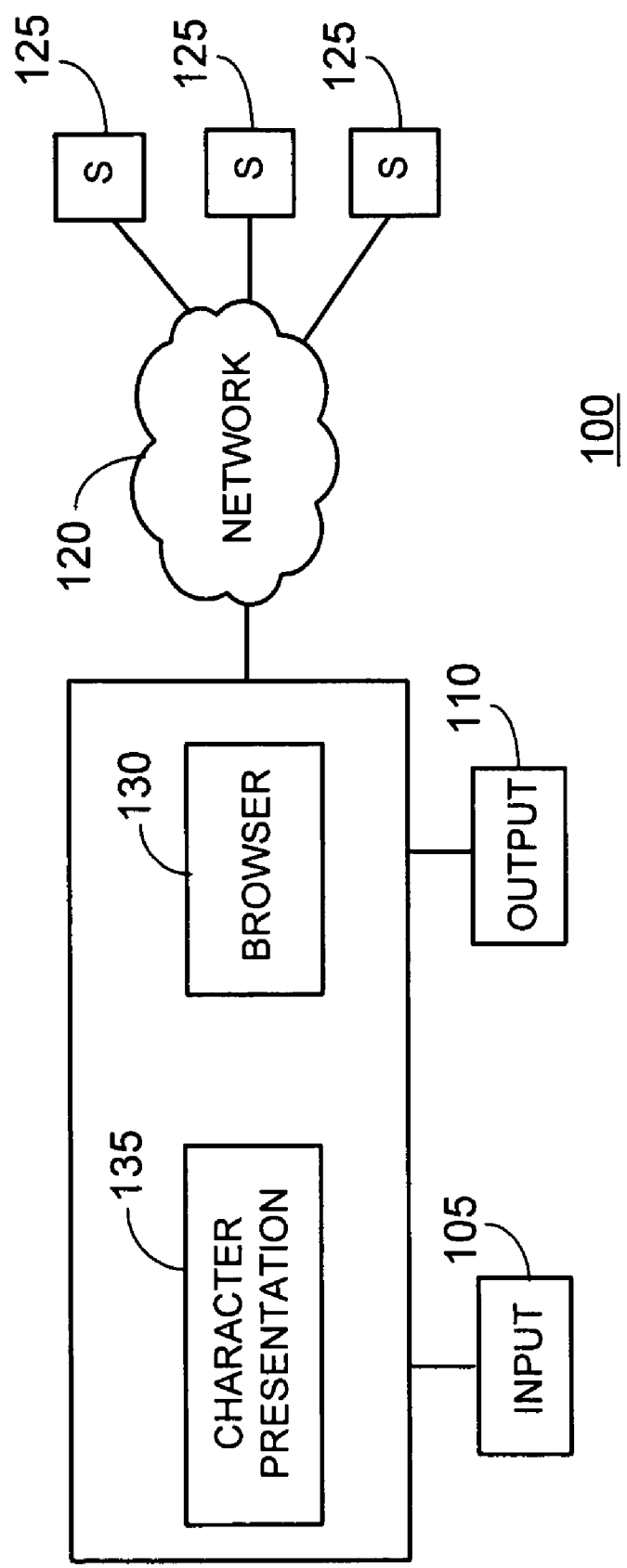
FIG. 1 shows elements of an exemplary interactive character system.

Referring now to FIG. 1, an exemplary interactive media system 100 includes user input 105, an output display 110, and a processing engine 115. User input 105 may be any known or yet to be developed device for receiving user inputs in an information processing system, such as a computer keyboard, a mouse, a joystick, a telephone pad, a touch screen, a remote control handset, microphone, video camera, or the like. Output display 110 may be any known or yet to be developed device for displaying audio or visual information generated by an information processing system, including a computer monitor, a television monitor, a personal digital assistant screen, a handheld interactive game screen, loudspeakers, headphones, a telephone display, and the like.

Processing engine 115 may include any known or yet to be developed information processing system, including a stand alone personal computer, a dedicated handheld game system, a network of computers, a programmable telephone, a set top box, a game console, a digital TV system, or a personal digital assistant. Processing engine 115 may be connected via a local area network or a non-local network (e.g. a proprietary widearea network, a cable network, or the Internet) 120 to one or more servers 125. Processing engine 115 may receive data (e.g., program instruction data or graphical data) from server 125 that includes information to be presented to a user. Processing engine 115 may also include an interactive character presentation module 135, which will be described in more detail below. Alternatively, or in addition, processing engine 115 may also include a browser system 130 (e.g. Netscape Navigator or Microsoft Internet Explorer, or other extensible clients such as the proposed "Presentation Engine" and "Execution Engine" of the OpenCable platform for interactive television). Browser system 130 may permit a user to access information contained on servers 125, and to cause such information (or information generated by downloaded program data) to be displayed on output 110. For example browser system 130 may permit a user to install interactive character presentation module 135 in processing engine 115 in response to a user command.

Figure 2:
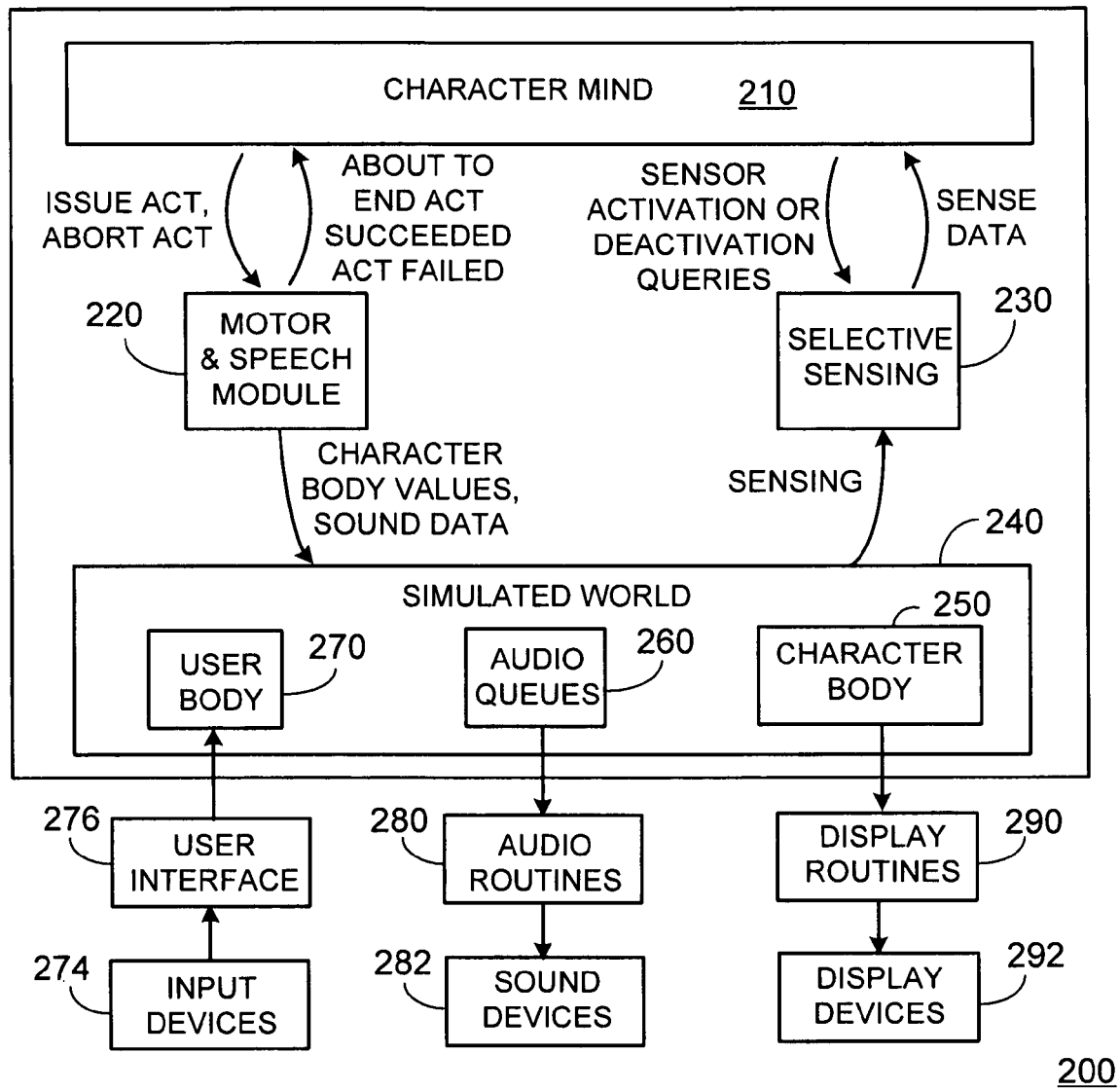
FIG. 2 shows the certain structures in an exemplary interactive character system.

Referring now to FIG. 2, there is shown an exemplary interactive character presentation system 200 that permits the presentation of fully autonomous interactive characters that are highly expressive, highly reactive, appear to be intelligent, appear to have common sense, appear to have social knowledge, appear to have knowledge of social norms, and have a specified personality. Presentation system 200 includes a character mind 210, a motor and speech module (MSM) 220, a selective sensing module 230 and a simulated world 240. The character mind 210 represents the mind of a particular interactive character that will be presented to the user of media system 100. Although only a single character mind is shown in this embodiment, any number of such characters may optionally be included. It includes data structures and functionality representing the behaviors, goals and acts of the character and produces outputs that determine how the character will interact with the user and with other characters in a simulated environment.

MSM 220 includes routines for generating audiovisual sequences corresponding to particular acts or series of acts generated by the character mind. In particular, the character mind provides the motor and speech module with a series of physical acts (i.e., motions or speech acts) and the motor and speech module determines sequences of particular images or sounds that must be generated to make such acts appear to the user.

MSM 220 acts by modifying constructs in the simulated world 240, which is a model of a three dimensional world including a representation of the character's body 250. The simulated world also includes audio queues 260, which represent sounds that emanate from characters in the simulated world, and may also include a user body 270, a character body controlled by inputs from the user.

MSM 220 is aware of the state of the simulated world, and uses that information to determine if and how the world may be changed to implement a particular act requested by the character mind. The MSM provides feedback to the character mind by informing it that an act has failed (e.g., because it was physically impossible given the state of the world), or succeeded. It also informs the character mind when the act is about to end. The interaction between the character mind and the MSM will be described in more detail below.

Selective sensing module 230 monitors the state of simulated world and provides selected information about the simulated world (referred to here as "sense data") back to the character mind 210. The character mind determines what information about the simulated world is monitored by activating or deactivating particular sensors within the selective sensing module.

The user generally does not interact directly with the character mind, but instead acts by controlling an avatar, the user body 270, using input devices 274 (part of user input 105) connected to user interface 276. As the avatar moves through the simulated world 240, its behavior may be sensed by the character mind 210 (through selective sensing module 230), and the behavior of the character may change accordingly. For example, the character may move toward or away from the avatar, change its expression when the avatar approaches, or attempt to speak to or about the avatar. Thus, the character will appear to the user to be believably responding to the user's avatar in the simulated world. In an alternate robotic or virtual reality embodiment, for example, the user may be interacting more directly with the character.

In a preferred embodiment, input to the interactive character system is through a computer mouse. However it will be appreciated that features of the character system described herein may be applied to any computer system for controlling interactive characters. For example, input devices 274 could include a keyboard, sonar receiver, camera, microphone or any other device that permits a computer to receive inputs from the user.

As noted above, audio queues 260 contain sounds that emanate from the environment. They are processed into sound waveforms by audio routines 280 and output through sound devices 282 (art of output display 110).

Also provided are display routines 290. Display routines receive the state of the simulated world and generate visual images representing that state. These images are then output to display devices 292 (part of output display 10).

In a preferred embodiment, display devices 292 includes a normal computer screen and sound devices 282 includes normal loudspeakers for sound. However, in alternative embodiments, display devices 292 and sound devices 282 could include an interactive robot, a virtual reality system, or any other device that permits a user to perceive the appearance of an interactive character.

Figure 3:
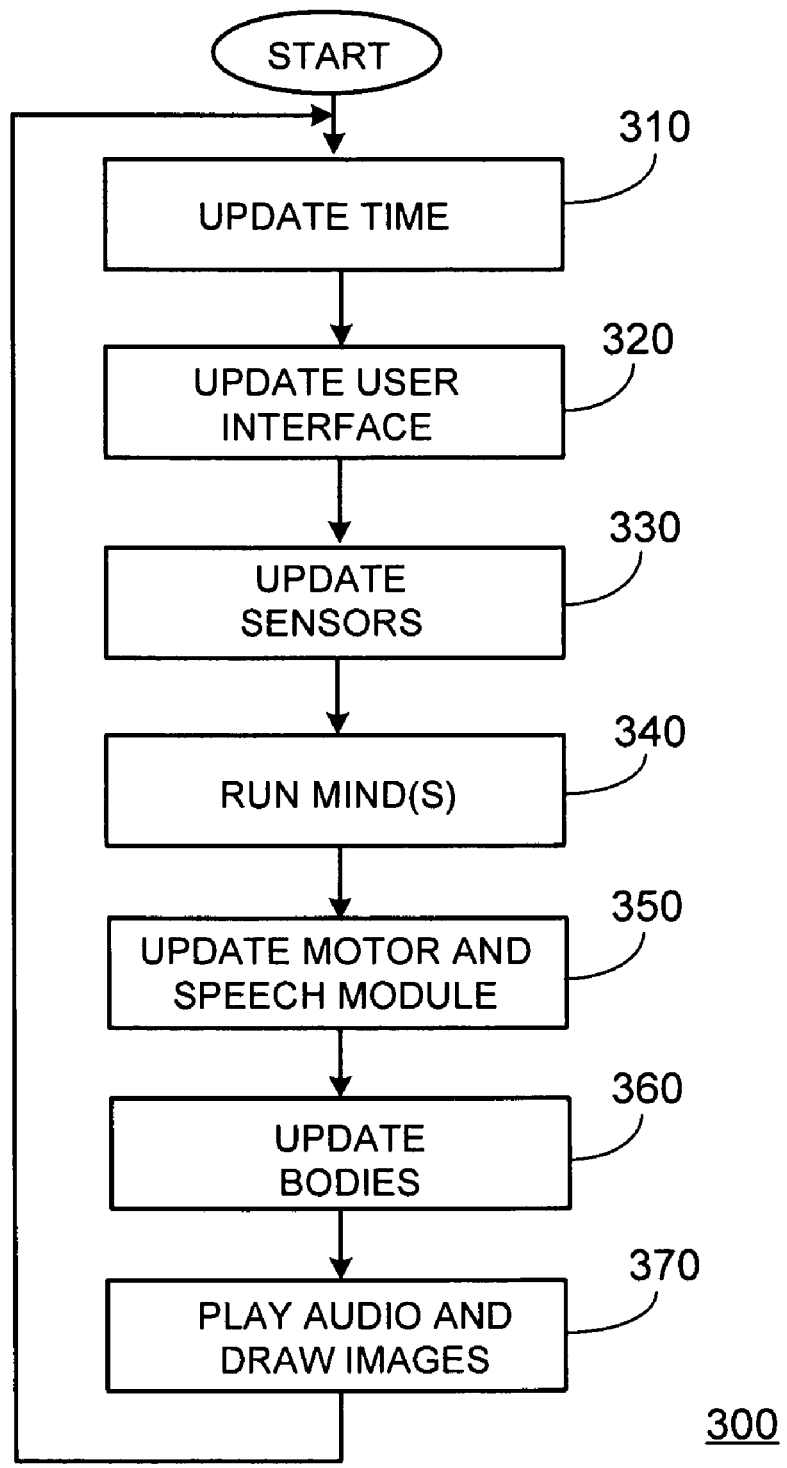
FIG. 3 shows a flowchart.

Referring now to FIG. 3, the basic operation of the presentation system 200 is described. The presentation system 200 operates in an infinite loop 300 as shown. Each pass through the infinite loop results in the generation of one animated frame for output to the user.

The first step (310) is to update a simulated time counter for the presentation system. The entails incrementing a time variable representing the passage of time in the interactive character's world. The system clock is used to measure the real time that has elapsed since the last time through the loop. In general, this change in time is added to the simulated time (sometimes called "simtime") to get the new simtime for this frame. Simtime is fixed throughout the frame. In the description of the interactive character, we refer to time or simtime interchangeably. Real world time is indicated explicitly when necessary.

In certain cases, simtime is updated in other ways. For example, if the real time elapsed is exceptionally long (perhaps from an external performance problem), then the simtime can be increased by a maximum frame duration. This allows the presentation to appear interrupted. Without such a technique, the character would appear to move discontinuously. Additionally, the system can run at fixed frame rates and in slow motion playback. These modes require simtime to be padded or calculated differently.

Next, the user interface is updated (step 320). In a preferred embodiment, the user interface is a mouse, which is used to control the user's avatar character. During the user interface update step, any movement of the mouse or mouse click is noted, and the position of the user's character in the simulated world is modified accordingly.

Next, the sensors are updated (step 330). This step executes all of the sensors that are currently on, and sends appropriate information from the sensors to the character mind. It does this by looping through the list of sensor instances and executing each in turn. In an embodiment with multiple characters, sensors for all of the characters would be run at this time.

Next, the character mind is run (step 340). Again, if there are multiple character minds, each of them is run sequentially. When a character mind is run, it is allotted a specific time budget specified in real world time, and generally the mind runs until the allotted time is expired or there are no available acts or goals to execute. The operation of the character mind will be described in more detail below. During operation of the character mind, the mind may determine that certain acts should be performed by the character body, or that certain acts potentially already in progress should be aborted. These decisions are communicated to the MSM during the character mind run time.

Next, the MSM is updated (step 350). As noted above, the MSM is responsible for carrying out the acts generated by the character mind. Acts may take one or more frames to complete, and may also be associated with pending acts that must complete before they can begin executing. Thus, during the MSM update step, the MSM determines what acts received from the character mind can begin executing, and begins to execute them. In addition, for any pending acts that commenced executing in a prior frame, the MSM causes those acts to continue executing for the time period of the current time frame.

The MSM performs an act by generating a sequence of instructions over time to animate a character's body and generate speech for the character. Thus, for each frame during which an act is being performed, the MSM generates those changes in the character's appearance or speech required to perform the portion of the act being completed during that frame.

When an act is about to end, has successfully completed or has failed, this information is communicated back to the character mind by the MSM. Such communication may re-activate the character mind during the "update MSM" step and cause it to take additional actions. In particular, it may cause the character mind to tell the MSM to abort other pending acts.

Next, the character's body is updated (step 360). Again, to the extent there are multiple interactive characters, this step would be performed for each of them. The character body receives instructions from the MSM indicating the changes in appearance for the current frame and modifies the representation of the character in the simulated world accordingly.

Finally, play audio and draw routines are called (step 370). The draw routines redraw the character's body according to its current representation in the simulated world. The play audio routines play any sounds generated by the MSM.

After the play and audio draw routines are completed, the loop repeats. This occurs many times a second, causing a continuous interactive experience with one or more personality-rich interactive characters.

I. Character Mind

We now describe in more detail the structure and operation of an exemplary character mind 210. However the present invention is not limited to the particular exemplary character mind described. Accordingly, other character minds may be within the scope of the invention. For example, the character mind described in A. Bryan Loyall, Believable *Agents: Building Interactive Personalities*, Ph.D. Thesis, Technical Report CMU-CS-97-123, School of Computer Science, Carnegie Mellon University, Pittsburgh, Pa., May 1997 may be utilized in particular embodiments of the present invention.

A. Character Mind Overview

Figure 4:
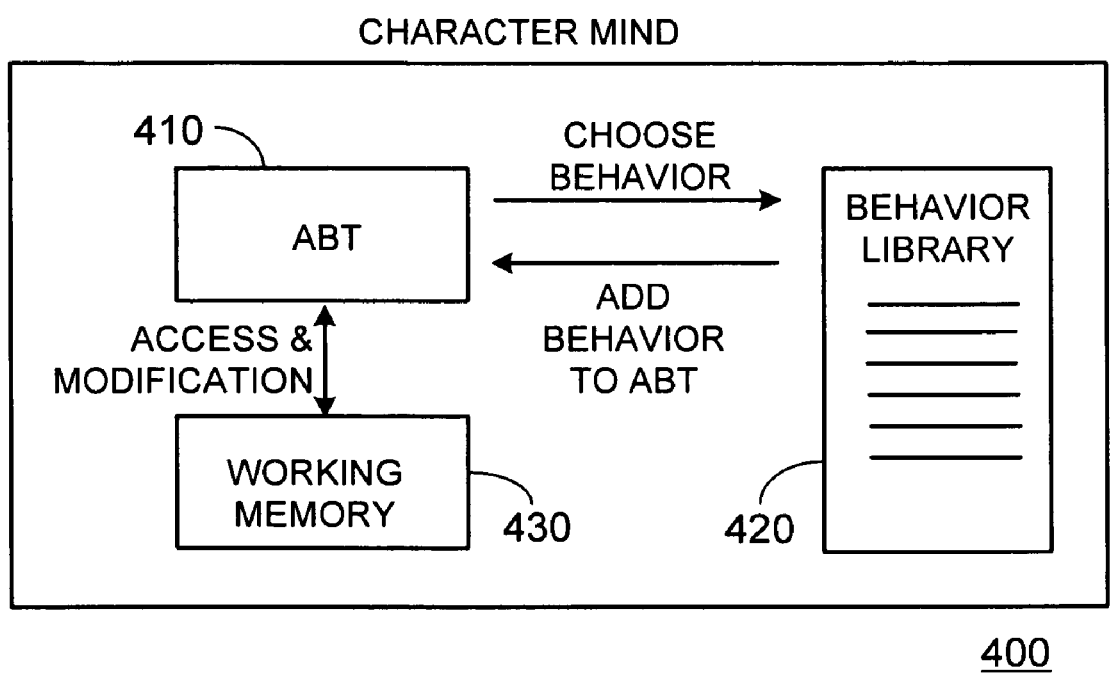
FIG. 4 shows an exemplary character mind.

Referring now to FIG. 4, the character mind 400 includes three main data structures: the active behavior tree (ABT) 410, the Behavior Library 420, and the Working Memory 430.

The ABT is a tree structure that represents the "mindset" of the character at any given time. The ABT includes three types of elements: goals, acts, and behaviors. These elements are arranged in an annotated tree that represents various relationships among these elements. Over time during system execution, this structure is changed in response to changes in the state of mind of the interactive character.

Generally speaking, a behavior element in the ABT corresponds to an abstract description of the behavior of a character. A behavior will typically include (as child nodes in the ABT), one or more goals or acts that are appropriate for carrying out the behavior. An act represents a specific change in the state of the character, and can be a physical act (e.g., involving motion of the character's body or speech by the character), or it can be a mental act (which merely involves changing the state of the character mind). A goal represents a state of the world that the character seeks to have occur. A goal may have as a child node a behavior that has been selected by the character to try to achieve the goal.

Figure 5:
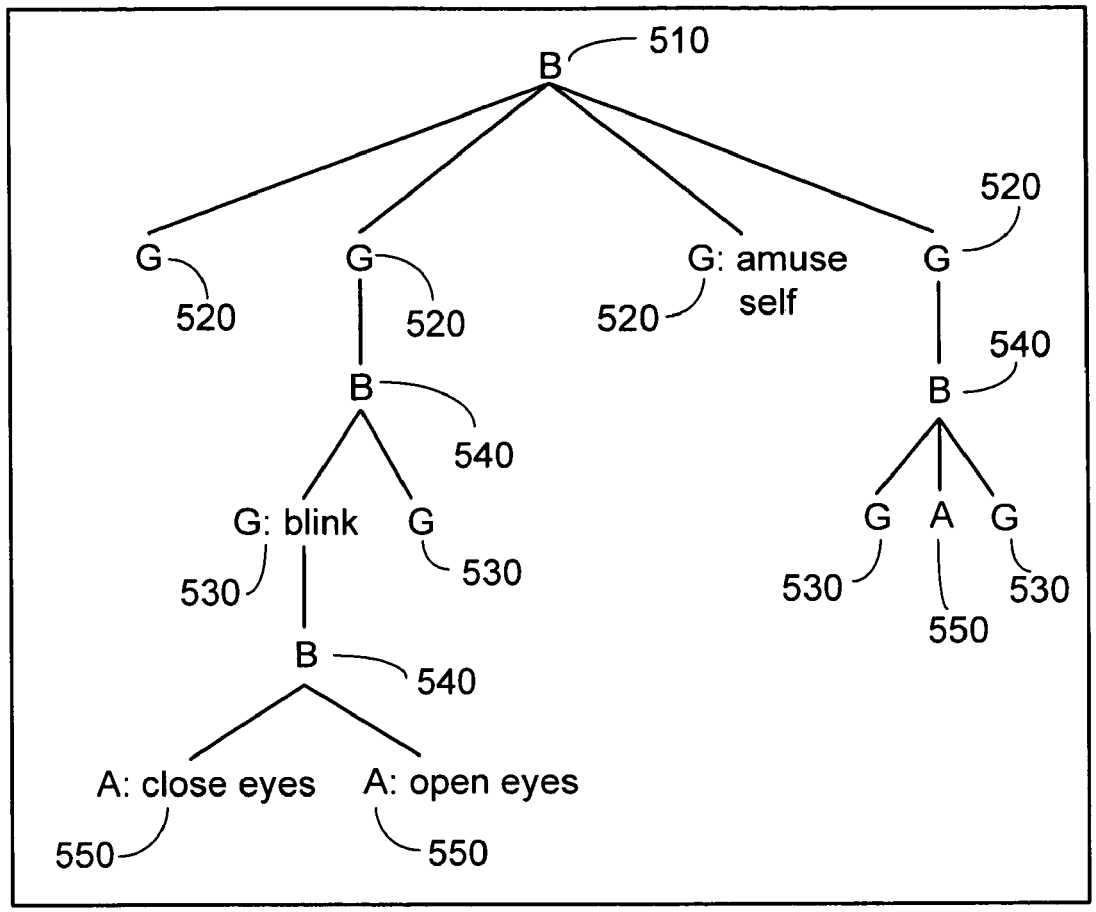
FIG. 5 shows an exemplary active behavior tree.

Generally, the root node of the ABT is a behavior representing the overall behavior of the interactive character. A behavior consists of a set of goals that the character will attempt to achieve, and acts that the character will attempt to perform. We refer to the goals and acts of a behavior as the "behavior steps" of the behavior. Referring now to FIG. 5, an exemplary ABT 500 is shown. In ABT 500 the root node behavior 510 has four goals 520, the third of which is "amuse self". As shown, this example ABT includes several other goals (G) 530, behaviors (B) 540, and acts (A) 550, in alternating layers of behavior steps and behaviors.

The Behavior Library 420 is a set of behaviors that may be used by the character to achieve goals.

Given a particular goal, the Behavior Library will contain zero or more behaviors that can be added to the ABT to achieve the goal. This set of behaviors is typically built by the author of the interactive character prior to its execution. The library could also be extended during execution using machine learning or other techniques known to one skilled in the art.

Figure 6:
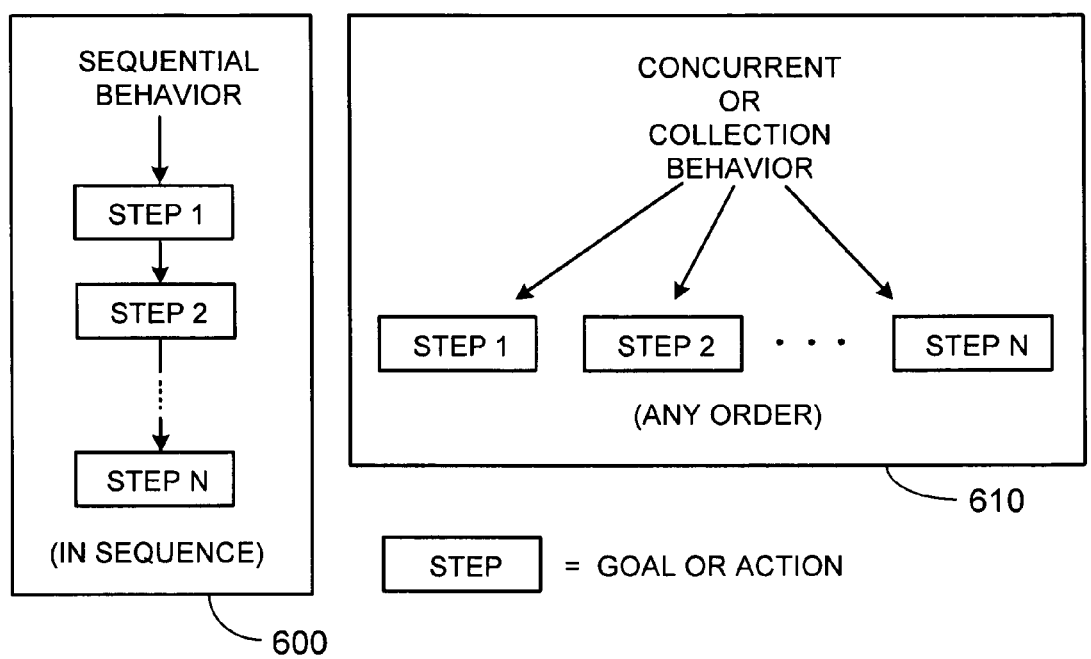
FIG. 6 shows exemplary behaviors.

Referring now to FIG. 6, in a preferred embodiment, there are three types of behaviors. A behavior may be sequential 600, or it may be a non-sequential behavior 610, which may in turn be either a concurrent behavior or a collection behavior. A sequential behavior is a sequence of goals or acts (collectively "behavior steps") that are performed in order. A concurrent behavior is a set of behavior steps that can be performed in any order, including being interleaved or having portions performed in parallel. In general, all behavior steps of a sequential or concurrent behavior must succeed in order for the behavior to succeed. A collection behavior is like a concurrent behavior in that it consists of a set of behavior steps that can be performed in any order, including being interleaved or having portions performed in parallel. However, a collection does not require all behavior steps of the behavior to succeed.

Elements of the ABT may include annotations that modify the way in which the element is interpreted by the character mind. There are two distinct types of annotations in the ABT. The first type is an annotation that is placed on a behavior step. This is sometimes referred to as a "step annotation". The performance of behavior steps in a behavior can be modified by "step annotations" that are included in the behaviors. The second type is an annotation that is placed on the behavior itself. It is included as a part of the behavior and applies to the behavior as a whole. This is sometimes referred to as a "behavior annotation".

One difference between the step annotations and behavior annotations is that a particular behavior step may have different annotations depending on its context (i.e., which behavior it is a part of). For example, the same goal appearing as a behavior step in two different behaviors could have different annotations. On the other hand, a behavior annotation is present whenever that behavior is used to achieve a goal, regardless of the context.

Figure 7:
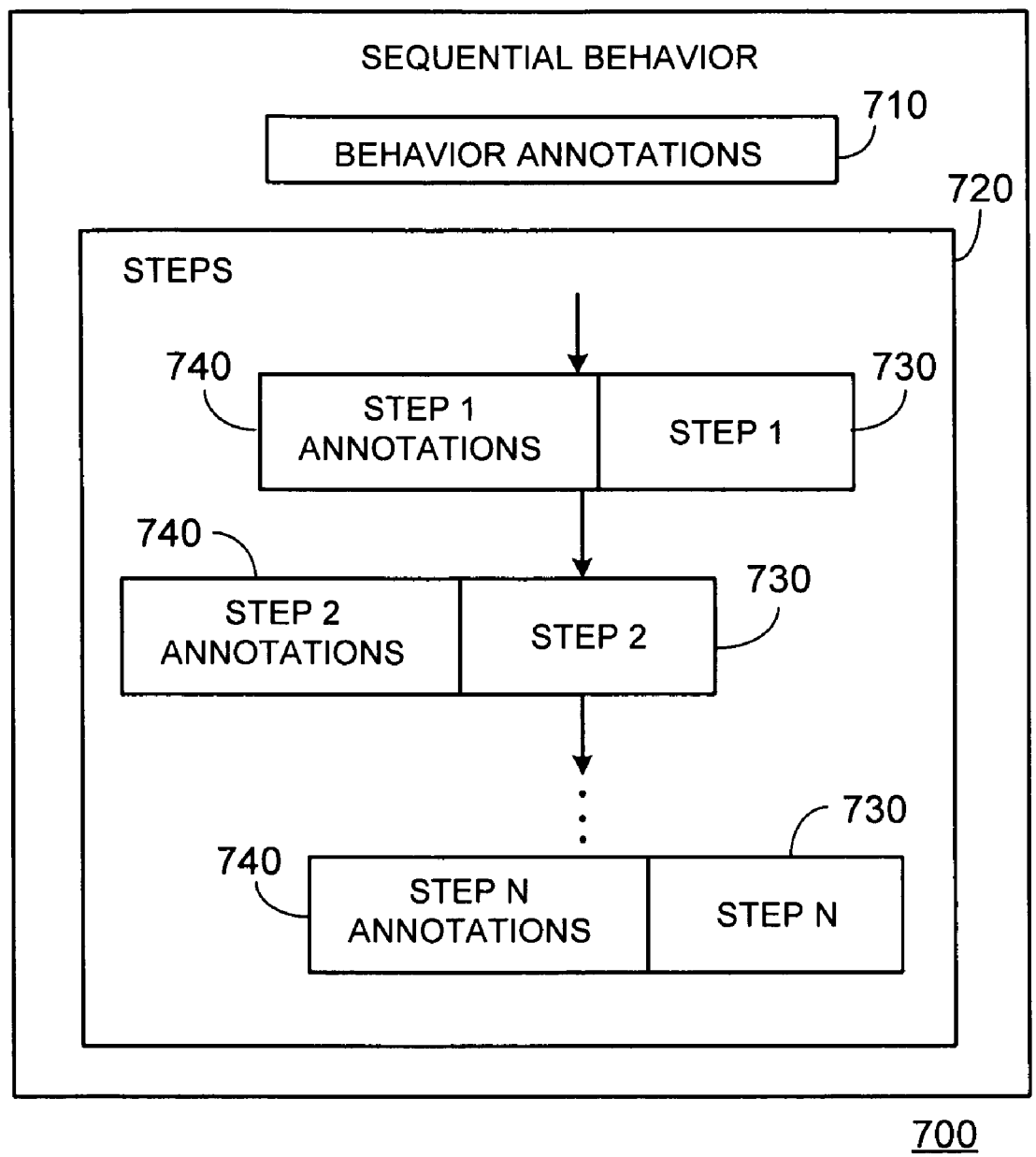
FIG. 7 shows an exemplary sequential behavior.

Referring now to FIG. 7, there is shown an exemplary sequential behavior 700. Sequential behavior 700 includes behavior annotations 710. Sequential behavior 700 also includes a sequence 720 of behavior steps 730. Each behavior step instance includes step annotations 740 that are specific to that instance of the behavior step. The use of annotations in a character mind is described in more detail below.

Referring again to FIG. 4, Working Memory 430 is a repository of data that is used to store elements of the state of the character mind. It consists of a set of Working Memory Elements (WMEs), which are utilized to store certain auxiliary information about the current state of the character mind. The operation of WMEs is described in more detail below. Like the ABT, the Working Memory is a structure that changes over time in response to changes in the state of the interactive character.

The state of the character mind is changed when the character mind is "run." When the mind is "run" the mind examines its currently pending behaviors and attempts to perform acts or achieve goals that are appropriate to the behaviors. We describe the operation of a running character mind in more detail below. The basic operation is as follows. On every execution cycle the character mind chooses a leaf node of the ABT to execute. If the leaf node is a physical act, that act is passed to the MSM. If the leaf node is a mental act, it is executed. If the leaf node is a goal, then the character mind queries the Behavior Library for a behavior that can achieve the goal, and adds that behavior to the ABT underneath the selected goal's node. This process adds nodes to the ABT. Nodes are removed as the goals, physical acts, mental acts, and behaviors finish processing. This is described in more detail below.

During operation of the character mind, the mind continuously chooses the interactive character's next act based on, among others, perception, current goals, emotional state and aspects of internal state. A goal in a character mind may be thought of as an atomic name and a set of parameters that are instantiated when the goal becomes active, for example (tease <other>). Behaviors for these goals may be either ordered or unordered collections of subgoals, physical acts (i.e., acts resulting in audio or visual output display) and mental acts (i.e., changes in the state of the character mind that do not directly result in audio or visual output display) which can be used to accomplish the invoking goal. For example, one behavior for the above tease goal is the sequence of subgoals: (goto <other>), (greet <other>), (run-from <other>).

An item that is a goal, physical act or mental act is called a behavior step. Mental acts can also be grouped together and labeled atomic which causes them to be treated as a single, uninterruptible behavior step.

Each behavior in the character mind may be one of three types: a "sequential behavior," a "concurrent behavior," or a "collection behavior." A sequential behavior represents a list of behavior steps to be performed in sequence. The behavior steps in a concurrent behavior or a collection behavior are not ordered, and may be performed in any order. In a concurrent behavior, all of the behavior steps must succeed for the behavior to succeed. In a collection behavior, the behavior succeeds once all of the behavior steps have been attempted, regardless of whether any succeed. Behaviors have associated with them testable preconditions that are true when the behavior is applicable for a goal in the current state of the world. Preconditions are "behavior annotations." Multiple behaviors can be written for a given goal, with the character mind choosing between the behaviors at execution time. If a behavior fails, the character mind will attempt any alternate behaviors for the given goal, and thus perform a kind of backtracking search in the real world.

Multiple behaviors for a goal can be partially ordered by another type of "behavior annotation" called a specificity. A specificity annotation is an expression that evaluates to a number. Behaviors with higher specificity (i.e. a larger number) are preferred over those with lower specificity. The character mind uses these to choose more specific behaviors when multiple behaviors apply.

The character mind stores all active goals and behaviors in a structure called an active behavior tree (ABT). An example ABT is shown in FIG. 5. An ABT is a tree of alternating layers of behavior steps and behaviors. The second layer of the ABT (after the single root behavior node) is the collection of top-level behavior steps for the character. Typically, all of the top-level behavior steps are goals. A goal's child, if it has one, is the active behavior for that goal. A behavior's children are its component subgoals, physical acts and mental acts. The ABT changes during execution of the character mind: expanding as behaviors with their component subgoals are chosen for goals and added to the ABT, and shrinking as goals and behaviors succeed and fail and are removed from the ABT. Physical acts succeed or fail depending on their execution in the MSM. Mental acts always succeed. Goals succeed when a behavior for the goal succeeds, and fail if all of the applicable behaviors have failed. Behaviors succeed if all of the component behavior steps succeed and fail if any of the behavior steps fail (subject to the modifications of annotations and behavior types described below).

Each behavior in the ABT may have one or more annotations that provide the character mind with a basis for prioritizing and managing multiple goals. In particular, behavior steps are annotated with "step annotations" and the behaviors themselves may have "behavior annotations."

One type of "step annotation" is called a success test. A success test is an arbitrary testable expression over the perceived state of the world and the internal state of the character mind. Success tests can be associated with any behavior step in a behavior. When a success test that is associated with a behavior step that is currently in the ABT becomes true, its associated behavior step is deemed to have been accomplished and thus no longer needs to be pursued. For example, the first behavior step of the tease behavior described above may have a success test associated with it to determine if the character is already near <other>. If this test is true when the behavior begins this behavior step, the goal (goto <other>) would be skipped. Also, if the character is in the process of going toward <other> when some external factor, such as <other> moving toward it, causes the test to be true, the success test would enable the character to recognize that the goal has succeeded and stop pursuing it.

Two additional "step annotations" are ignore-failure and optional. Behavior steps marked with ignore-failure treat failure as success thus making the attempt of the behavior step enough for success. The optional annotation causes the marked behavior step to be irrelevant in determining the success of its parent behavior. The parent behavior then succeeds when all of its other behavior steps succeed regardless of whether the marked behavior step has been attempted. Optional annotations (not the behavior steps themselves) are ignored in sequential behaviors.

Collection or concurrent behaviors can have the "behavior annotation" number-needed-for-success. Normally all of a behavior's behavior steps must succeed for the behavior to succeed, or some of the behavior steps can be explicitly annotated as optional by using the annotation optional. This is not always desirable. There are cases, for example, where two behavior steps should be pursued concurrently, but if either one succeeds, the behavior should succeed. The optional annotation does not capture this expression because the author doesn't know ahead of time which behavior step will succeed and which will become optional. To capture this case, the annotation number-needed-for-success indicates how many of the behavior steps must succeed for the behavior to be considered to have succeeded.

This annotation specifies the number of behavior steps that must succeed (or succeed or fail in the case of a collection behavior) in order for the behavior to succeed. Behavior steps that are marked optional are not included in the count, so this annotation can be meaningfully combined with optional. For example a behavior could be written with two optional goals and three other goals with a number-needed-for-success annotation with value two. The character mind would pursue all five goals concurrently, and the behavior would succeed whenever two of the three goals not marked optional succeed.

A context condition is an annotation that can be either a "step annotation" or a "behavior annotation". Like a success test, a context condition is an arbitrary testable expression over the perceived state of the world and the internal state of the character mind. When a "behavior annotation" context condition for a behavior that is in the ABT becomes false, its associated behavior is deemed no longer applicable in the current state of the world. That behavior fails and a new behavior must be chosen to accomplish the invoking goal. When a "step annotation" context condition becomes false, the behavior step fails.

As an example of a "behavior annotation" context condition, consider a character that is involved in a cooperative game where the point of the game is to keep the ball in the air, and where the character is currently pursuing a goal to hit the ball. One behavior for this goal is to hit the ball by flicking the character's head from a standing position. This behavior has a "behavior annotation" context condition that becomes false if the ball goes below the height of the chest of the character. This context condition recognizes when the associated behavior is no longer appropriate because the ball is in a position in which it cannot be hit using this method. This causes the behavior to fail, and allows other behaviors for this goal to be chosen such as one to hit the ball with a lower part of the character body.

Success tests and context conditions can themselves be annotated with behaviors to execute when they fire. So, in addition to modifying the ABT, the success due to a success-test and failure due to a context condition can also result in other behaviors of any type. In particular, a success test or context condition may trigger a behavior to record information about the success or failure of the goal for emotion processing as described below.

Every behavior step can have a priority modifier expression. This is a type of "step annotation." If present, the modifier value is added to the priority of the parent to calculate the priority of the behavior step. If the modifier is not present, the behavior step inherits the value of the parent's priority. A behavior step's priority is used by the character mind when choosing which behavior step to execute.

In addition, goals can have either or both of two importance expressions (importance-of-success, the emotional significance of a goal succeeding, and importance-of-failure, the emotional significance of a goal failing), used by the emotion system when considering the significance of the goal. Both of these expressions evaluate to an integer zero or greater, and if either of these expressions is omitted, one is automatically inserted with value zero. These are "step annotations" (assigned to instances of behavior steps rather than to behaviors), because identical behavior steps could have different priority or emotional importance depending on the context in which they arise. For example, the goal of going to an area as a subgoal to a run away goal would typically have a higher priority than the same goal in pursuit of an exploration goal.

Certain behaviors may include a special type of behavior step called pause that is never chosen by the step arbiter. Thus, when present in a sequential behavior it suspends that behavior until removed. It can be removed by an associated success test becoming true, or by success or failure of one of its ancestors in the tree. Arbitrary demons can be encoded using a pause behavior step. The structure of such a demon is a sequential behavior whose first behavior step is a pause behavior step with a success test. The success test contains the firing condition of the demon, and the second and later behavior steps of the behavior contain the body of the demon.

Any behavior step can be annotated as persistent with respect to success, failure or both. A behavior step so marked remains in the ABT upon success or failure rather than being removed, and is reset so that it is again available to be pursued. These are of course "step annotations."

A goal in a behavior can be annotated with a "step annotation" that is not predefined, but instead specified by an arbitrary name and value. The value associated with this annotation can be modified over time. These customizable annotations can be useful, for instance, when creating emotions based on the likely success or failure of goals.

For example, a character has an important goal ("G") that has an annotation called "CharacterThreateningThisGoal" that is initially set to the value "no character." When the character's behavior computes that "G" is likely to fail because of the actions of another character ("B"), the value associated with the annotation can be set to "B". If later another character ("C") threatens the goal, the value can be updated. This specific information allows the character's emotion system to notice that "G" is threatened and to generate a fear response directed at the appropriate character.

The mind executes by first modifying the ABT based on changes in the world: behavior steps whose success tests are true and behaviors or behavior steps whose context conditions are false are removed along with any subordinate subgoals or behaviors. (One exception to this is that some subordinate acts may not be removable, e.g., because they are in the middle of executing. Processing of these non-removable acts is described later.) Next, one of the leaf behavior steps is chosen. This choice is made by a step arbiter that prefers high priority behavior steps and, among behavior steps of equal priority, prefers continuing the most recent line of expansion. If there is more than one behavior step that could be chosen using this mechanism, the step arbiter chooses randomly between them. If the chosen behavior step is a primitive mental act, its code is executed. If it is a physical act, it is sent to the motor and speech module to be executed. Note: if a physical act is currently executing, it will not be chosen for execution again. Otherwise, the behavior library is indexed and the behavior arbiter chooses one behavior for the goal from among those whose preconditions are true. The behavior arbiter will not choose behaviors which have already failed to achieve this goal instance, and prefers more specific behaviors over less specific ones using the specificity annotation. If there is more than one behavior that is valid to be chosen, the behavior arbiter chooses randomly between them.

The chosen behavior and its component behavior steps are added to the ABT, and the execution loop repeats.

A collection behavior is the same as a concurrent behavior with all of its behavior steps annotated as ignore-failure. This allows a collection of behavior steps to run concurrently without their failure affecting each other.

We now describe some derived expressions that may be useful in defining behavior steps in a behavior. These derived expressions can each occur as a behavior step of a behavior with the specified derived meaning. A one-of expression allows the expression of multiple ways of attempting something inline in the body of an expression. The meaning of this expression is the same as if a new goal name is created, each clause of the one-of expression is expanded into a separate behavior for that new goal name, and the one-of expression is replaced by an invocation of the created goal name. Each clause of a one-of expression can include a precondition and/or specificity. If these are present in the clause, the meaning is the same as if the behavior created for this clause had the same precondition and/or specificity as a "behavior annotation". Other derived constructs include inline sequencing, concurrent and collection constructs. These can each be expressed in terms as a derived construct in which a new subgoal is created with a single created behavior of the appropriate type B. Real-Time Operation of Character Mind To respond to the challenges of a real-time, animated domain, a preferred embodiment of the character mind may have the following features: (1) parallel execution of multiple acts and goals, (2) early production of next acts to allow smooth animation, (3) automatic management of selective sensors, and (4) incremental evaluation of the continuously monitored conditions. We now describe particular exemplary embodiments of these features in more detail.

1. Parallel Execution of Goals and Acts

For interactive characters to appear alive, it is desirable that they be able to do more than one thing at a time. As described above, a character mind may hold multiple parallel goals (or other types of behavior steps) through the top-level parallel set of behavior steps and through parallel behaviors that arise during execution. The character mind manages these multiple behavior steps by concentrating on the most critical of them according to its arbitration mechanism, and for the most part only attends to other behavior steps after the current behavior step completes or as events trigger demons.

In addition to this, all of an interactive character's active behavior steps can be attended to in a character mind, potentially producing multiple acts or performing concurrent cognitive processing. One approach to managing multiple acts is a so-called "greedy" approach that entails attending to the most critical behavior steps first and mixing in others as time allows. In each decision cycle the character mind chooses the most critical of the available leaf behavior steps. This thread of behavior is attended to until it is interrupted, or it becomes suspended. For example, when a jump act in a sequential behavior is sent to the MSM to be executed, the behavior cannot continue (and therefore is suspended) until the act completes. When a thread is suspended the character mind uses the available processing time (for example, approximately 1200 milliseconds of real time in the case of a 1.2 second jump act) to attend to the other, perhaps unrelated, available behavior steps. A thread of behavior may also be suspended if its current behavior step is the special form pause or if its current behavior step is incompatible with a more critical executing thread.

This notion of incompatible behavior steps deserves further comment. Two acts are considered incompatible if they use the same character body resources. For example the jump and slide acts both use the character body translate-x, translate-y and translate-z resources to move the character body's location and so cannot execute simultaneously. Similarly, goals can be incompatible with other goals or with acts. These goal incompatibilities exist independently of any primitive act resource conflict. For example, while sleeping the primitive acts being executed are rather sparse and do not by themselves preclude concurrently executing other primitive acts. In most characters, however, the goal of sleeping is incompatible with acts or goals that significantly move the character body.

A character mind includes specifications of pairs of behavior steps that are incompatible. This is done using a defconflict construct, e.g. (defconflict sleep jump) where sleep is the name of a goal and jump is the name of an act. During processing, the character mind will not pursue two incompatible behavior steps at the same time. The more critical one is pursued while the other is temporarily suspended.

2. Coordination with the MSM

The character mind and the MSM work in concert to produce the character's behavior. As described above, the mind keeps track of which acts are currently executing and which acts are physically incompatible with which. This allows the mind to make sure no incompatible acts are issued. Instead, the character mind will delay executing one act until the conflicting one is done. It chooses which to issue and which to delay using the step arbiter and the update suspension step in the RunMind algorithm. In some cases this will mean that the character mind will need to abort an executing act in order to issue a more pressing act. If that act turns out to be unabortable (e.g., a jump in mid-air) then the character mind will wait to issue the more pressing act. Once an act has been aborted to allow a more pressing act to execute, it can be reissued once the conflicting act is done.

3. Early Production of Next Act

To allow the MSM to provide smooth motion, the character mind attempts to provide the next act for each thread before the current act finishes. If notified by the MSM that a particular act is about to end, the character mind assumes that the act will complete successfully. This success is propagated through the ABT in the normal way. The character mind then can use the time before the act actually completes to compute the next act along that thread. If an act is produced, it is sent to the MSM with the instruction that it be executed after the current act actually completes, and after any other executing acts that conflict with it or that are before it in a sequential behavior. All of the character mind's reactive mechanisms apply to these pending acts as well as to normal execution of the character mind, so in the event that the character mind chooses to abort a pending act, a message is sent to the MSM and it is removed.

Of course, if the character mind is currently attending to something more critical than this thread, it will continue to be attended to and the next act in this thread will likely not be computed.

4. Selective Sensing

It is desirable that sensing in a real-time, animated world must be efficient. To this end, the character mind deploys task-specific sensors which can be turned on or off as needed. Each sensor observes a low-level aspect of the simulated world and notifies the mind when that aspect's value changes. Typical sensors are "can I see character X jumping" and "what is the position of character X". The aspects of the world which must be known to evaluate a character mind's preconditions, success tests and context conditions are noted when these conditions are written by associating a list of sensors for each condition. The character mind manages the sensors by turning them on and off when appropriate. As a leaf subgoal is chosen to be executed, sensors needed to evaluate the preconditions for that goal's behaviors are turned on, and then turned off again after a behavior is chosen. Likewise, when a particular goal or behavior is present in the ABT, the sensors relevant to evaluating any success tests or context conditions are turned on. When that goal or behavior is removed from the tree because of success, failure or irrelevance, the sensors are turned off. Because the same sensor may be needed for several different conditions at a time, the sensors are shared and reference counted (i.e., the number of references by a character mind to a particular sensor is counted, and the sensor is not deactivated unless the reference count reaches zero)

5. Incremental Evaluation of Conditions

Typically a character mind has a number of continuously monitored conditions (context conditions and success tests) active at any given time. For efficiency, context conditions and success tests may be implemented in a character mind using the well-known RETE incremental matching technology. RETE is described, for example, in Charles L. Forgy. *Rete: A fast algorithm for the many pattern/many object pattern match problem*. Artificial Intelligence 19(1): 17-37. For consistency, preconditions may also be implemented as RETE match expressions in a preferred embodiment. Any information that is to be matched upon must be put into working memory elements (WMEs) of the RETE network. In the preferred embodiment, this includes information provided by sensing, as well as information provided by the reflection mechanism.

For ease of implementation in RETE, context conditions may be expressed as fail-when expressions. A fail-when expression encodes the condition under which the associated behavior should be removed rather than the conditions under which it should not be removed. I.e. for any given fail-when condition expression e, the equivalent context condition expression is (not e).

6. Reflection

A desirable feature of a character mind is the ability to perform "reflection." The term "reflection" refers to the ability of the character mind to reason about its own state and progress. In a character mind, reflection may be accomplished by creating WMEs for certain goals or acts. These WMEs contain information about these goals or acts, and can be matched using an RETE. Typically, they include the name and arguments of the goal, as well as goal status such as: available for execution, executing, suspended, succeeded, failed, or aborted. Thus, changes in the character mind's own state can satisfy conditions in much the same way that changes in the simulated world (reported to the mind by sensors) would do so.

WMEs are created automatically for every act in the ABT. However, WMEs are not created automatically for every goal in the ABT. These are created only for goals annotated with non-zero importances (importance-of-failure or importance-of-success) or annotated explicitly with the reflection annotation.

C. Building Higher Functionality in a Character Mind

In addition to producing specific acts in a character, behaviors may also be used to represent high level sensing and emotional activity in a character mind.

As noted above, the task-specific sensors provide sensory information at a low level, including primitive act events. However, it is desirable that interactive characters be able to recognize abstract composites of this sensory information. For example, the author of a character might design the character mind to recognize that other characters (including the user avatar) are fighting, playing games or moping. Thus a character mind may have one or more behaviors that serve as high-level recognizers that recognize such high level behavior using inputs from low-level sensors in the selective sensing module. High-level recognizers are also called composite sensors. The composite sensors use parallel and sequential behaviors, combined with success tests, context conditions, mental acts, etc. to actively look for patterns in the sensor data as they are perceived. For example, a composite sensor might infer that a character is trying to annoy another because over time the first is staying very close and performing quick, jerky motions, even though the second is trying to move away.

As described below, a character's emotion system may also be implemented using behaviors. Emotions are thus managed by the character mind as some of the multiple threads of behavior, with the character mind attending to several of them simultaneously when the time available to think allows, or otherwise only attending to the ones most critical to this character mind.

One important aspect of the character mind that enables the creation of emotions and other high-level functions of mind is the ability of behaviors to reflect on the state and processing of the rest of the mind. This includes the ability to reason about the character's goals, their parameters, and their execution status (e.g., executing, succeeded, failed, etc.).

1. Sensing Behavior in a Character Mind

To make this approach concrete, consider a specific example sensor: one to recognize a threat from another interactive character or a character controlled by a human user. For this example, imagine a type of threat that is similar to a physical threat in the real world. The interactive character A has a notion of personal space, and invasion of that space causes uneasiness. Another character making quick movements toward A can be viewed as threatening A, especially if the movements are made within A's personal space. In this example, imagine characters have a particular body motion that is used for threatening, called a puff. A puff is modeled after the way animals make themselves look larger to the entity they are threatening, for example, the way a cobra spreads its hood, a cat arches its back, or a human puffs out its chest. Of course, in general these social conventions are subject to each interactive character's interpretation, and misinterpretations do happen.

Since an interactive character may be concerned will the well being of other characters as well as itself, interactive characters may need to be able to recognize both when it or when other characters are being threatened. Although a character mind could be programmed to directly access the ABT of other interactive characters to determine when they are engaged in threatening behavior, such a technique would not work if a character controlled by the user (e.g., the user's avatar), is one of the characters that may engage in such behavior. Therefore, it is desirable for a character mind to be able to interpret the actual behavior of other characters to determine what is happening in the simulated world.

The following pseudo-code shows how such behaviors might be designed to recognize threatening behavior among characters in a simulated world. Four behaviors are provided. The first, recognize_threat, ultimately determines whether a threat has occurred to a particular character. It operates by first recognizing that that character's personal space has been invaded by another character. When this occurs, recognize_threat triggers as a subgoal the behavior verify_threaten. Verify_threaten succeeds when either the attacker puffs to the threatened character, or when three quick acts are made by the attacker in the vicinity of the victim in less than a minute. Verify_threaten uses the behaviors recognize_puff and recognize_quick_act as subgoals to make these determinations.

(1) (sequential_behavior recognize_threaten (victim)
(2) (locals (aggressor unbound))
(3) (with (success_test someone is within $$personal_distance of $$victim and
(4) $$victim can see someone;
(5) set $$aggressor to someone)
(6) (pause))
(7) (subgoal verify_threaten $$aggressor $$victim)
(8) (mental_act signal $$aggressor is threatening $$victim now))
(9) (concurrent_behavior verify_threaten $$aggressor $$victim)
(10) (number_needed_for_success 1)
(11) (context_condition $$attacker is within 4*$$personal_distance of $$victim and
(12) less than a minute has elapsed)
(13) (subgoal recognize_puff $$attacker $$victim)
(14) (sequential
(15) (subgoal recognize_quick_act $$attacker)
(16) (subgoal recognize_quick_act $$attacker)
(17) (subgoal recognize_quick_act $$attacker)))
(18) (sequential_behavior recognize_quick_act (who)
(19) (with (success_test $$who performs a Squash, Put, Jump, or ChangeBodyRadii
(20) act with a duration <0.2 seconds)
(21) (pause)))
(22) (sequential_behavior recognize_puff (who at)
(23) (with (success_test $$who is executing ChangeBodyRadii act with
(24) argument values in the range needed to look like a puff)
(25) (pause)))

We now describe the four behaviors above in more detail. To construct a sensor to recognize threats of this form, we first need a demon that recognizes when another character comes too close to the interactive character. This is done, as shown in lines (1) and (3)-(6), by using a sequential behavior whose first behavior step is a pause goal with an appropriate success test. In this case, the success test uses primitive sensors to recognize when another character comes within a certain distance (less than this interactive character's notion of personal space) of the target. The interactive character's current notion of personal space is stored in a global variable. This success test, as a side effect of firing, records which other character came too close in a local variable of the behavior. The second behavior step of the sequential behavior, in line (7), is a goal to verify the threat by that character. And the third behavior step, in line (8), is a mental act to record that the other character is threatening the target. If the verify goal fails, the behavior fails, and the third behavior step is not executed. If it succeeds, the third behavior step records the aggressor and other behaviors can match that information to decide how to react.

To construct a behavior to verify the threat we need to be able to recognize quick physical acts and a puff act toward the victim. These are expressed as the last two behaviors, lines (18)-(25). They are both sequential behaviors with a single pause behavior step. Thus, these behaviors can only succeed if the success test associated with the pause behavior step becomes true. Otherwise they will remain in the tree until one of their ancestors is removed. The success tests for these behaviors recognize the appropriate acts as they happen. The first one, in lines (19)-(20), recognizes when any of four acts that move the body is done quickly (with duration less than 200 milliseconds) by $$who. The success test for the recognize_puff behavior, in lines (23)-(24), recognizes when $$who performs a ChangeBodyRadii act with parameters in an appropriate range to make it look like the puff act.

Using these recognizers one can build a behavior to verify that a threat is being made. One such behavior is shown as verify_threaten, in lines (9)-(17). It takes the alleged attacker and victim as its arguments. Since a threat can be either a single puff or a sequence of several quick acts toward the victim, it uses a concurrent behavior. This allows all behavior steps of the behavior to be pursued concurrently; the first behavior step, in line (13), is a recognize_puff goal, and the second behavior step, in lines (14)-(17), is a sequential form to cause a sequential behavior with three recognize_quick_act behavior steps. In this way both types of recognition can be pursued concurrently.

Since only one of these patterns is required for a threat, we need to indicate that only one of the behavior steps of our verify_threaten behavior is needed for the behavior to succeed. This is the (number_needed_for_success 1) annotation in line (10).

Now we have most of the recognition behavior written. But for a threat to actually take place the threatening acts need to happen near the victim, and if the threat is of the form of a sequence of quick acts they need to be reasonably close together in time. If the aggressor moves into the victim's personal space and then moves on, then no actual threat takes place and the sensing behavior should recognize this. Similarly, if the aggressor moves into the victim's personal space and stays there without performing threatening acts or performs a sequence of quick movements over the course of a long time, then no threat takes place (although such activity should probably be recognized as annoying). The context condition in lines (11)-(12) is included to capture this idea; it encodes the conditions in which the verify_threaten behavior continues to make sense: when the attacker stays reasonably near to the victim and does not take too long to threaten. If it moves farther away or takes too long, then the behavior will fail, and no threat will be signaled.

An interactive character enables this behavior by creating recognize_threaten goals for whichever characters it desires to monitor. Typically an interactive character will have a persistent goal to continuously monitor whether it itself is threatened. Some interactive characters have persistent goals to recognize when their friends are threatened. And any interactive character can create such a goal whenever the situation warrants. For example, if a character you are trying to cheer up tells you it is sad because it keeps being threatened, the behavior that responds to this knowledge might be to watch for such threats in the future and intervene. Part of such a behavior would be a recognize_threaten goal. Additional behaviors can be written to react appropriately to the results of this goal and behavior.

It should be noted that sensing behaviors typically are not very expensive computationally. Whenever such goals are present in the ABT, and sufficient processing has occurred to allow the goal to be chosen and expanded, the behavior will sit suspended until a character enters the personal space of the one being monitored. The success test that is monitoring this condition will not fire until such an event occurs, and the pause behavior step, like all pause steps, is never chosen for execution. Thus this portion of the ABT remains unchanging until the success test condition fires. While suspended, the behavior entails no processing. The character mind instead attends to and expands other goals and acts of the interactive character.

Unless characters are repeatedly threatening each other or performing acts that cause the behavior to partially recognize a threat, this behavior is computationally cheap.

When an interactive character enters the personal space of the interactive character being monitored, the success test fires, and the verify_threaten goal is available in the active behavior tree to be chosen. Thus the interactive character's attention is drawn to a potential threat, and this behavior decides whether one is in fact taking place. This behavior watches the subsequent acts to see if either a sequence of three quick acts or a puff is performed at the potential victim. If either of these happens the verify_threaten behavior will succeed. Only one is necessary because of the number_needed_for_success annotation. This success will cause the verify_threaten goal to succeed and the following mental act will signal the recognition of the threat. Any other behaviors in the interactive character can then respond to this information.

Notice that the recognition of the puff act and three quick acts can take place or partially take place in any order. This is because there are two goals looking independently for the puff and three quick acts. So for example, if a quick act is followed by a puff the recognition occurs properly. The quick act would cause the sequential behavior to progress to the second recognize_quick_act goal, and the puff act would cause the recognize_puff goal to succeed, causing the verify_threaten behavior to succeed and the threatening to be signaled.

If neither three quick acts nor a puff happen before the potential attacker moves away from the victim, the behavior will fail because of the first clause in the context condition. This will cause the recognize_threaten behavior to fail as well, and the threat will not be signaled. If the recognize_threaten goal is persistent it will reset itself, and be available to recognize a threat or potential threat again. The same will happen if the potential attacker takes too long to threaten.

2. Emotion in a Character Mind

One feature that may make an interactive character believable is the presence of a complex set of emotional states that may be triggered in the character, and which in turn affect the character's behavior, by, for example, changing the character's facial expression, changing the tone of the character's voice, changing the speed of motion of the character or changing the character's body posture. What a character is emotional about and how it shows those emotions can help to define the personality of the character. This idea is widely held in character-based arts such as character animation, drama, and film.

In an interactive character mind, the character's emotional state at a given time may be represented by a set of intensity values, each representing the intensity of a particular emotion within the character mind. In a preferred embodiment, one way that emotions arise is from events and the relationships of these events to important goals. Happiness arises when a goal important to the character succeeds or becomes more likely to succeed. Sadness arises when an important goal fails or becomes more likely to fail. Fear arises when the character thinks an important goal is likely to fail. Hope arises when the character thinks an important goal is likely to succeed. Gratitude and anger are directed emotions. An interactive character feels gratitude toward X when an important goal succeeds and the character believes someone or something (X) helped it succeed. Likewise an interactive character feels anger toward X when an important goal fails and the character believes X caused or helped cause its failure. Fear can arise as an undirected emotion, as above, or as a directed emotion; fear of X arises when the interactive character believes X will be the cause of an important goal failure. Hope can be similarly directed or undirected. For each of these emotions the intensity of the emotion is related to how important the goal is to the interactive character. For fear and hope it is also related to the perceived level of likelihood of success or failure. For happiness and sadness intensity is also related to change in likelihood of success or failure. So, if a goal is deemed likely to succeed but then suddenly fails, the intensity of sadness will be greater than if the failure was more expected.

Love and hate are attitude-based emotions. That is, instead of being based on goal success or failure, they are based on attitudes about other objects (typically other characters) in the simulated world. So, if Character1 likes (an attitude) Character2, then Character1 will feel love towards Character2 when Character2 is nearby. Similarly, Character1 will feel hate if near a disliked Character2. Other attitudes and attitude-based emotions can be created as well. The intensity of the emotion is based on the intensity of the attitude.

Pride and reproach are standards-based emotions. That is, they are caused by characters meeting or failing to meet certain standards of behavior. Pride is caused by a character doing something that the character feels was above some certain standard for behavior. Reproach is directed at another character that acts in a way that the emotion-generating character feels is below some standard of behavior. The detection of standard-meeting and standard-failing acts are encoded as high-level sensors. The intensity of the emotion is based on a level of importance associated with the standard.

A person skilled in the art could add additional types if desired. One such embodiment with additional types is described in W. Scott Neal Reilly, *Believable Social and Emotional Agents*, PhD Thesis, Computer Science Department, Carnegie Mellon University, 1996, which is incorporated herein by reference.

a) Goal-Based Emotion Generation

To specify what the interactive character becomes emotional about and how emotional it becomes, goals instances within a character mind may be annotated with either or both two "importance annotations": importance-of-success and importance-of-failure. These annotations are expressions that when evaluated give the importance of this goal succeeding or of not failing. For instance, a goal to not be hurt would have a high importance of failure and a low importance of success; that is, it would lead to intense negative reactions when it failed, but lead to little positive response just because it was generally successful.

The importance expressions are evaluated when the goal is created (e.g. from the expansion of a behavior), and the expressions can use any arbitrary computation for their expression.

For example, if the importance-of-success annotation was for a run-away goal instance that was part of a race behavior, the expression for the importance value could be a conditional expression that looks up who the character is racing and assigns an importance value of 6 if it is the character's enemy, and a importance value of 2 if it is anyone else.

If an author gives a goal a non-zero importance-of-success value, that goal will automatically generate a happiness emotion when it succeeds or is noticed to be more likely to succeed. If an author gives a goal a non-zero importance-of-failure value, that goal will automatically generate a sadness emotion when it fails or is noticed to be more likely to fail. Anger, gratitude, fear or hope emotions can also be automatically generated under conditions that are described below. The intensity of the generated emotions is directly proportional to the importance value given by the author. If no importance annotations are given, the importance values of the goal default to zero and no emotions will be generated for it.

The importance and priority of a goal are specified separately. This is because, for many goals and personalities, the emotional reactions a character has to its goals are different from how urgently the character pursues the goals. Consider, for example, a child who is told to take a bath before going to bed, and who then trudges off to the bathroom only to find that there is no hot water. Many kids when faced with this turn of events would not be sad because their high-priority goal failed, but would instead get a big grin on their face because they are happy not to have to take a bath. In such a situation, it is appropriate for the goal to take a bath to be high priority even if the child does not want to take a bath, but it is not appropriate for the goal to have a high importance value. In fact it would likely be appropriate to have the reverse goal (to not take a bath) have a high importance. By separating a goal's priority from its emotional importance, personalities such as the above child can be built.

Importance annotations are similar to priority annotations in that they are specific to instances of a goal rather than to all goals of a particular type. They are step annotations. This is for the same reason as given for priority: a very different emotional importance value may be appropriate for the same goal in different contexts. For example, the goal to run through the park might have very different importance values depending on whether it is part of an exercise behavior or a race behavior. Importance values are different from priorities in that they are not inherited from parent goals. This is because, for most personalities, it would not be reasonable for all subgoals of an important goal to also generate emotion. If winning a tennis match is an important goal, most competitors would not feel the same emotional intensity for every point that is won or lost. (Particular personalities, such as one based on John McEnroe, who was moment to moment an extremely emotionally volatile player, might have some emotional response to every point, but even for him the responses would likely not be the same as for the entire match.) Except for the generation of emotions, an importance annotation has no functional role in a character mind.

In one exemplary embodiment, the goal-based emotions (e.g., happiness, sadness, fear, hope, anger and gratitude) may be generated using demons (i.e., behaviors that are persistent in the character mind) that respond to four types of situations: when a goal succeeds, when a goal fails, when it is possible to determine that a goal is likely to succeed in the future, and when it is possible to determine that a goal is likely to fail future.

We first describe demons for detecting success or failure of a goal. These demons detect success or failure by reflecting on the character mind as described above.

Once such a demon detects a success or failure, it attempts to infer credit or blame for the goal success or failure. Because these demons have access to the goal that succeeded or failed and all of its arguments, as well as all of the character mind's normal sources of information: sensing of the external world, reflection of internal state, etc., any of this information can be used to infer the whether a particular character should be credited or blamed.

To better appreciate how such a demon may operate, consider a simulated world in which an interactive character called Otto is playing a game with the user's avatar that involves taking turns keeping a ball up in the air by hitting it. Otto could have a goal to keep the ball in the air, which would trigger a demon when it failed. In such a simulated world, the demon could conditionally assign blame to the user by determining if it was the user's turn when the keep-ball-in-air goal failed, and assign blame to the user if so.

Demons that explicitly reason to infer blame or credit are not always necessary for such blame or credit to be assigned. This is because an author will often have expressed this content in other aspects of the behavior. Success tests, for example, encode some of the conditions under which a goal succeeds. Sometimes these conditions express situations in which another character (including the user) or object helps the goal to succeed. When this is the case, and if it is appropriate for the personality being built to recognize this help, it is a simple matter to have the success test signal this help to the emotion system. Likewise context conditions are expressions by the author of some of the situations when a behavior fails, and some of them naturally have available to them the cause of the failure. These conditions, when appropriate to the personality, can record the cause in memory.

Behaviors themselves also sometimes naturally encode the proper assignment of blame or credit. A given goal can succeed by multiple methods depending on which behavior is chosen for it. The difference between these methods in some cases captures the difference between another character helping and not. For example, if a character mind has the goal to move a heavy object, it might have two different behaviors for doing it. The first might be to move it itself, with some risk of hurting itself, and the second might be to get help from another character to move it. If the second one is chosen and succeeds, then gratitude toward the character that helped might be appropriate. The author writing these two behaviors could encode this by adding a mental act that gives credit to the helping character as the final behavior step of the second behavior.

In any of these cases, the credit or blame, if any is assigned, is recorded in the character mind's working memory.

Once a demon has assigned credit or blame for a success or failure, the demon will execute a goal to generate the appropriate raw emotions: sadness or happiness, respectively, and anger_toward or gratitude_toward if blame or credit was inferred (or recorded by other aspects of the character mind's processing as described above). These raw emotions are created in working memory with an intensity value equal to the importance value of the goal times the change in likelihood of success or failure. If the raw emotions anger_toward and gratitude_toward are created they both include the object or character that was assigned credit or blame in addition to the intensity values. The goal that was the cause of the emotion is also stored in the emotion to allow more specific emotional responses.

After the demon has generated appropriate raw emotions, the demon will update the emotion summaries of the character mind.

As described above, any important goal can potentially give rise to one or more emotions. This can result in multiple emotions of the same or different types. An interactive character might be slightly happy because a greeting goal succeeded, medium happy because a goal to play succeeded, and sad because its dont_be_teased goal failed. Each of these events would cause a separate happiness or sadness emotion as appropriate. At any given time, there might be many such emotions present in a given character mind. The character mind may vary its behavior based on these individual emotions, but it is also useful to be able to vary its behavior based on the overall level of happiness or sadness (or other emotion) present in the character mind at a given moment.

To facilitate this second form of variation, the character mind automatically summarizes the emotional state of the character mind, by combining emotions of the same type. All of the raw happiness emotions are combined into a single summary happiness emotion that expresses the character mind's combined level of happiness. Similarly all of the raw sadness emotions are combined. The directed raw emotions, anger toward X, gratitude toward X and fear of X, are combined when the emotion and direction, X, are the same. They are also each combined into an undirected anger, gratitude and fear summary that captures the overall level of anger, gratitude and fear that the character mind is experiencing due to all of the emotions of these forms.

When combining emotions for the summaries, emotional intensities are combined logarithmically. If two emotions of intensity i and j are combined they result in a summary with intensity $\log_2 (2^i+2^j)$.

These summaries provide sets of data that capture the emotional state of the character mind at different levels of detail, allowing the behaviors of the character mind to express emotional variation in response to any of these levels.

Finally, the demon will update the character's behavioral features as described in the next section.

A demon for handling a likely goal failures and or likely goal success is implemented similarly.

The demon first infers the likelihood of failure for important goals that are present in the ABT. This can be done by a collection behavior with separate demons to recognize when a particular type of important goal is present and the current situation means that it is likely to fail. For example, a behavior for a superstitious character might compute that his goal to win at a roulette game is likely to fail whenever the character is not holding his lucky rabbit foot. Another concurrent demon behavior might compute that the active goal to not-be-hurt is likely to fail whenever it senses that a particular character (known to be a bully) is near. This behavior might also record that the cause of the potential failure is the bully.

As in inferring blame and credit, these types of recognition can also be included in the normal computation of the relevant goal. For example, a behavior to start a car could increase the likelihood of failure for each time it turns the key without the car starting.

The demon then generates appropriate raw emotions. Fear is generated whenever an important goal is present in the ABT and a likelihood of failure for that goal greater than zero and the importance of the goal not failing is greater than zero. Hope is generated when likelihood of success and importance of success are greater than zero.

Finally, the emotion summaries and behavior features are recomputed.

b) Attitude- and Standard-Based Emotion Generation

Attitude- and standard-based emotions are computed in similar ways. In both cases there is a high-level collection of behaviors waiting for objects in the world to trigger attitude based emotion generation demons or characters (including the user and the interactive character itself) to perform acts that trigger standard based emotion generation demons. For attitude-based emotions, the trigger is usually the proximity of an object or another character about which the emotion-generating character has attitude, though it can be subtler if desired. For standard-based emotions, the standards are usually encoded into the act-recognition demons that use standard sensing mechanisms to detect and recognize the pleasing/offending act.

In both attitude and standard cases, these demons create an appropriate emotion with the appropriate intensity. Then the emotion summaries are updated then the behavioral features are updated.

c) Behavioral Features: Mapping to Styles of Action

Characters don't always show their emotions. They may be quite afraid, while showing a calm demeanor, or seething inside while acting very polite and civil. In order to support these types of expression, a character mind provides a mapping ability from emotion summaries to behavioral features. Each behavioral feature represents a style of acting. In the preferred embodiment, they are: act_cheerful, act_glum, act_alarmed and act_aggressive. Each behavior feature has a current scalar value that represents the degree of that style of acting. These features, in turn, may be utilized by the character mind to determine what acts to perform. For example, the character may smile when the act_cheerful behavioral feature has a sufficiently high value.

The mapping from emotional summaries to behavioral features is specific to the character's personality. For example, the mapping for a candid, expressive or naive personality might be a direct mapping: happiness to act_cheerful, sadness to act_glum, fear to act_alarmed and anger to act_aggressive. A character with a schoolyard bully personality, on the other hand, might map fear and happiness to aggression as well as anger to aggression. The mapping can also be conditional or any other desired computation, for example a character that showed bravado up to a point and then showed fear might map fear below some intensity to act_aggressive, and above that intensity map fear to double the intensity of act_alarmed. Another example might have this mapping change over time.

Behavioral features are also often used to create coherent emotional expressions by filtering out all but 1 or more emotions that can be expressed more clearly for having less competition. That is, although many of the emotion summaries may have non-zero values, the mapping for the character may cause only a single behavioral feature (e.g., associated with the strongest emotion present) to be activated, thus making the character's behavior more clearly corresponding to that emotion.

d) Passive Goals

As described above, a goal will typically succeed or fail depending on whether or not its behaviors succeed or fail. Thus, during the process of attempting to achieve the goal, the character mind will determine whether a goal has succeeded or failed. However certain goals in the character mind do not involve active attempts by the mind to achieve them. For these goals, whether they have succeeded or failed must be sensed or inferred from the state of the simulated world. For example, if an interactive character has the goal that his favorite sports team win this game or that a roulette wheel stop on a particular number, there is nothing the character can do to achieve these goals, and the character must sense the world to determine whether they have succeeded. We call such goals passive goals because they are not actively pursued by the character mind (although there are certainly characters who perform acts that they think will affect the outcome of the roulette wheel or their favorite sports team). A passive goal may be expressed as having a behavior with a pause goal as its only behavior step. Behaviors that run concurrently perform the sensing to determine when they succeed or fail (e.g. by sensing the final position of the roulette wheel). This information is recorded and the previously described mechanisms generate appropriate emotions.

e) Automatic Decay of Emotions

Emotions in traditional characters don't last forever. A character becomes angry; the anger lasts for a while; and it eventually goes away. To provide this same appearance for interactive characters, the emotion system automatically decays the individual emotions periodically. When the intensity of the emotion decays to zero, the emotion is removed.

This is accomplished by an Em_decay_demon that runs in parallel with the other top-level behavior steps of the character. It fires once every second. It is typically a low-priority demon (although this can be changed for a particular personality). This causes it to sometimes be delayed in executing. When it fires, its behavior executes by: reducing every decayable emotion by one. If more than a second has elapsed each emotion is reduced by an amount proportional to the elapsed time. It then removes any raw emotions that have intensity zero or less. Next it updates the emotion summaries and behavioral features using the same mechanisms as the mechanisms for inferring blame and credit. Fear and hope can be in non-decayable states when the likelihood of success or failure remains. In the case of fear, while the threat remains, the emotion does not decay. If the threat reduces, the emotion can decay to the appropriate level. If the threat disappears, the emotion can decay to zero and be removed. A similar mechanism is also used for hope.

f) Emotional Expression

An interactive character's emotions can influence any aspect of its behavior. This is possible because the full emotional state is recorded in working memory and can be referenced by any of the character's behaviors.

These references can be in any of the character mind's decision making expressions: in preconditions when deciding on which behavior to choose for a goal, in success tests, in context conditions, or in mental acts. In this way, any aspect of the interactive character's behavior can be affected by the current emotional state, from high-level goal and behavior choice, to particular choices of acts or subtle timing. An interactive character can do path planning for movement differently when angry than when happy. Or it can perform its composite sensing differently in different emotional states. The workings of the emotion system itself can be sensitive to the emotional state. For example, one could build an interactive character that assigns blame to others much more freely when angry than when happy.

All levels of the emotional state are available for these choices: the behavioral features, emotion summaries, and raw emotions. This allows an author to write behaviors that vary based on the general emotional state or more specific aspects of the state. One interesting use arises naturally in the case of a schoolyard bully that maps fear into act_aggressive in his behavioral feature mapping. Most of the bully's behavior might express the state given by the behavioral features including act_aggressive, while a few artistically chosen subtle behaviors, for example a nervous twitch or movement of the eyes, might express his raw fear emotion when present.

D. The Operational Loop of the Character Mind

As noted above, the interactive character presentation system 200 executes each character mind 210 once during each iteration of its control loop. When the character mind is run, it enters an operational loop (which we refer to as RunMind) by which it executes pending behaviors and generates new ones. We now describe the operation of RunMind in more detail.

Figure 8:
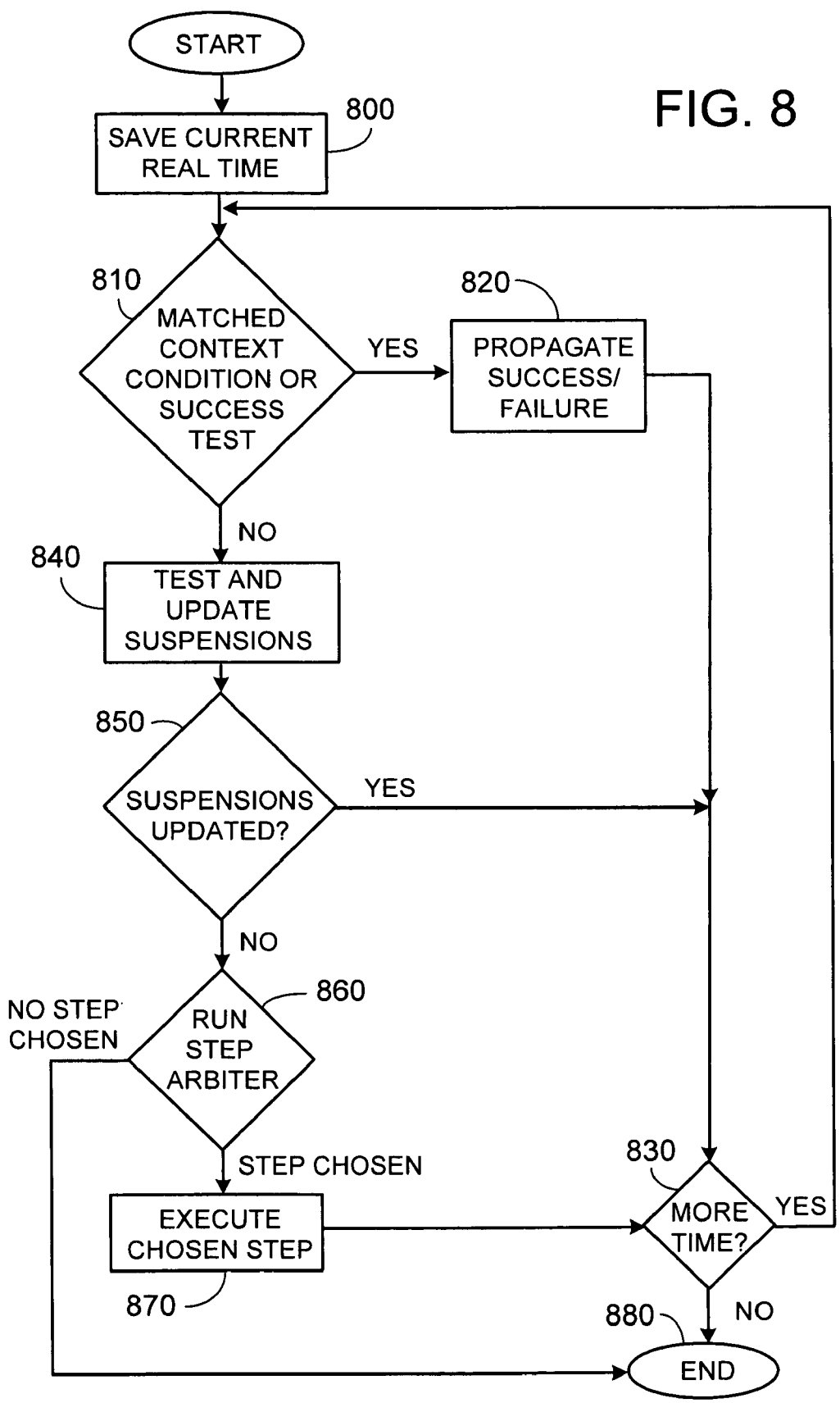
FIGS. 8-13 are flowcharts.

Referring now to FIG. 8, RunMind is called with a time budget. It attempts to execute in real elapsed time less than or approximately equal to the time budget.

The first step is to record the current real time from the system clock as the start time (step 800).

The second step is to execute the RETE network for this character mind to determine if any fail-whens or success tests are true (step 810). If any are true, one of the true ones is chosen and the success (if the condition is a success test) or failure (if the condition is a fail-when) is propagated (step 820), and execution proceeds to the test for more time (step 830).

If none are true, the character mind updates suspensions in the ABT to enforce the defined conflicts for the behavior steps in the ABT (step 840). If any updates are made (step 850), execution proceeds to the test for more time (step 830).

If no updates are made, then the step arbiter is executed (step 860) to choose a next behavior step to execute, and the chosen behavior step is executed (step 870).

If no behavior step is chosen, then RunMind returns (step 880).

Whenever the test for more time (step 830) is reached, the current system clock is compared to the start time plus the time budget. These are all real time measures. If the current time is less than this sum, execution continues at step 810. Otherwise, RunMind returns (step 880)

We now describe these steps in more detail.

1. Propagating Success or Failure

During the execution of RunMind, the ABT may be modified because of the success and failure of goals, acts and behaviors. These modifications can also be initiated during the execution of the MSM when it sends ActSucceeded, ActFailed or AboutToEnd callbacks to the character mind. These modifications result in the creation or deletion of goals, acts and behaviors from the tree.

The modification of the ABT may be initiated as a result of any of the following: the success or failure of a primitive act; the failure of a goal because no behaviors are applicable; and the firing of a success test or context condition. Once a particular behavior step succeeds or fails, this may result in the propagation of the success or failure up the ABT causing other behavior steps to succeed or fail, depending on the relationship between the initial behavior step that has succeeded or failed, and those above it in the ABT.

We now describe the processes that modify the ABT based on success or failure of a behavior step in the tree.

Figure 9:
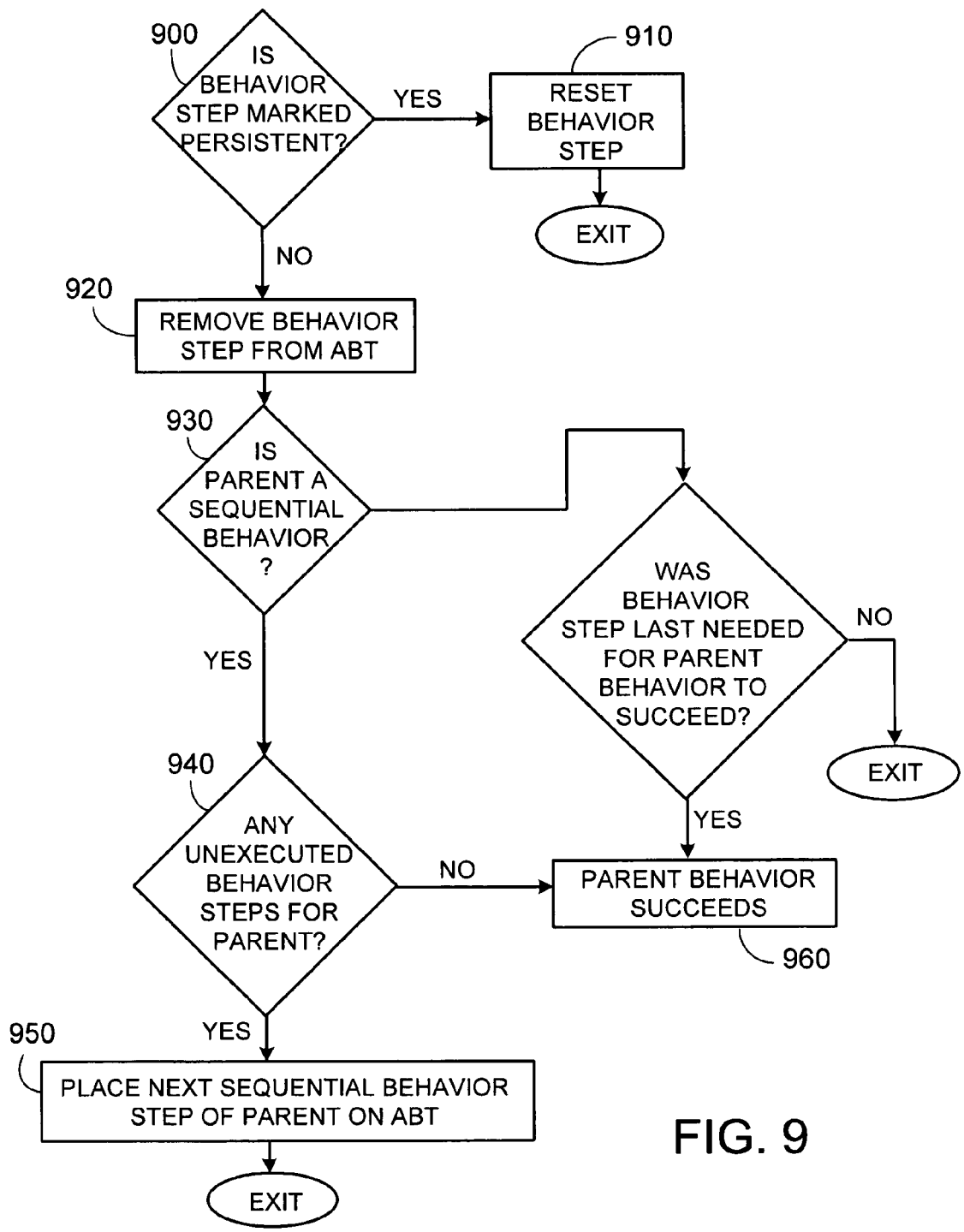

Referring now to FIG. 9, the success of a primitive act (from the execution of a mental act or from an ActSucceeded or AboutToEnd callback for a physical act) or firing of a success test causes the following to occur. First, if the behavior step is marked persistent or (persistent when_succeeds) (step 900), then the behavior step is reset (step 910). The process of resetting a behavior step is described in more detail below.

If the behavior step is not persistent, then it is removed along with any of its children (step 920). (If an executing act is removed, it is aborted.) If the parent behavior is a sequential behavior (step 930), then it is determined whether there are any un-executed behavior steps for the parent behavior (step 940). If yes, then the next behavior step of that behavior is placed in the tree as its child (step 950). If there is no next behavior step, the parent behavior succeeds (step 960). If the parent behavior is not a sequential behavior then nothing is done beyond removing the behavior step, except to test whether the behavior step was the last needed for the behavior to succeed (step 970). (This is the case if num_needed_for_success behavior steps not marked optional have been removed. Num_needed_for_success is the value specified by the behavior's number_needed_for_success annotation if present. Otherwise, it is set to the number of behavior steps in the behavior that are not marked optional. This is equivalent to succeeding if there are no remaining behavior steps, if there are no remaining behavior steps that have not been marked optional, or if N behavior steps that aren't marked optional have been removed and N or fewer behavior steps are needed for success due to a number_needed_for_success annotation in the behavior). In the just-completed behavior step was the last needed for the behavior to succeed, the behavior is caused to succeed (step 980).

Figure 10:
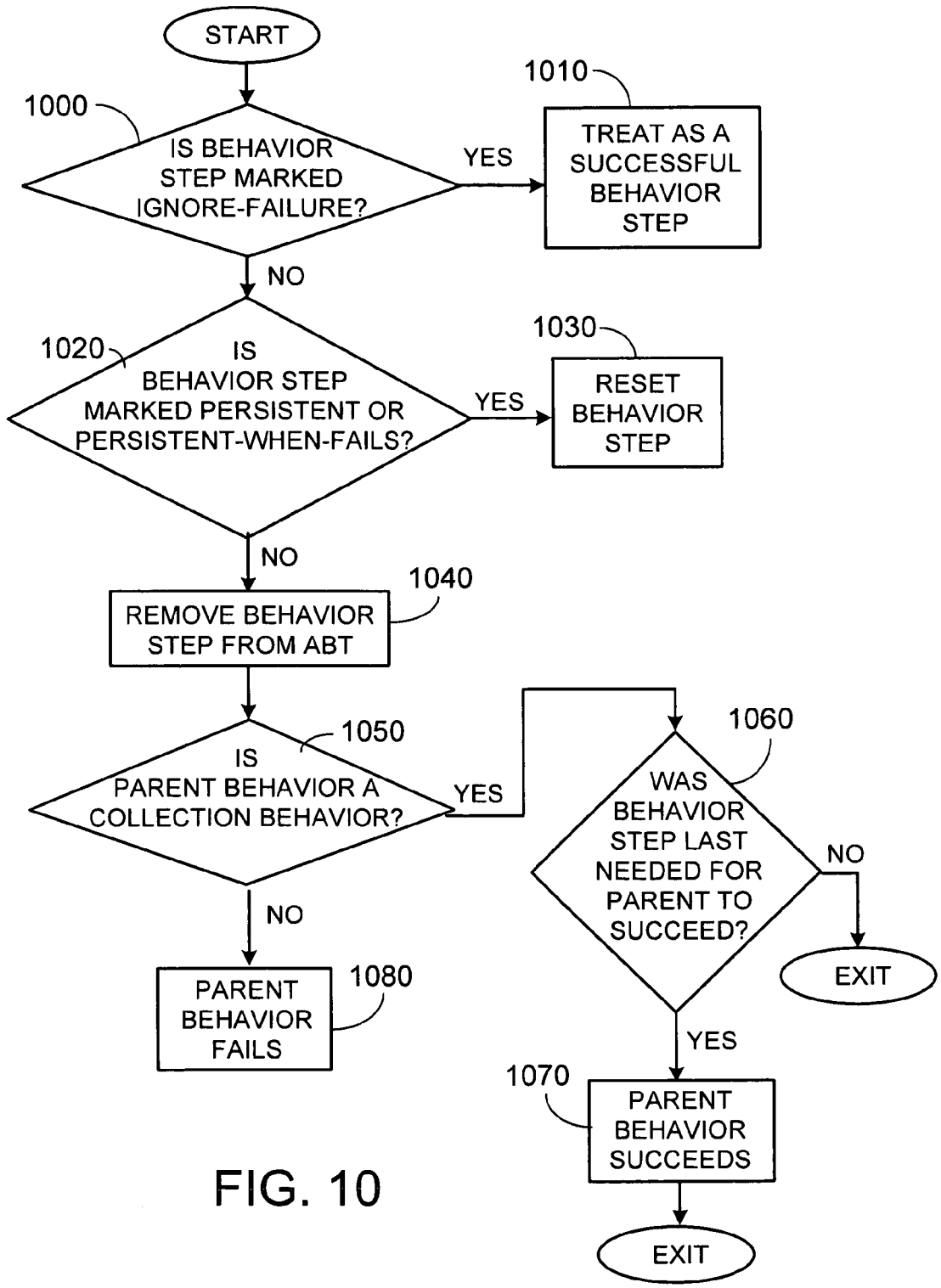

Referring now to FIG. 10, the following occurs when a behavior step fails. If the behavior step is annotated with ignore_failure (step 1000), then the behavior step is treated as having succeeded, and the steps of FIG. 9 are performed instead (step 1010). Otherwise, if the behavior step is annotated as persistent or (persistent when_fails) (step 1020), then it is reset (step 1030)so that it is available to be pursued anew.

If the behavior step is not persistent or persistent when_fails or marked ignore_failure, then it is removed along with any of its subtrees (any removed act that has previously been issued to the MSM is aborted) (step 1040) and the type of the parent behavior is tested (step 1050). If the parent behavior is a collection behavior, then failure of any behavior step is treated the same as success of a behavior step, so the same effects occur as above when a behavior step succeeds in a collection behavior: it is determined whether the behavior step that failed was the last behavior step need for the behavior to succeed (step 1060). If it was, then the behavior is caused to succeed (step 1070). If the parent behavior is not a collection behavior, then the parent behavior is made to fail (step 1080).

Whenever a behavior succeeds it causes its parent goal to succeed.

Whenever a behavior fails, that behavior is added to the list of failed behaviors for its parent goal, and the behavior is removed from the ABT along with any of its subtrees (any removed act that has previously been issued to the MSM is aborted). The recorded information is used to ensure that each behavior is attempted at most once per goal (unless that goal is reset).

Figure 11:
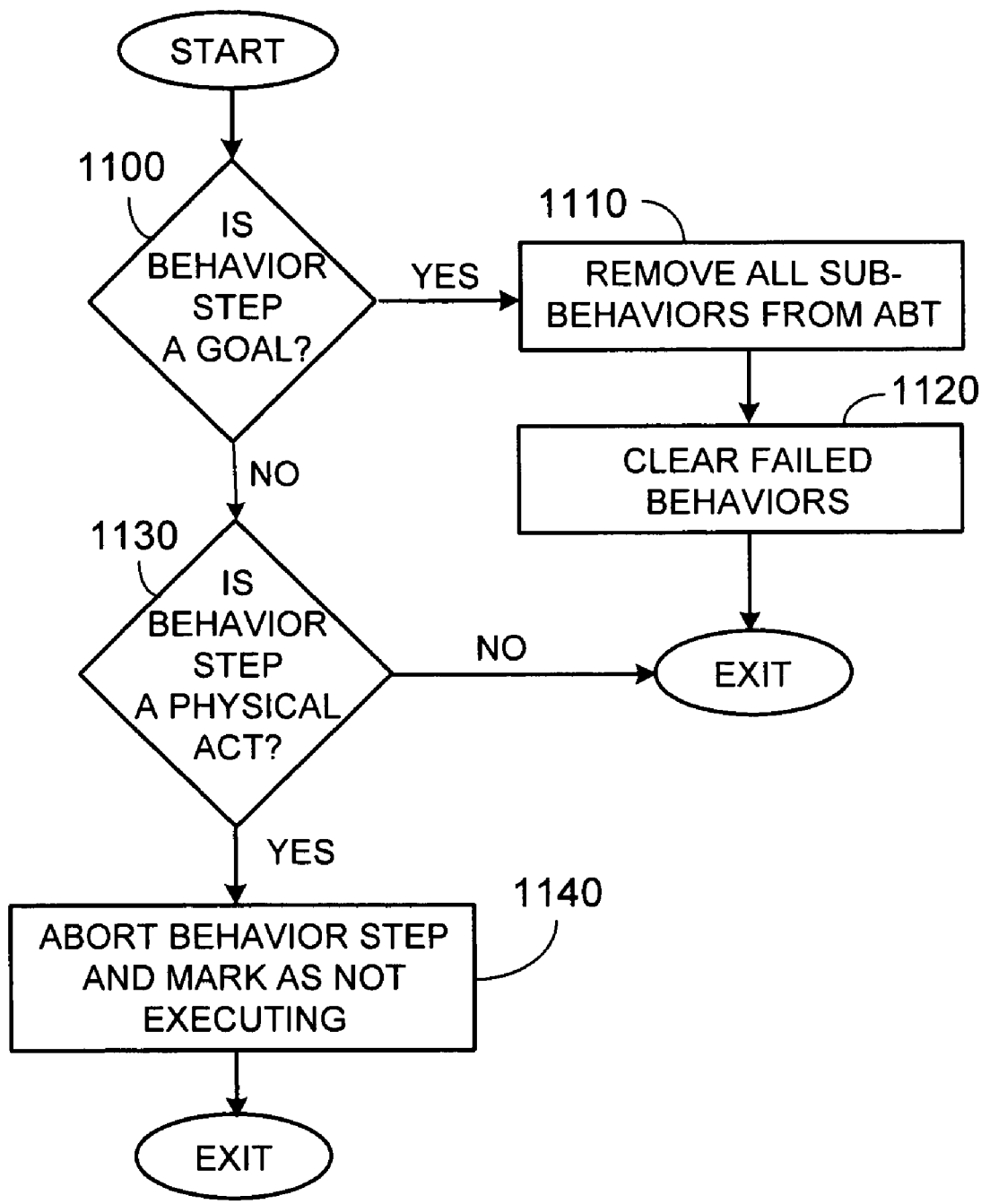

Referring now to FIG. 11, the following occurs when a behavior step is reset. First, it is determined whether the behavior step is a goal (step 1100). If it is, then any behavior that is currently pursuing this goal is removed from the ABT (step 1110). The entails removing the behavior and any subtrees it may have, and aborting an acts that are removed. Then, the record of failed behaviors for the goal is cleared (step 1120).

If the behavior step being reset is a primitive physical act (step 1130) the act is aborted if it is executing and marked as not executing (step 1140). If the behavior step is a primitive mental act nothing is done. (A primitive mental act executes atomically, so it is never marked as executing.)

Removing any node from the ABT causes all of the children of the node to also be removed. Nothing else is done unless an executing act is included in the removed nodes. For any executing acts that are removed, an abort request is sent to the MSM to abort the act. (An abort request may or may not be successful. When not successful, the fact that the act is executing is recorded for use by the character mind's conflict mechanism to create the correct dependencies when issuing acts.) Removing a behavior causes its parent goal to become a leaf goal of the ABT. As with all leaf goals, it is then available to be chosen for execution that can result in another behavior chosen to pursue it.

2. Updating Suspensions

When the character mind updates suspensions, the set of available goals and acts is updated by adjusting which goals and acts are marked suspended and which are not. This process uses the information about goals and acts that conflict as specified in the character mind. No two behavior steps that conflict are allowed to execute at the same time. The character mind enforces this property by marking appropriate nodes in the ABT as suspended. A behavior step (goal or act) (and any subsidiary nodes) is marked as suspended when a conflicting behavior step with a higher priority is executing. Acts are considered executing if they have been sent to the MSM to be executed. Goals are considered executing if they have been expanded with a behavior, that is, if they are not a leaf goal, and they are not suspended. Behavior steps may also be marked suspended because of conflicting behavior steps with an equal priority. For conflicting behavior steps with equal priorities, whichever is chosen to be executed first is allowed to execute, and the other is marked as suspended. Behavior steps marked as suspended are unmarked whenever the behavior step that caused them to be marked is removed from the tree for any reason. They are then available to be pursued, unless they are re marked as suspended because of another conflicting behavior step.

If an executing act is suspended, the character mind sends an AbortAct message to the MSM. If the act cannot be aborted (i.e. AbortAct returns false), the character mind still considers it as suspended, but remembers that it is executing for purposes of creating the pending acts list when issuing any new acts.

3. Step Arbiter

Figure 12:
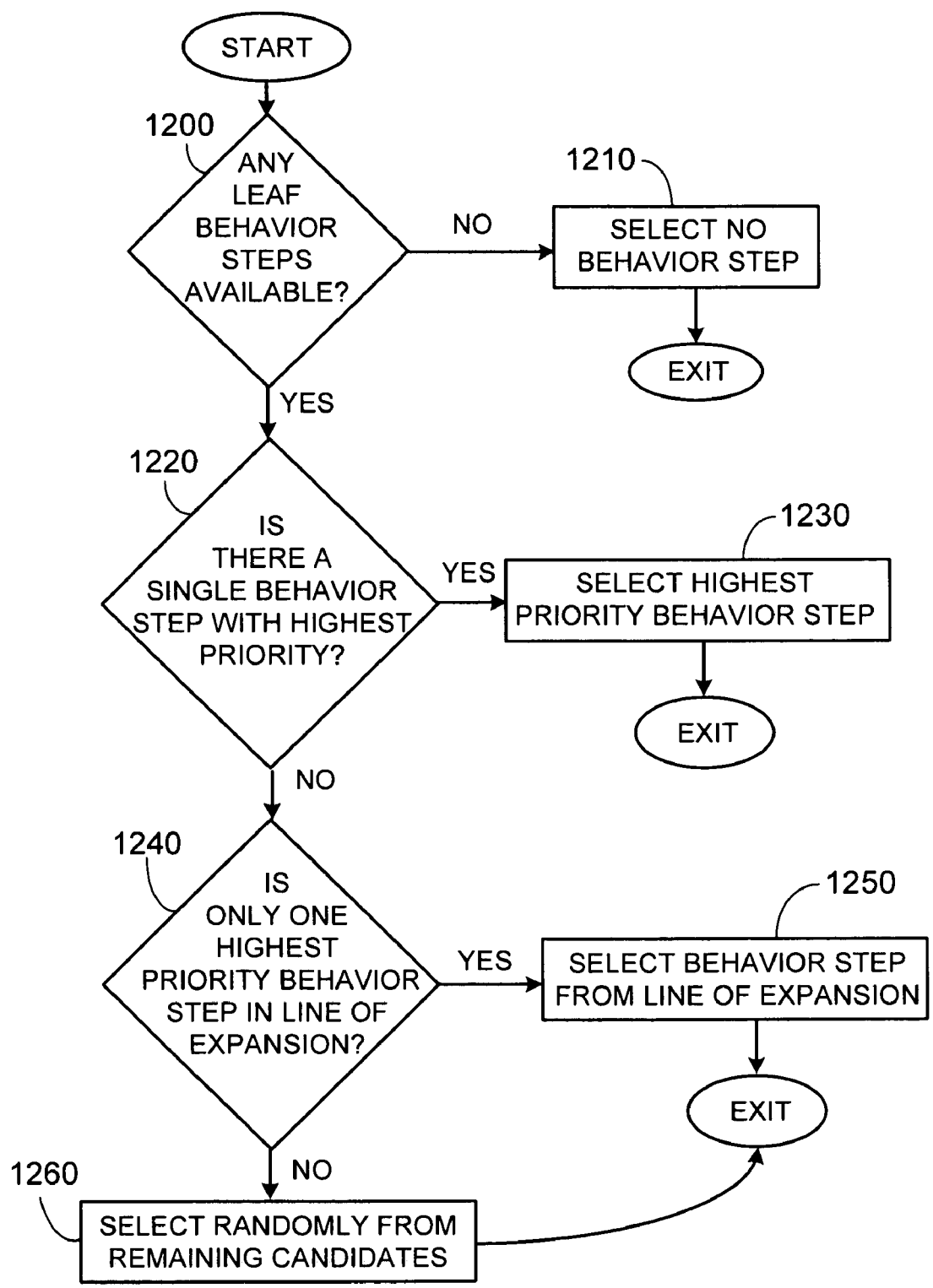

We now describe the execution process of the Step Arbiter. Referring now to FIG. 12, first, the character mind only chooses from leaf behavior steps that are available to be executed, that is, all leaf mental acts, leaf physical acts that have not been sent to the MSM for execution, and leaf goals that are not marked suspended (step 1200). If there are no available leaf behavior steps available to be executed, the step arbiter returns with no behavior step chosen (step 1210). Otherwise, of those available leaf behavior steps, the character mind determines if there is a single behavior step having the highest priority (step 1220). If so, that behavior step is selected (step 1230). If there are multiple behavior steps having the highest priority, then the character mind determines if there is a single behavior step among those highest priority behavior steps that is in the current line of expansion (i.e., is a descendant of a recently pursued goal) (step 1240). If so, then this behavior step is chose (step 1250). This helps to maintain a sense of focused purpose to an interactive character's activity, rather than having it switch from behavior to behavior without reason. Specifically, this choice is accomplished by recording at each concurrent or collection behavior the last goal that was pursued from this behavior. Leaf goals that are descendants of this goal are preferred over descendants of other goals in the concurrent behavior. When that goal finishes, all of the remaining behavior steps of this concurrent behavior compete on equal footing again.

Considering those behavior steps of highest priority, if multiple leaf behavior steps are in the current line of expansion, or if there are no leaf behavior steps in the current line of expansion, then a behavior step is chosen randomly from among the remaining candidates (those from the current line of expansion if any exist, otherwise, the complete set of those with highest priority) (step 1260).

4. Executing a Behavior Step

Once a behavior step has been chosen, it is executed. Each type of behavior step has its own method of execution.

A primitive physical act is sent to the MSM to be executed using the IssueAct function. A pending list is created for that act and included in the call to IssueAct. The pending list includes any previously issued acts for which the character mind has not received an ActFailed or ActSucceeded callback and that have not been successfully aborted, and for which one of the following three properties hold: (1) the act being issued and the previously issued act conflict; (2) ancestors in the ABT of the act being issued and the act previously issued conflict; or (3) the previously issued act and the act to be issued have a common ancestor that is a sequential behavior or the derived inline sequential construct. That behavior step node is then unavailable to be chosen while the act is executing.

A primitive mental act is executed by simply performing it. (This actually takes the form of evaluating arbitrary code, and thus can affect any part of the state of the character mind.)

A subgoal is executed by choosing a behavior for it. The behavior is chosen from those for this goal by the behavior arbiter (described below). The chosen behavior is added to the active behavior tree as the child of the goal. The behavior steps of the behavior are written as children of the behavior and are themselves then available to be chosen to be executed the next time through the character mind's execution loop. All of the steps are written in the ABT for a collection or concurrent behavior. The first step is written for a sequential behavior.

Whenever a behavior step or behavior is added to the ABT (during behavior step execution or any other time), any sensors in any success tests or context conditions (fail-whens) associated with that behavior step or behavior are turned on by a call to the selective sensing module. The effects of these calls are described in update sensors above. Similarly, whenever a behavior step or behavior is removed from the ABT, the associated sensors are turned off by a call to the selective sensing module.

Figure 13:
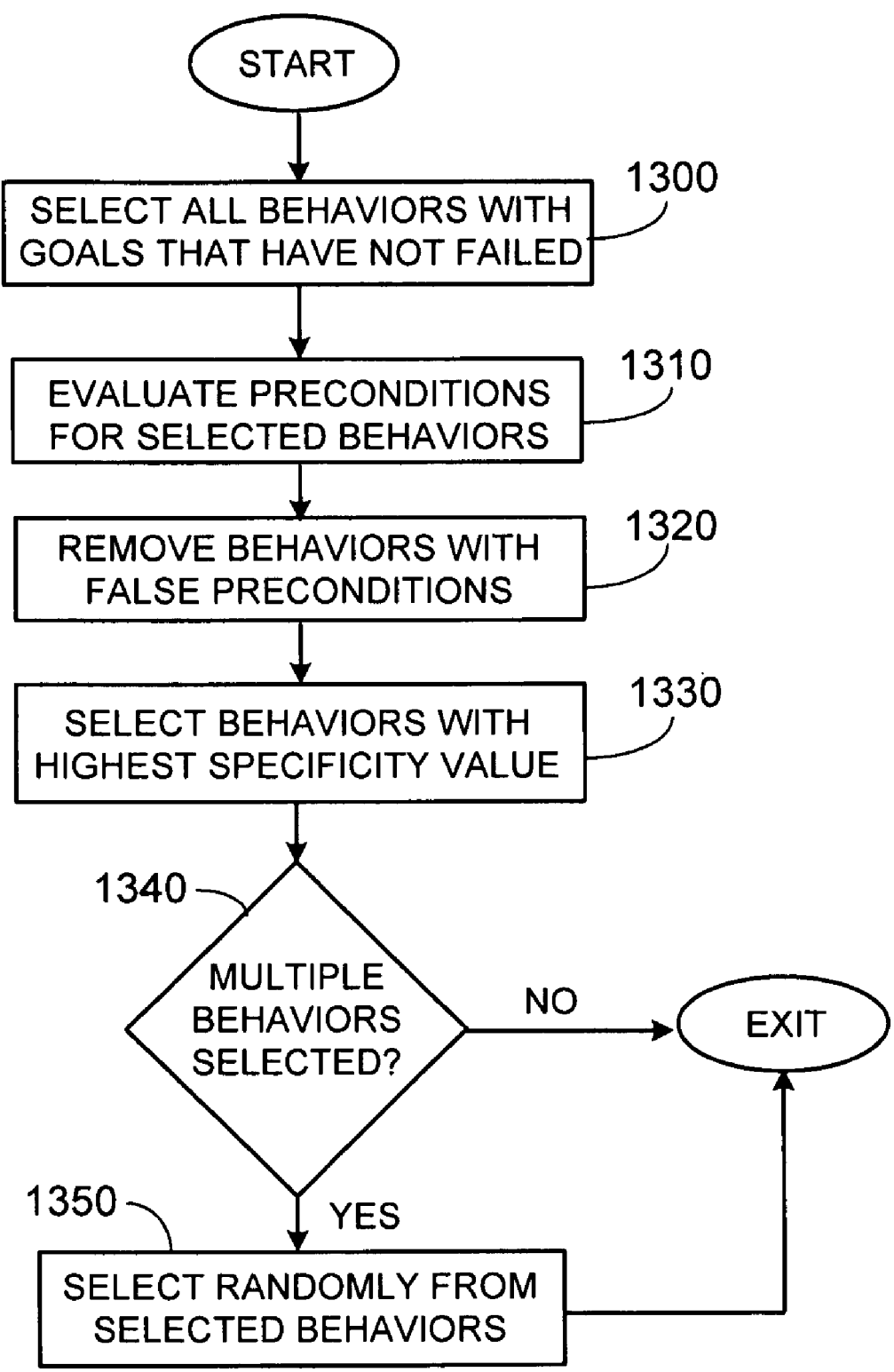

The method by which an exemplary behavior arbiter chooses a behavior for a goal is shown in FIG. 13. First, all of the behaviors associated with the goals that have not already failed for this instance of the goal are selected (step 1300). The preconditions for all of these possible behaviors are then evaluated (step 1310). This is done by first turning on all sensors associated with the preconditions by calls to the selective sensing module; then running the RETE network for the character mind to evaluate those preconditions; collecting the results; and finally turning off the sensors associated with the preconditions. Any behaviors with false preconditions are removed from consideration (step 1320). Of the remaining behaviors, those behaviors having the highest specificity value are selected (step 1330). If there are multiple behaviors remaining, (i.e. ones with the highest specificity values that have not failed for this goal and having appropriate preconditions) (step 1340) the character mind chooses randomly among them (step 1350).

II. Selective Sensing Module

We now describe in more detail the operation of an exemplary selective sensing module 230. The selective sensing module is composed of a collection of sensors and a list of sensor instances that are currently on. The list of sensor instances is initially empty.

Each sensor is composed of a procedure and the types of arguments to the sensor.

A sensor instance contains a pointer to a sensor, values for each sensor argument, callback functions for creating, modifying and deleting WMEs in a character mind for the sensor, and a storage location for the value returned by the callback function for creating a WME.

The procedure of a sensor encodes the process of accessing data structures in the interactive character system to gather the needed information of the system. This process can be modified by the arguments to the sensor. After gathering the information, the callback functions are used to transmit the collected information to the character mind. The callback function for creating WMEs is called the first time this sensor instance is executed, and the callback function for modifying WMEs is called for each later execution. The callback function for creating WMEs returns a value that is stored in the sensor instance and passed as an argument to the callback functions for modifying and deleting WMEs whenever they are called. This value is typically a pointer to the created WME, but can be any other useful data structure, e.g. a list of created WMEs.

Sensor activation requests from a character mind contain a reference to a sensor, values for any arguments to the sensor, and function pointers for the three callback functions.

For each such request, the selective sensing module will create a new sensor instance by storing the information included in the request in the list data structure, or return a pointer to an existing sensor instance if an identical one exists in the list. The shared sensor instances are reference counted to enable proper deletion. Sensor deactivation requests contain a pointer to a sensor instance. For each sensor deactivation request, the reference count is decremented, and if the reference count reaches zero, the sensor instance is removed from the list in the selective sensing module. Prior to removal, the callback function for deleting WMEs is called for the sensor instance being deactivated in order to remove any created WMEs that need to be deleted.

As described above, sensor expressions are associated with success tests, context conditions and preconditions, and the sensors that they denote are automatically turned on and off. This turning on and off happens during the propagation of success and failure and the execution of goals.

For example, a location-of-character sensor might be defined to have a single argument, of type character body. The procedure of this sensor might be defined to look in the data structures that specify a character body's location in the world, find the character body specified in the sensor's argument, and get it's (x, y, z) location. If the procedure is called with a flag to indicate it is in make mode, it would then call the callback function for making a WME with the (x, y, z) location that it computed and return the result of that callback function. If it is called with a flag to indicate that it is in modify mode, it would then call the callback function for modifying a WME with the (x, y, z) location.

Such a sensor could be used to selectively monitor the locations of any characters in the world.

A sensor instance for this sensor would contain a pointer to the character body of interest, and three callback functions. Typical callback functions are the following. The callback function for making a WME might create a WME that contains a pointer to the character body and the (x, y, z) location that it is called with, and then return the created WME. The callback function for modifying the WME might compare the new location passed into the callback function with the location stored in the WME. If it is different enough, e.g. the distance is larger than 0.5 inches, then it modifies the WME with the new information. The callback function for deleting the WME deletes the WME.

Using this sensor and these callback functions, a character mind may create success tests, context conditions or preconditions that monitor the locations of one or more character bodies in the world. Consider for example a success test that tests whether another certain character (B) is near this character (A). The success test is a fragment of code in the behavior. The fragment would include the type of the sensor used ("location-of-character"), the character that is being tested against (B), and references to the three callback functions (those that Make, Modify, and Delete the "location" WME). The fragment also includes the sensor match expression, which in this case tests that the location of A is close enough to the location of B. The location of B, (x, y, z) as above, is the information that is stored in the "location" WME created and modified by the sensor.

Monitoring of changes by sensors is filtered, so that the character mind is only notified of "meaningful" changes in what is being sensed. (In the case of a character location, for example this may entail reporting only changes in location over 0.5 inches.) This reduces overhead in the character mind, which doesn't have to process all of the minute changes in location that might occur each frame. This notion of "meaningful" can be tailored to the needs of the associated condition or test by using a different callback function for modifying the WME.

A typical interactive character system contains many similar sensors and sensor instances. In the preferred embodiment, there are sensors for orientation of a character body, acts a character is performing, direction a character body's eyes are facing, etc.

III. Motor and Speech Module

We now described the MSM in more detail. The primary function of the MSM is to take the stream of overlapping or partially overlapping acts that are issued (and sometimes later aborted) by the character minds, and produce motion and speech to execute these acts in the style and personality of the character. It is desirable for this motion and speech to have both high artistic quality and nuances of linear animation and recorded speech, while at the same time being general enough to handle acts in a variety of different situations in which they may occur. Thus, the MSM should be able to process an act regardless of the state of the character body when the act starts (e.g. the character body could be in a standing position, in a crouched position or in any other position when starting a turn act), or the argument values to the act itself, or the range of other acts that may be arbitrarily overlapped in time with the act in question.

In addition to carrying out acts at the request of a character mind, the MSM provides feedback to the character mind about the progress of acts to enable the character mind to do its functions.

As shown in FIG. 2, the MSM 220 receives IssueAct commands from the character mind indicating acts to be executed. The Issue Act command may also specify timing dependencies in the form of a list of other acts that must complete before the specified act starts executing. A character mind can request that an act that was previously sent for execution be aborted using the AbortAct command.

As also indicated in FIG. 2, the MSM 220 sends information to the character minds when acts fail, succeed or are about to complete. It also notifies the character mind when a request for an act to be aborted cannot be fulfilled.

The movement and speech output of the MSM 220 is produced on a frame-by-frame basis. For each frame that is drawn by the interactive character system, the MSM 220 sends values to each character body that specifies its current pose. It also sends sound data for speech produced to the audio queues. The MSM 220 is composed of three principal components: the Warper Blender system (WB), the Sound Manipulation System, and acts built using these systems.

This section first describes how the MSM uses the WB to change the physical appearance of a character to produce animation. We then extend the description to describe how acts that produce speech and acts that produce speech and animation are processed using the WB and the Sound Manipulation System. Acts that produce sound effects, for example, adding footstep sounds to a walking act, may be processed in a similar fashion.

A. The Warper Blender System

1. Overview of the Warper Blender System

Figure 14:
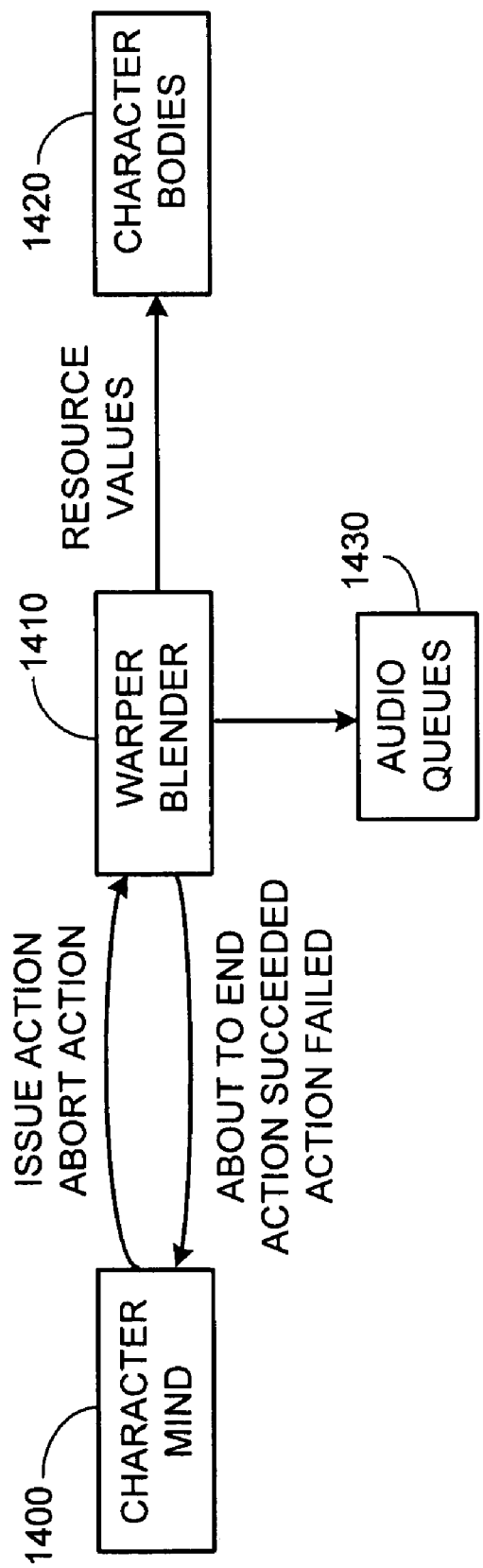
FIG. 14 shows elements of an exemplary interactive character system.

Referring now to FIG. 14, the WB 1410 receives acts from a character mind 1400 and translates those acts into physical motion by the character body 1420 or into speech sounds that are placed on audio queues 1430. A typical act that the WB system might process is "Jump to a certain location." As noted above, if there is more than one character being supported by the system, the warper blender will receive acts from each character mind 1400 and creates physical motions for each character body 1420.

Figure 15:
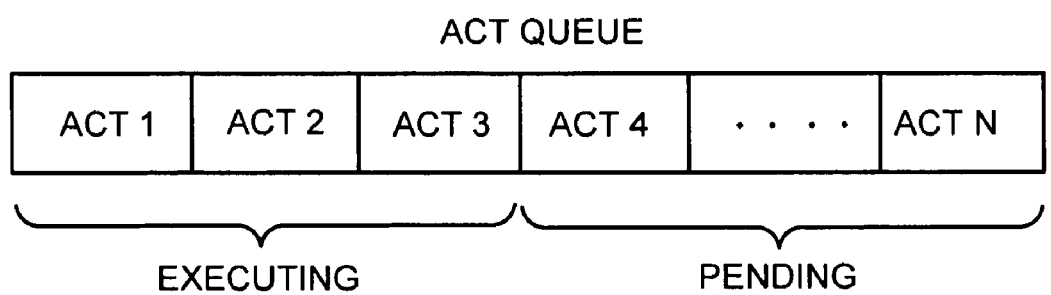
FIG. 15 shows an exemplary act queue.

Referring now to FIG. 15, when the WB receives an act from a character mind, it is placed in a single data structure called the Act Queue 1500 Aborted acts are removed from the Act Queue. The WB also reports to the character mind from which an act was received the progress and results of the act as it is executing. In particular, the WB may report to the character mind that an act has succeeded, has failed or is about to end.

An act is issued by a character mind with a set of arguments. For example, a jump act might take the location to be jumped to, the height of the jump, and the duration of the jump.

At any given time, some of the acts in the Act Queue are executing, which means they are currently controlling some aspect of a character body or speech. Other acts may be pending, which means they are scheduled to execute in the future. When an act has finished, it is removed from the Act Queue. This may cause one or more of the pending acts to begin execution.

A character body includes a set of resources that are used to control the movement of the character. For example, typical resources present in a preferred embodiment of a character body are translate-x, translate-y, and translate-z, which together determine the location of the character's body.

The resources of a given character are grouped into Bundles. A Bundle is a set of resources that typically control a given portion of the character's body. For example, the "neck bundle" would include the resources that control the neck of the character body. An Act controls the resources of one or more bundles of a character.

Figure 16:
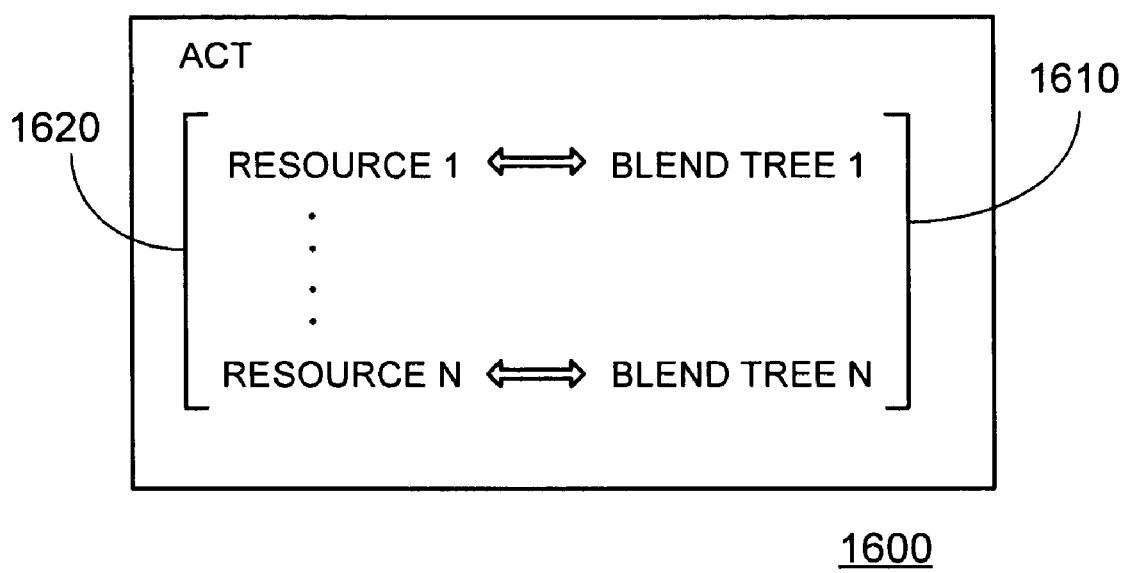
FIG. 16 shows an exemplary act.

Referring now to FIG. 16, an act 1600 that is executing contains a set of blend trees 1610 one for each resource 1620 in the bundles that the act controls. A blend tree is a data structure that the Warper Blender uses to represent a function that controls a single resource. This function is sometimes called a resource curve. The blend tree is a function of time that returns the value of the resource at that time as output. The tangent of the curve can also be calculated. The WB uses Blend Trees because they are a composable structure (i.e., a blend tree can be combined with other blend trees to produce a composite function for generating resource values) that are easily defined, easily modified, and easily combined with other blend trees.

Figure 17:
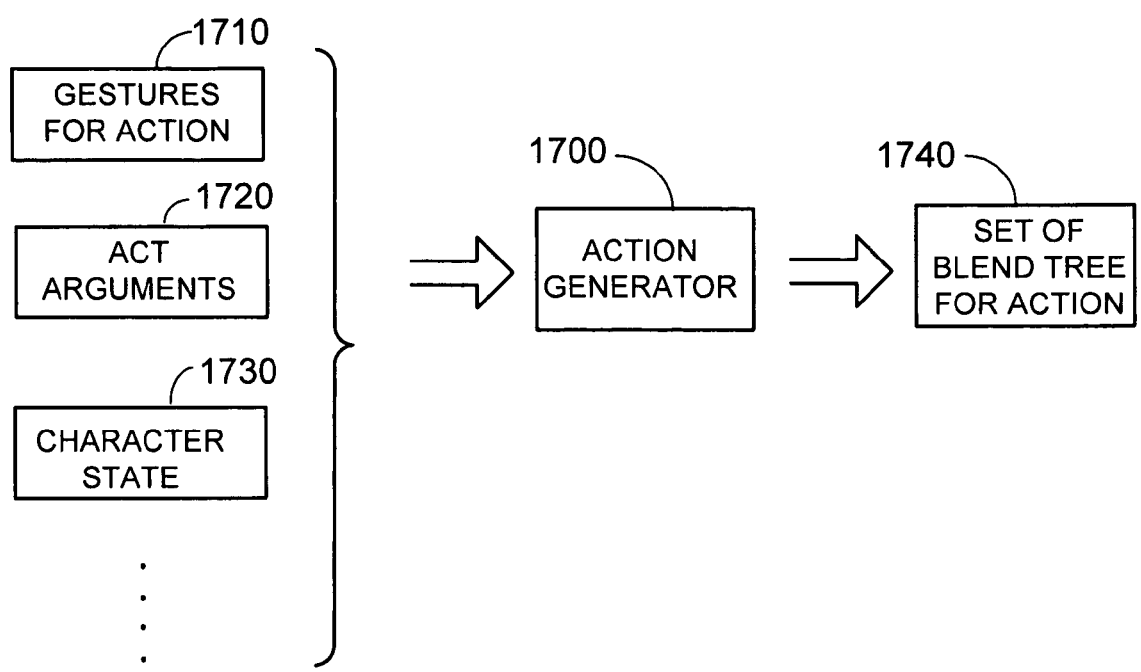
FIG. 17 illustrates the operation of an exemplary act generator.

The blend trees for an executing act are created when the act starts executing. Referring now to FIG. 17, when an act starts executing, a piece of code called the act's Generator 1700 is run. Each act has one generator that is created by the author of the interactive character. The Generator has zero or more gestures 1710 associated with the given act.

Generally, Gestures are hand-drawn curves (functions) that describe the values of set of resources over time.

The Generator takes as arguments: the arguments 1720 to the act (as it is called from the Character Mind), the current configuration of the character 1730, and a few other arguments described in more detail below.

Using this information and the gestures, the Generator creates a set of blend trees 1740, one for each resource that the act controls. The blend trees are created to match up with the characters previous acts; in particular, its current resource values. The idea is to make a smooth transition from old acts to new acts, while preserving the artistic integrity represented by the gestures.

We now describe particular elements of the WB in more detail.

2. Resources and Bundles

The graphical appearance of each character body is instantaneously controlled by the WB using a set of controls called resources. Each character body has its own set of resources specific to the way that character body can move. Each resource controls one aspect of one element of a character body, for example the x-rotation of the head. Together these resources can be used to determine the character body's location and orientation in the simulated world.

In addition, each character body specifies a list of bundles. Bundles represent groups of resources that should be controlled together by a given act. Each bundle specifies one or more resources that are in that bundle. Every resources is in one and only one bundle. An example bundle is the HeadBundle that contains the resources head-rotate-x, head rotate-y and head-rotate-z.

At any given time, each resource has associated with it a value and a tangent. The value is calculated from the Blend Tree that currently controls the resource. The value of the resource determines the location or angle of some part of the character body. For example, head-rotate-y determines the rotation of the head about the y-axis. The Tangent is slope of the resource curve at that time and is calculated from the Blend Tree as well. As the Warper Blender calculates each of these values and tangents, it stores them for future reference.

In each bundle, a control queue is kept. A control queue is an ordered list 6f acts that is used for managing which act controls the bundle. The act at the head of the list is the one currently controlling the bundle, and the ones further in the list are all of the current acts that can control the bundle, if the opportunity allows, in a precedence order determined by their priority.

3. Gestures

Part of the authoring process for a character may include creating "canned" animation segments for the character (e.g., by keyframe animation or motion capture) that may be modified by a generator to generate motion for a specific situation. We refer to such segments as "gestures." A gesture is an annotated, coordinated act for a single character body. It consists of motion curves (discretely sampled or cubic interpolating/blending scalar-valued functions of time) for each resource in an explicitly specified subset of the bundles defined for the character body, plus timing information about the various phases of the motion. An example gesture file for a jump gesture expressed in pseudo-code is:

```
;; the name of the gesture being defined is OttoJump
(gesture OttoJump
    ;; First comes the phases, which are named moments of time
    ;; that can be referenced by the generator
    :phases '(("start" is at 0 seconds) ("squash" is at .20 sec)
            ("takeoff" is at .30 sec) ("apex" is at .38 sec)
            ("touchdown" is at .46 sec) ("absorb" is at .52 sec)
            ("return-to-neutral" is at .80 sec))
    ;; Next come the motion curves.
    ;; Each resource the act controls has a curve that specifies the
value
```

-continued

```
;; of that resource at any time. The tangent at that time can
;; also be derived from the curve. For convenience, resources
      ;; are organized by bundle.
 :motion-curves
      (list
         body-bundle    ; name of resource bundle ("body-bundle")
           (list          ; list of resources in "body-bundle"
             ;; this is the curve data for each resource
             ;; in the "body-bundle"
             (foot-pos-x . (<cubic-bezier cubic curve data ...>))
             (foot-pos-y . (<cubic-bezier cubic curve data ...>))
                 ...
             ;; Curve data for all "body-bundle" resources
                 ;; is listed here
           )
         neck-bundle    ; next bundle is "neck-bundle"
           (list          ; list of all resource curves
                 ...      ; in "neck-bundle"
           )
         head-bundle    ; final bundle controlled by act
           (list          ; list of all resource curves
                 ...      ; in "head-bundle"
           )
      )              ; end of list of motion curves
 )                   ; end of gesture
```

OttoJump is a gesture that specifies a fixed movement for the character Otto jumping into the air and landing. The gesture includes both anticipation (squashing down before the jump) and follow-through (landing after the jump).

A gesture file has several parts. The first part is the name of the gesture—in this case "Otto Jump".

The second part is the description of the phases of the gesture. The phases give symbolic names to particular points in time of the jump. For example, "apex" refers to the moment that Otto is at the highest point of the jump, while "touchdown" refers to the moment when Otto first hits the ground. Phases are specified in seconds. By naming particular moments of the gesture, the generator can more correctly coordinate the modification of the motion. For example, the generator might extend only the portion where Otto is in the air, which happens between "takeoff" and "touchdown".

The third part of the gesture file is the actual data curves that define the values of the resources. For each resource (e.g., "foot-pos-x" or the x position of the foot), there is a curve that represents the value of that resource over the time of the gesture. Every resource that the act controls has such a curve. For convenience, they are arranged by bundle. For example, "foot-pos-x" is contained in the "body-bundle".

This timing information about phases of the motion is used by the generator to coordinate the modifications to the motion. An example of this is given in the next section.

4. Motion Warping

We now present a technique that may be utilized by the WB to modify a gesture. We refer to this technique as motion warping. Motion warping gives a useful means of adapting gestures to a variety of situations. In a preferred embodiment, two types of motion warping are possible: time warping and space warping.

Time Warping extends or contracts the timings of whole gestures and alters the relative timings of the phases within a gesture.

For example, if a character had associated with it a jump gesture that made the character body jump 1 meter high, it might be desirable for a generator to modify the gesture to make the character body jump two meters high, which would entail the character body being in the air for a longer time. Extending the duration of the time the character body is in the air may be accomplished by applying an identical Time Warp to all the motion curves in the gesture that elongates the in-air phases in time. (Note: in order to completely modify the gesture to achieve the desired jump trajectory, the generator would also have to apply a space warping to achieve the greater height of the jump.) For instance, using the "OttoJump" example of the last section, we could associate the following temporal displacements with each of the phase-times, fit a smooth spline or linear curve through them, and wind up with a mapping from simulated (animation) time to gesture-time (the timings used in the gesture motion curves) that proceeds along the gesture motion curves in the proper manner.

```
;; Temporal displacements are specified by giving a time displacement
;; for ach named phase in the gesture. In this example, the time
;; of the "touchdown" is specified to move ahead by .16 seconds.
;; Likewise, the time of the "squash" remains the same, since the
;; value given is 0 seconds.
     :time-displacements '(("start" displaced 0 seconds)
                           ("squash" displaced 0 sec)
                           ("takeoff" displaced 0 sec)
                           ("apex" displaced .8 sec)
                           ("touchdown" displaced .16 sec)
                           ("absorb" displaced .16 sec)
                           ("return-to-neutral" displaced .16 sec))
```

Each time warp takes a curve to be timewarped and a list of temporal displacements to specify the timewarp. The displacement curve is a function of time that specifies for each moment in time how far ahead (positive values) or behind (negative values) to displace time. A displacement curve is created by fitting a spline or linear curve through these displacement points. Using this information, the value and tangent of the time-warped curve is computed for any time t by first computing a displacement value from the displacement curve, subtracting that value from t to get t', and evaluating the original curve to be timewarped at t'.

Space warps are used to modify the values of a resource over time. The modification is specified by a list of target points for the resource. Each target point is a (time, target-value) pair, which means the warped curve should have that target-value at that time'.

A list of displacement points is derived from the target points. The displacement point has as its value the difference between the target-value and the original curve's value at that time. For example, if there were a target point (2 seconds, 3.0 meter) and the original curve's value at time 2 seconds were 1.0 meter, then the displacement point would be (2 seconds, 2.0 meters).

A displacement curve is created by fitting a smooth interpolating curve through the displacement points. The space-warped value at any time is the sum of the original curve's value at that time and the displacement curve's value at that time.

5. Textural Noise Insertion

Another mechanism that may be used in the WB for producing generalized motion is textural noise insertion. Textual noise is a C1 continuous stream of pseudo-random noise values that fall within some maximum amplitude and frequency distribution, and that can be continuously looped. These can be useful for directly providing motion for some resources, for example a continuous small movement of a character's body when it is uncontrolled by the character mind. Also, it can be added to existing curves using mechanisms described below, for example to give small motion during a frozen pose at the end of an act to give the same effect as a moving hold in traditional animation.

The base signal of a Textural Noise function may be constructed by picking n random values distributed over some range, and place them at equal distances along some sampling interval, finally fitting an interpolating spline through them, adding the first sample again at the end so that the pattern can be repeated continuously.

The textural noise function may be constructed by adding multiple period and amplitude scaled versions of the base signal together. For instance, the period scaling and amplitude scaling could both be set to ⅓, in which case the result at time t would be:

Base_Signal(t mod theta)+⅓ Base_Signal(t mod (theta/3))+⅑ Base_Signal(t mod (theta/9))+ . . .

The complete textural noise function may be created by evaluating a finite number of the terms of this infinite summation.

6. Blend Trees

We now describe the structure and operation of blend trees. As noted above, blend trees are data objects that generate resource values and tangents over a range of time values. By displaying a graphical image (e.g., a portion of a character body) over a sequence of time frames based on the values and tangents produced one or more blend trees, the system may animate the image to perform a particular act.

In a preferred embodiment, it is desirable that blend trees have the following two properties:

1. They represent continuous, scalar-valued functions of time
2. They are able to incorporate changes to future motion resulting from changes in the world.

Blend trees may be implemented as objects in an object oriented language such as C++. Each blend tree defines a scalar valued function of time for some time interval by supporting the methods: ValueAtTime, TangentAtTime, and TimeOfPhase. ValueAtTime and TangentAtTime each take a time as their argument and return the value or tangent respectively of the curve specified by the blend tree at that time. TimeOfPhase takes a phase name as its argument and returns the time that phase name occurs in the specified blend tree.

The basic structure of a blend tree is tree graph. The leaves of the tree are primitive functional nodes that generate continuous scalar valued functions of time. The nodes of a blend tree (if there are more than one) may be connected by more complex nodes that act to combine the values produced by the nodes subordinate to them. When a blend tree is evaluated for a given time value, each of the leaf nodes in the tree is evaluated, and these values are then propagated up through the complex nodes of the blend tree. The value of the blend tree is the value of the root node of the tree.

Figure 18:
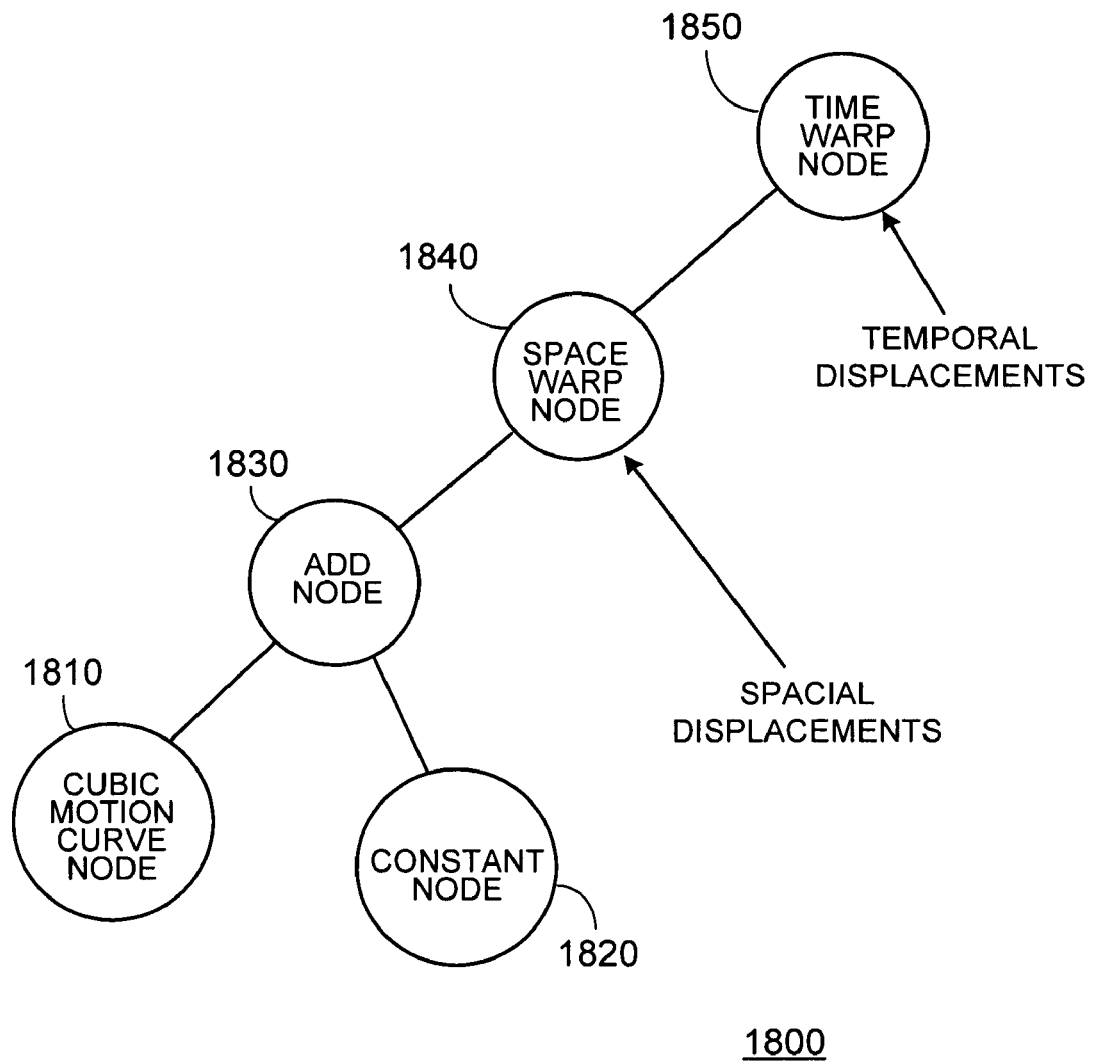
FIGS. 18-19 show exemplary blend trees.

Referring now to FIG. 18, there is shown an exemplary Blend Tree 1800. Blend Tree 1800 includes two primitive blend nodes: CubicMotionCurveNode 1810 and ConstantNode 1820. Each of these generates output values for a range of time values. The CubicMotionCurveNode 1810 generates values based on a particular cubic motion curve. ConstantNode 1820 generates a constant value. These two primitive blend nodes are joined together by AddNode 1830. AddNode 1830 takes the values of its two child nodes, CubicMotionCurveNode 1810 and ConstantNode 1820 and generates, for a given time value, an output that it equal to the sum of the child node values for that time.

AddNode 1830 is a child of SpaceWarpNode 1840. This node takes the values generate by AddNode 1830 and spatially modifies them (i.e., changes the output values at particular times according to a displacement function). This process is described in more detail below. SpaceWarpNode 1840 is a child of TimeWarpNode 1850. This node takes the values generated by SpaceWarpNode 1840 and displaces them in time. This process is also described in more detail below.

As noted above, in a particular preferred embodiment, the basic primitive functional node is a CubicMotionCurveNode. A CubicMotionCurveNode is defined by a list of cubic knots of a particular flavor (Hermite, Bezier, etc.) along with a corresponding list of times at which the knots occur, and a (possibly empty) list of phase names with associated times. CubicMotionCurveNodes are the central element of gestures. Gestures are represented as a list of (resource name, CubicMotionCurve) pairs.

A second example of a primitive functional node that may be utilized in a blend tree is a TexturalNoiseNode. A TexturalNoiseNode is defined by an amplitude, a period, a depth (number of iterations of the recursive generation procedure described above), and a seed value.

A third example of a primitive functional node is an Inverse Kinematics (IK) node. An example IK node generates position values based on the need to track some object in the simulated world, for example making an eye track another object in the world. An example of a complex blend tree node is a SpacewarpNode, which is defined by an existing blend tree and a list of (time, displacement) pairs. Similarly, a TimewarpNode is defined as an existing blend tree and a list in which the displacements are temporal rather than spatial.

ValueAtTime and TangentAtTime for each of these types are implemented as described above. TimeOfPhase in CubicMotionCurveNodes does a simple lookup of the phase time in the included list. For other blend trees, TimeOfPhase recursively accesses phase times in any sub-blend trees and returns those times. TimeWarpNode converts the phase time from the sub-blend tree using the inverse mapping of the timewarp function before returning it.

We now describe in more detail some examples of blend tree nodes. It will be apparent to persons of skill in the art that other blend tree nodes may also be utilized and are within the scope of the invention.

a) The BlendNode

The purpose of a BlendNode is to provide a smooth transition from one blend tree to another blend tree. The BlendNode is a binary operator on other blend tree nodes. We create a BlendNode object between blend trees prev and next by specifying, along with the two blend trees themselves, the start time and duration of time over which the transition from prev to next should occur.

When the BlendNode is queried for its value or tangent before the start time of the transition, it queries and returns the value or tangent of prev. When the BlendNode is queried for its value or tangent at a time after the start time plus duration of the transition, it queries and returns the value or tangent of next.

During the transition interval, it queries the values or tangents of both prev and next. For value, it computes a weighted sum of these values based on the percentage of time in the interval. I.e. if the queried time is twenty percent through the blend interval, then the weighted sum is 0.8 times the value of prev, plus 0.2 times the value of next. The same weighted sum is computed on the angles of the tangents of prev and next.

b) IK Nodes

Some types of acts are best expressed in terms of frame-by-frame calculated inverse kinematics (IK) rather than the kinds of motion primitives we've been discussing. For instance, the act Eye-Track which causes a character body to track some object through time with its eyes, is much easier to animate in terms of the positions of the character body and the tracked object rather than all of the angles in the character body's head/neck and eyes, and because the object being tracked may move in unpredictable ways, this calculation is best computed on a frame-by-frame basis.

In these cases the WB uses task-specific IK Nodes in blend trees. In the preferred embodiment there are two such nodes: IKTrackWithEyes and IKTrackWithHead. These nodes control the 3D orientation but not location of a character body's eyes or head respectively.

Each frame, these nodes get the current values of the character body's resources, and the current location of the object being tracked. Using standard IK computations they compute the target angles of the character's eye or head resources that would point it at the targets.

These nodes each include a local memory of the rotational velocity that the head or eyes moved in the previous frame, and a maximum velocity, acceleration and deceleration is specified by the CharacterMind when issuing the act. Using this information, the angles, are updated to move the eyes toward the target subject to the velocity and direction it was previously moving and the maximum velocity, acceleration and deceleration of the act.

Each of these IK nodes computes values for three resources, but blend trees are defined to only control a single resource. In the preferred embodiment, we duplicate this computation by having an instance of the IK node for each resource. Each instance has its own memory of velocity last frame, so each computation yields the same values. It would be a simple matter to eliminate the duplicate computation, but it has not been necessary for efficiency in the preferred embodiment.

c) Scale Nodes

The purpose of Scale Nodes is to modify existing curves by scaling them.

A ScaleNode scales an entire blend tree by a fixed scale factor. A ScaleNode is defined by a blend tree b to scale, a Scale Factor s and a Scale Center c. The ValueAtTime(time) of the resulting ScaleNode is:

s * (b->ValueAtTime(time)-c)+c

The TangentAtTime of the resulting ScaleNode is:

s * b->TangentAtTime(time)

A Part ScaleNode is used to scale part of a curve by one factor and the other part by a second factor. A Part ScaleNode is defined by a blend tree b to scale, the two scale factors s1 and s2, and the time t at which the scale factor switches from s1 to s2. The resulting blend tree curve is ensured to be continuous by using a scale center for both scales as the value of sub-blend tree b at time t.

d) Addnodes

An AddNode is a blend tree type to add two sub blend trees. When computing values or tangents at a given time, this blend tree simply adds the values and tangents of the two sub-blend trees at the specified time.

e) ConstantNodes

A ConstantNode is a node that always has the specified value, and a zero tangent.

f) FunctionNodes

A FunctionNode is defined by a blend tree and a pointer to a unary function. The node will take the value of the given blend tree and pass it through the function before returning the value.

g) FunctionofTimeNodes

A FunctionOfTimeNode is defined by a unary function. This unary function is treated as a function of time, where the input to the function at the start of the act is 0 and is computed forward in time from there. This would allow the creation of, say, a sine curve.

7. Generators

As noted above, generators are functions associated with an act that generate blend trees for performing the act in a particular context. We now discuss the operation of generators in more detail. Generators are functions that encode how to produce a given generalized motion based on the situation at an instant in time. There is one generator for each act type for a particular character. Generators use blend trees to adapt gestures created for the act (if any) to the current specified situation. They can also create motion without gestures, as in the case of IK acts or the programmatic generation of motion curves and then adapt these motions.

The arguments to a generator are:

1. The parameters of the act.
2. The time at which the act begins, referred to as start time.
3. An optional phase at which the motion produced by the generator should begin, known as the entrance phase. This parameter can be set by transitions (described below) to skip or replace motion from the act to enable a tailored transition between acts.
4. The state of the character body's resources at start time.

A generator returns a list of blend trees. Each blend tree has associated with it the name of the resource it was designed to control.

Generators are built to work with zero or more hand-animated gestures. These gestures are hand-animated to allow all of the nuances and power of hand-animated movement to be present in the generalized movement of the WB. These gestures include annotations to communicate any structure to the generator needed to facilitate the generalization.

Typically a generator will perform the following functions:

1. Use blend trees to modify the gesture blend trees for the parameters of the act.
2. Use blend trees to modify these blend trees for the state of the character body's resources at start time. This is one mechanism that allows a sequence of acts over time to produce a smooth movement for the resources. (Explicit transitions, described later, is another.)
3. Move the blend trees in time so that the generated motion starts at start time. If an entrance phase is specified the blend trees are moved to start at start time minus the TimeOfPhase of the entrance phase. This causes the generated motion from the entrance phase to start at Start Time, effectively skipping the movement from the start of the blend trees movement to the entrance phase point.

The generator process may be further understood by way of the following example.

A jump act may be defined as having the following parameters: Attack, Sustain, Release, X, Y, Z, Height, and Angle. The X, Y, and Z parameters specify the location the character is jumping to. The height parameter specifies how high the character jumps. The angle parameter specifies the direction the character should be facing at the end of the jump. The attack, sustain and release parameters specify the desired timing of the jump (i.e. when each of the attack, sustain and release phase of the jump should occur). Attack specifies the duration of the anticipation of the jump—before launching into the air; Sustain specifies the duration of the main act of the jump—the airborne portion; and Release specifies the duration for the portion of the jump after the landing.

The resources that the jump act generator controls are: the character body's translatex, translate-y, translate-z resources (which control the character body's location); the rotate-y resource (which controls which direction the character body is facing); neck-x, neck-y and neck-z resources (which control the position of the neck, and as described below control the squash and stretch of the character); and the head-rotate-x, head-rotate-y and head-rotate z (which control the direction the character body's Head is facing).

The generator operates by modifying a pre-existing gesture that was created using keyframe animation to control these resources and perform a single fixed jump for the character in the style that is appropriate for the character.

The generator takes the blend trees for the gesture and creates new blend trees for the jump as follows.

First the timing of the new blend trees is adjusted to move the start time of each tree to the start time of the act. This is done by adding start time to each of the cubic knots in the CubicMotionCurveNodes in the gesture.

For the translate-x, translate-y and translate-z curves of the gesture (i.e., the curves specifying the position of the character's body in space during the jump), the generator applies SpaceWarpNodes to the respective blend trees to create curves that start at the location the character has at start time (gotten from the state of the character body's resources at start time) and end at the target location (parameters X, Y and Z). The sub-blend tree for each SpaceWarpNode is the CubicMotionCurveNode from that resource in the gesture. In these resulting blend trees, translate-x and translate-z have four (time, target-value) pairs in the created SpaceWarpNodes. For the translate-x blend tree, the first two pairs have the time of the start phase and takeoff phase as their time and the start time value of the translate-x resource value as their values; the second two pairs have the time of the touchdown and return-to-neutral phases as their times and the X act parameter values as their values. The pairs for translate-z are analogous. The pairs for translate-y are also analogous, but they include a fifth (time, target-value) pair. The fifth pair has the time of the apex phase as the time, and the Height act parameter plus the maximum of the Y act parameter and the value of the translate-y resource at start time.

These three spacewarps modify the curves to start where the character body is at the start of the act, go to the requested height, and land and settle at the target location.

The rotation in the gesture is generalized using a ScaleNode.

Figure 19:
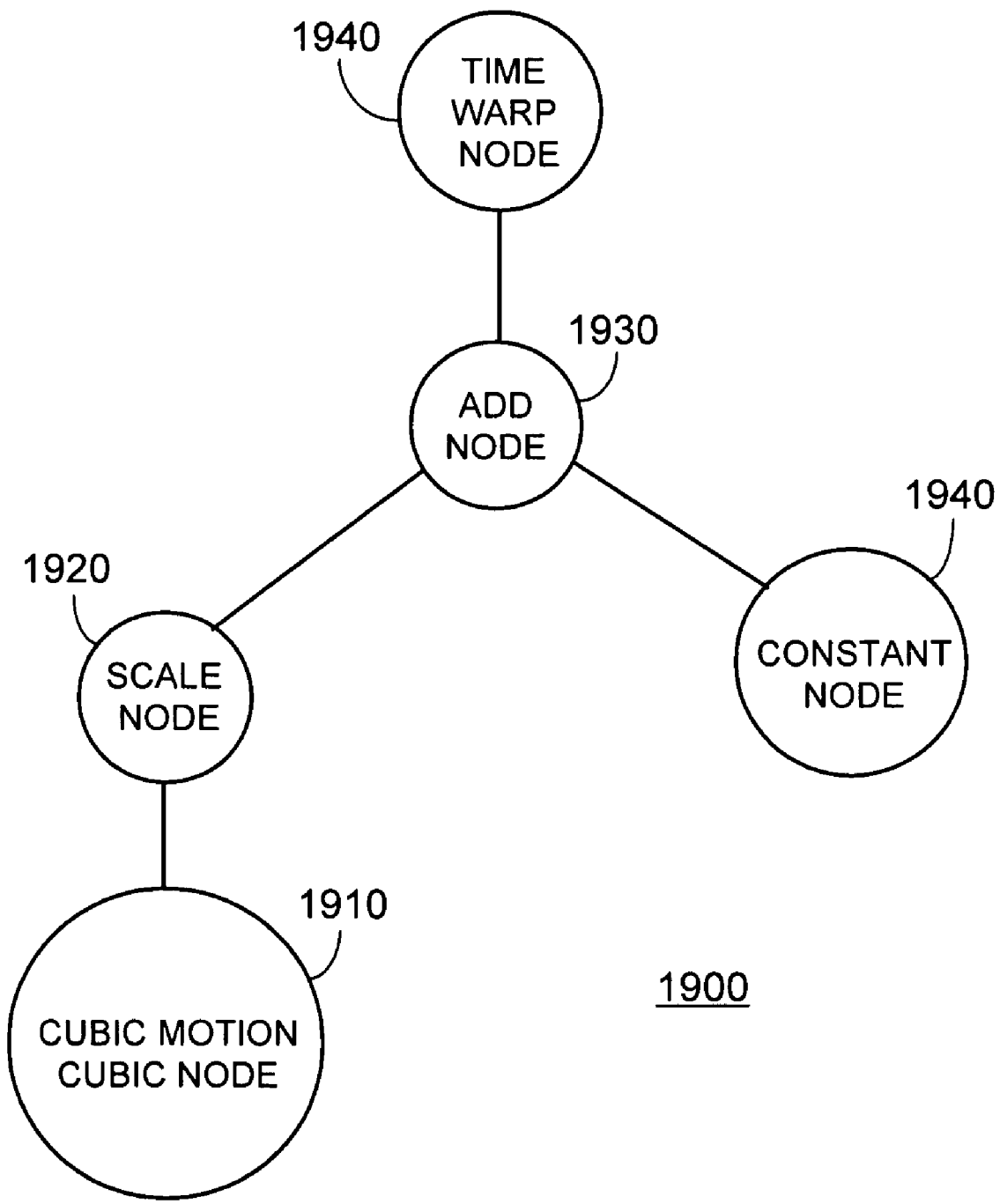

Referring now to FIG. 19, there is shown an exemplary blend tree 1900 for the rotate-y resource in the above example. The CubicMotionCurveNode 1910 for the rotate-y resource is scaled (using ScaleNode 1920) by a factor equal to the angle parameter minus the state of the character body's rotate-y resource at start time divided by the amount the rotate-y resource changes in the gesture. This preserves the nuances of motion in the curve while causing it to move the needed amount. A ScaleNode with the same scale factor is applied to the head-rotate-y resource. This causes the fine coordination between the head rotation and the body rotation to be preserved. In particular, the head rotation will continue to have the right anticipation and follow-through animation properties that are present in the hand-animated gesture.

To make the rotate-y resource start from the current facing of the character body, an AddNode 1930 is applied to the rotate-y blend tree. The created AddNode takes the current rotate-y blend tree (the ScaleNode created above), and a newly created ConstantNode 1940 with the value of the rotate-y resource at start time as its constant.

Finally a TimeWarpNode 1940 is applied to each resource (including the rotate-y resource) to change the timing of the movement to correspond to the Attack, Sustain and Release parameters. Also, if an entrance phase is specified, the blend trees are moved in time to start at start time minus the TimeOfPhase of the entrance phase.

8. Processing of Acts by the WB

As noted above, the MSM receives acts generated by the character mind and attempts to perform them. Each act specifies a list of required bundles and a list of optional bundles to indicate which resources the act controls. Conceptually, the required bundles encode the resources that the act must control to do its job, and the optional bundles encode the resources that the act can control in a reasonable way if there is not something more important to do with them. For example, a jump act must control the location of the character body, so the bundles that specify that are in the required bundles list for the act, but the angles of the Head are not necessary to perform the act so they are in the optional bundles list for the act. If they are not needed elsewhere, the jump act can add secondary motion to the head that compliments the main body motion of the jump movement, but if the character mind issued a look act, that act could control the angles of the head allowing the character to jump while looking around.

More precisely, the required bundles are controlled by this act whenever this act is executing. An act's optional bundles execute if there is no other act executing that needs that bundle as a required bundle, and if this act has the highest priority of all of the acts that can control it as an optional bundle.

Each act also includes the methods CanTransition, CanAbort and AboutToEnd. CanTransition returns true if it is still possible to create a transition from this act to a following act. Transitions are described in more detail below. CanAbort returns true if the act can be aborted and false otherwise. For example, a jump act can be aborted before the character body leaves the ground, but cannot once the character body becomes airborne. AboutToEnd is a method that is executed each frame. When the act is near its end time, this method sends an AboutToEnd callback to the character mind. This allows the Character Mind to provide the next acts in a sequence early to allow for smooth movement.

When an act object is created, e.g. by the character mind issuing an act, values for the act's parameters and the priority of the act from the character mind are recorded in the act.

As the act executes in the WB, values are set for the act's start time, duration, and end time.

When an act is issued by a character mind it also includes a (possibly empty) list of previously issued acts that must complete before this act can start execution. We call this list the pending list for this act. This list is modified during the execution of the WB as the acts on it succeed, fail or are aborted.

a) Automatic Blending

For required bundles, an act gains control of the resources and maintains that control for the entire time the act is executing. This means that the movement produced by the generator will execute as it was created.

For optional bundles, an act may gain or lose control of those bundles multiple times over the life of the act, as those bundles are taken and relinquished by other acts. This causes motion created by different generators to be switched between at arbitrary times.

To provide coherent motion in this process, the WB automatically creates BlendNodes each time control is transferred. Whenever control is given to the blend trees in an optional bundle at a time other than the start of the associated act, the WB creates a BlendNode for each resource in the bundle to blend between the current value and tangent of the resource and the new blend tree that is taking control. This allows for a smooth transition between what those resources were previously doing and the desired ongoing act specified in the new blend trees.

b) Settle Acts

Most acts executed for a character body are issued by the character mind. One type of act that is not issued by a character mind is the settle act. There is one settle act per character body. The purpose of the settle act is to control some resources when there is no other act controlling them.

All of the bundles that a settle act controls are optional bundles, and the priority of the settle act is defined to be lower than the possible priorities for acts issued by a character mind. This ensures that the settle act will only take control of any uncontrolled bundles, and acts issued by the mind can freely take control of bundles from the settle act.

A settle act has infinite duration, so that it never terminates, and it includes a ConstantNode or a TexturalNoiseNode for each resource that it controls. The value of the ConstantNode for a given resource is the neutral position of that resource. If a TexturalNoiseNode is used instead, it provides a range of values around the neutral position of the associated resource.

In this way, whenever bundles in a settle act become uncontrolled, the WB will blend the current movement of those resources into the motion specified by the settle act using the mechanism described above. This causes those resources to smoothly move back into a neutral pose or textural noise motion near a neutral pose.

9. Transitions

The mechanisms described above for transitioning between acts works well in most cases. In some cases, however a more intelligent transition from one act to another is desirable. For example, a Jump may consist of the phases: crouch, extend, flight, touchdown-compression, and return-to-neutral-pose (or perhaps flourish). If the jump is being followed immediately by another jump, using the normal mechanisms above, the character would jump, stand back up, crouch again, and jump. This would be undesirable because standing back up only to crouch again in between each jump is not always natural. Instead, it is often more desirable to transition directly from the touchdown compression phase to the next jump's extend phase. To allow for this, the WB utilizes data structures called transitions to create smoothly appearing transitions between acts.

Using the time given by the AboutToEnd callback, if the character mind has enough time, it may schedule the second jump as pending to the first jump before the first jump has finished executing. This gives the WB the opportunity to take special action on such information.

The WB contains an n by n transition table of transition creators, where n is the number of different kinds of acts defined. If entry (i,j) of this table is non-empty, it means that the character author has defined a specific method for generating transitions between act i to act j.

A transition is created by the WB when: there is an act j that is pending on a single act i; there is an entry (i, j) in the transition table, and when the CanTransition method on act i returns true.

In this case, the transition creator from the table creates a transition. This transition is stored in act i. Each transition has: a start time, an end time and a list of blend trees for the same resources that are controlled by act i. In addition, the transition creator can set the entrance phase of act j when creating the transition.

Between a transition's start time and end time, its blend trees are evaluated instead of the blend trees for the act that it is in (act i). If start time equals end time, then the list of blend trees can be empty.

At a transition's end time, act i succeeds, causing act j to start. This end time could be earlier or later than the end time of act i. act j then starts executing at its entrance phase (if set) or at its beginning if no entrance phase is set. This is accomplished by act j's generator that is passed its entrance phase as one of its arguments.

This mechanism combines to allow the transition creator to remove some of the ending portion of act i's motion, remove some of the beginning portion of act j's motion, and optionally replace them both with new motion. The new motion is created by a generator written specifically for the transition.

To make this clear, we describe a jump to jump transition.

The desired transition between two jumps is to remove the standing up motion from the first jump, and remove the crouching down motion from the second act allowing the character to go directly from the first jump's touchdown-compression phase to the next jump's extend phase.

The transition creator does this by first getting the time of the first act's touchdown compression phase by querying the blend trees of the first act for TimeOfPhase of "absorb". It must query the blend trees, because the time of this phase might have been modified from its time in the base gesture by the generator for the act when it was executed. It then creates a transition and sets its start time and end time to be the queried phase time. It then sets the list of blend trees for the transition to the empty list, and sets the EntrancePhase of the act being transitioned to be "squash".

In order for this transition to work, it must execute before the time of the "absorb" phase. This is ensured by the CanTransition method of the jump act. This method returns false if the current time is greater than the time of the "absorb" phase of its blend trees.

The AboutToEnd method for the jump act is set to 0.4 seconds before the time of this phase to enable the character mind to have time to produce a next act in a sequence in time to enable this transition.

B. The Sound Manipulation System

When the MSM performs acts specified by a character mind, these acts may entail, in addition to or instead of motion of the character's body, the generation of sounds, e.g. speech sounds. The Sound Manipulation System is the portion of the MSM that generates sounds in response to instructions specified by acts of the character mind. The Sound Manipulation System receives from an act a digitized speech recording and specifications of modifiers for volume, pitch and duration. In particular, it receives curves that define multipliers for each of these three characteristics of the speech recording that vary over time. Together, the three modification curves implicitly define a function that transforms a speech sample into a modified speech sample. In response, it produces a new speech signal that has the resulting modifiers. Each of the modifiers can be a function of time, and is interpreted as a multiplier of the associated property. Volume is manipulated first, followed by pitch and duration manipulation using the TD-PSOLA algorithm.

By selecting appropriate modification curves, a given segment of speech (e.g., a sound, word, or phrase) may be modified to display intonation that is appropriate for the character at the moment. For example, modification curves may be generated to modify a particular speech segment with respect to inflection, emphasis, emotional quality, stylistic quality and accent.

1. Sound Manipulation Techniques a) Volume Manipulation

Volume is manipulated in a straightforward sample-by-sample manner on the original waveform. Each sample, representing a single point in time, is multiplied by a modifying volume function. For example, a volume modifying function of $$F=2$$

results in a waveform that has twice the amplitude. The volume modifying function does not have to be a constant function. It can be a positive, non-zero function of time; therefore, specific syllables or phonemes of a word or phrase can be accented or softened.

b) Manipulation of Pitch and Duration

In a preferred embodiment, pitch and duration are manipulated in the Sound Manipulation System using the well known Time-Dependent Pitch Synchronous Overlap and Add (TD-PSOLA) algorithm, however other systems for scaling the pitch or duration of digitized sound samples may be utilized as well. TD-PSOLA manipulation is conceptually similar to Volume Manipulation. For example, if the pitch function is $$F=1$$

and the duration function is $$F=0.25$$

the resulting speech signal would retain its original pitch and be faster by a factor of 4 (i.e., its duration would be $\frac{1}{4}^{th}$ the original duration). As with the volume modifying function above, the pitch and duration modifying functions can be positive, non-zero functions of time. For example, one can use PSOLA to make the first part of the speech slower, leave the middle part unchanged, and make the last part quicker. Simultaneously, one could raise the pitch at only the end to convert a statement into a question.

TD-PSOLA is widely available from several sources. One source for TD-PSOLA is Robert Edward Donovan, "*Trainable Speech Synthesis*", Ph.D. dissertation, Engineering Department, Cambridge University, Cambridge, England, 1996. Another source is the Praat software developed by Paul Boersma and David Weenink at the Institute of Phonetic Sciences of the University of Amsterdam. This software and documentation is available from http://www.fon.hum.uva.nl/praat/.

An alternative method for performing the pitch modification is to interpret the pitch function as a modifier of a one or more portions of the frequency spectrum. For example the pitch function could be applied to the fundamental frequency of the speech recording, modifying that portion while leaving the other portions unchanged. Mechanisms for performing such modifications to a recorded speech signal are well known to people skilled in the art.

2. Types of Acts that Generate Speech

In general, there are two types of acts that may generate speech sounds: speech only acts, and acts with coordinated speech and motion. We describe each in turn.

a) Act for Speech Alone

We now describe the operation, in a preferred embodiment, of acts that generate sound for the character but do not control any of a character's motion resources. An act of this kind takes as arguments a reference to an annotated sound file, three curves, each one to be used as a modifier for pitch, duration, or volume, and a scale factor.

The annotated sound file represents a "neutral" recording of a sound, word, or phrase that is to be spoken by the character. Each curve represents a time-varying multiplier value for its respective characteristic. For example, the values of the pitch curve represent multipliers for changing the pitch of the neutral recording at specific times during its duration. The scale factor is a real number that represents the strength of the transformation. For example, the pitch, duration, and volume curves could represent modifications to make a speech sample sound extremely excited. A scale factor of, e.g., 0.5 could be use to generate modifications to make the sample sound somewhat less excited then if the scale factor were 1.0.

Because it is undesirable to modify some parts of speech with respect to pitch, duration, or volume the speech recording that the act receives is annotated by the character author to specify which sections may and may not be modified with respect to duration, pitch, and volume.

In general, in a preferred embodiment, all voiced phonemes may be modified in pitch while unvoiced phonemes should not be modified. Sometimes distortion occurs if there is strong frication or strong plosive release. If distortion occurs when any phonemes are modified in pitch, these phonemes should be marked as unmodifiable.

In general, all phonemes can be modified in duration. The exceptions to this rule are plosives and allophones. In a preferred embodiment, only the silent parts of these phonemes, such as the closure of the plosive, may be modified in duration. Sometimes undesirable distortion occurs when a fricative or an affricative is modified in duration. This distortion happens more often with unvoiced rather than voiced version of these sounds. If distortion occurs when any phonemes are modified in duration, they should be marked as unmodifiable.

In general, all phonemes can be modified in volume. However, it is often practical to mark silent portions of speech as unmodifiable. This can prevent ambient noise in a recording from being amplified to audible levels.

Figure 20:
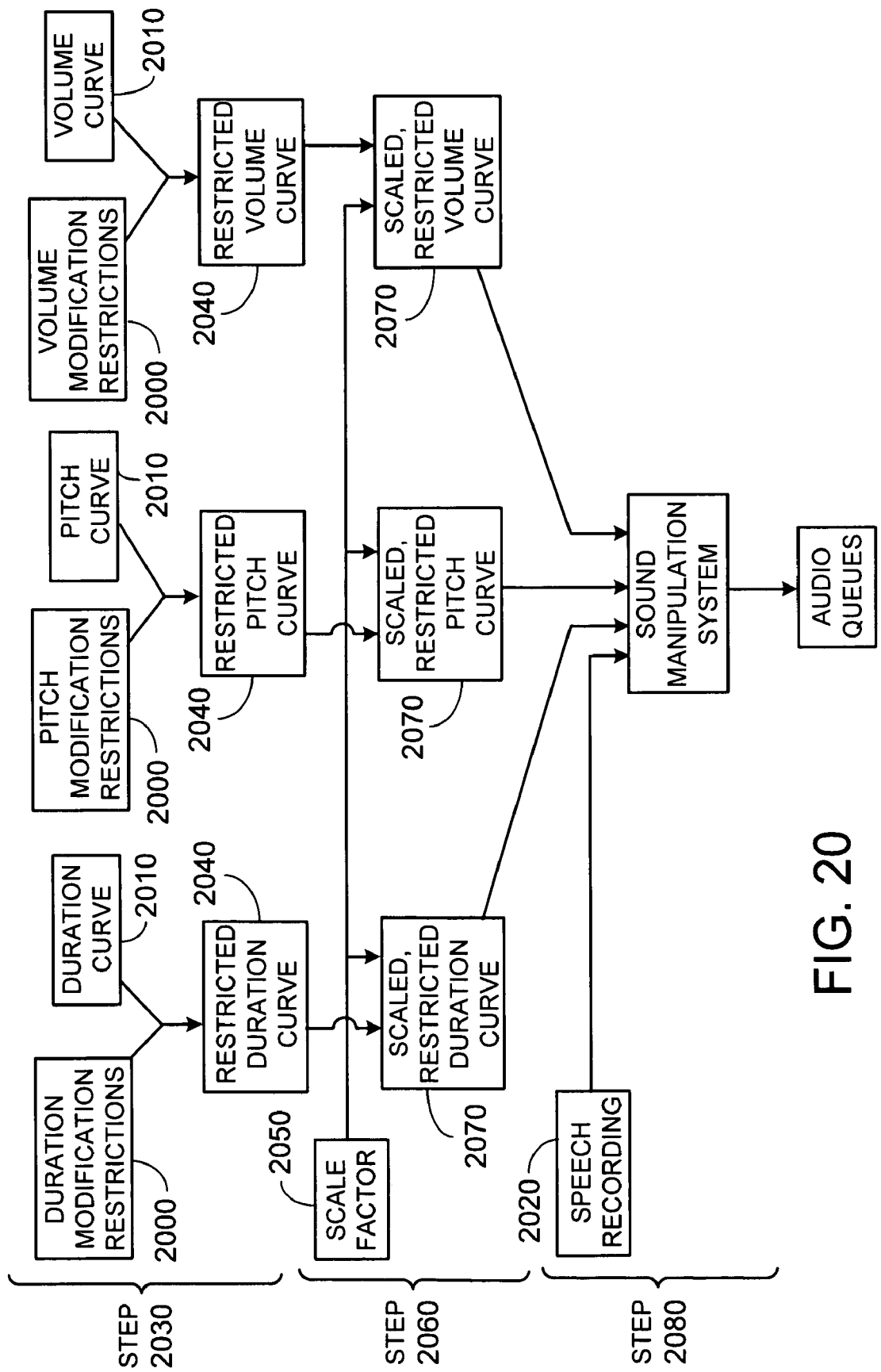
FIGS. 20-24 are flowcharts.

Referring now to FIG. 20, in a preferred embodiment, a speech only act generates speech sounds in a three step process. First, the acts compares each of the duration, pitch, and volume modification curves 2010, with corresponding modification restrictions 2000 associated with speech recording 2020. The modification restrictions indicate portions of speech recording 2020 that should not be modified with respect to the particular characteristics in question. The act modifies these modification curves 2010 by setting to 1 those portions of the curve corresponding to portions of the speech recording that are annotated as unmodifiable with respect to the characteristic in question (step 2030). For example, if the portion of a sound recording from 0.4 seconds to 0.6 seconds is unmodifiable with respect to volume, then the volume modification curve is set to 1 for values for that range of time. This results in a set of restricted modification curves 2040.

Since the modification curves ultimately act as multipliers for their respective characteristic, setting the curve to 1 at particular points results in no modification at those points.

Next, the scale factor 2050 is used to scale each of the modification curves around the value 1 (step 2060). That is, the distance on each curve from the value "1" is multiplied by the scale factor 2050, and the value of the curve at that point is set to equal 1 plus the result of the multiplication. For example, if the value of the curve at a given point was 1.6, and the scale factor was 0.5, the new value of the curve at that point would be 1.3. Because the unmodifiable sections of the curves have the value 1, no amount of scaling around the value 1 will change the value of these sections. The result of this scaling process is scaled restricted modification curves 2070.

Finally, the Sound Manipulation System uses the scaled restricted modification curves to modify the speech recording and sends this modified recording to the audio queues (step 2080).

3. Acts for Speech and Coordinated Act

A second, more complex type of act may both generate sound and control some of a character's motion resources.

Figure 21:
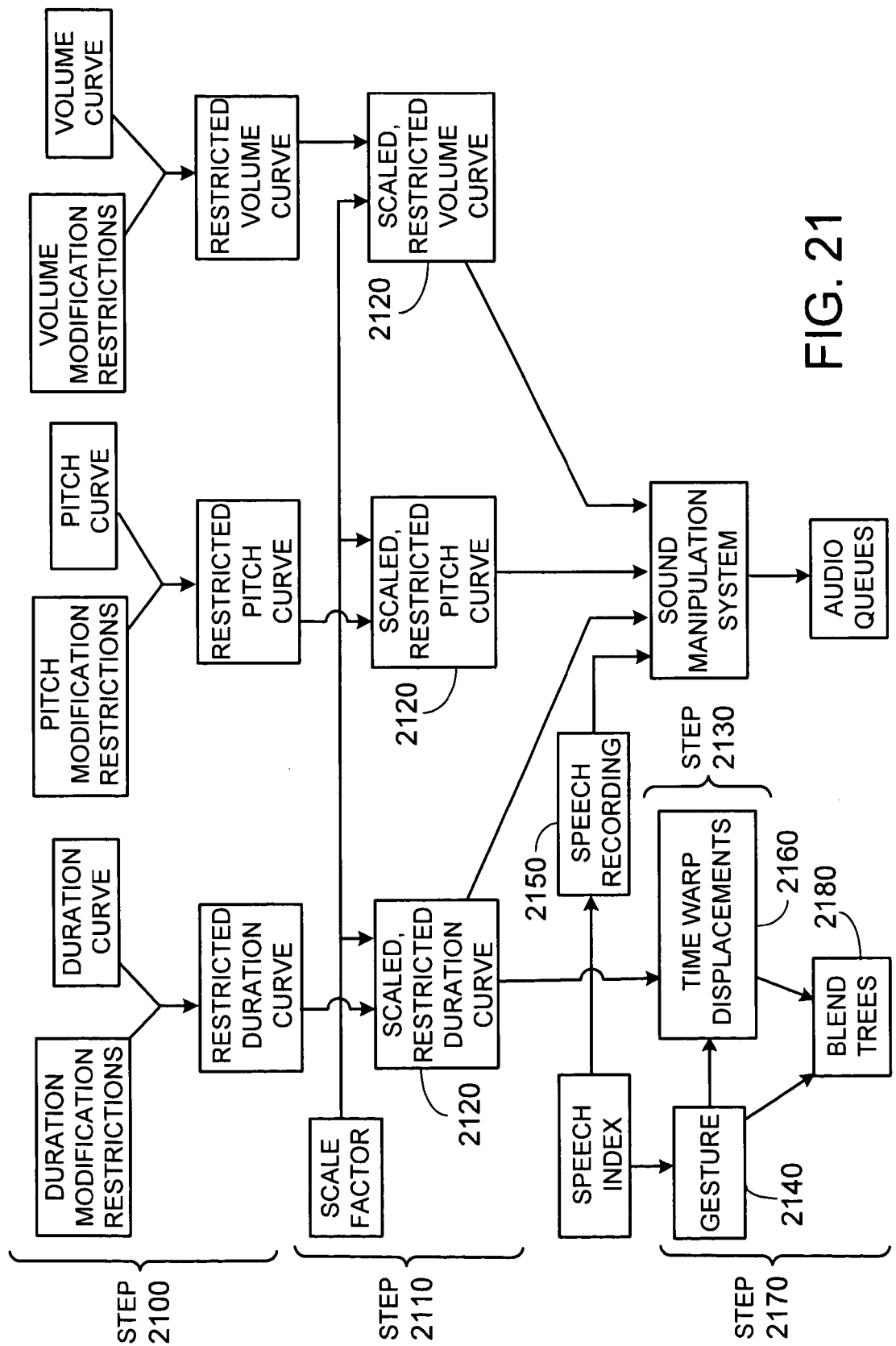

Referring now to FIG. 21, in addition to the sound related inputs received by a speech only act, this act also receives a gesture 2140 as input. The gesture and sound file (speech recording 2150) are created by the character author so that, if both the gesture and sound file are unmodified, they would have the same duration and would appear to be synchronized if played simultaneously.

Referring now to FIG. 21, in a preferred embodiment, the first two steps performed by an act for producing speech coordinated with act are the same as in a speech only act: first restricting the modification curves (step 2100), and then scaling them based on a scale factor (step 2110), to produce scaled, restricted modification curves 2120. The act then uses timing information from gesture 2140 and the scaled, restricted duration curve 2120 to create time warp displacements 2160 (step 2130). This may be done in a variety of ways, so long as the resulting speech and gesture remain in synchrony. In a preferred embodiment, the beginning of the gesture is time warped to the start time of the act. The end of the gesture is time warped to $$t_{start} + \int_0^{t_{end}} D$$

where $t_{start}$ is the start time of the act, $t_{end}$ is the original duration of the gesture, and D is the restricted, scaled duration curve. Also, any time t within the gesture (such as a mouth opening or closing) is time warped to $$t_{start} + \int_0^t D$$

so that the time-warped act will synchronize with the modified speech signal.

Next, the time warp displacements are combined with the gesture to create blend trees 2180 (step 2170). These blend trees are then modified in the same way as within a typical generator to ensure smooth movement of the character's resources as described above.

Although the present embodiment time warps the gesture based on the values of the duration curve, values from either of the other curves may be used as well. For example, movement of a character's mouth could be modified in proportion to the values of the volume modification curve, since a character that was talking loudly might open its mouth wider when speaking.

An act of this kind might receive other arguments to further specify how the act is to be coordinated. For example, it might take an argument such as an emotion to be used when deciding which gesture to use if multiple gestures are available, or it might modify the gesture based on the emotion.

An act of this kind also might accept arguments to be used to control specific resources. For example, a set of arguments might be used to hold the mouth of a character in a specific shape for a specific duration.

4. Deriving Curves Automatically

In the embodiment described above, an act that generates speech sound receives three modification curves that characterize an appropriate modification for a sound file. While it is possible for the author of the character to manually code a large library of such curves that express a wide variety of emotional states of a character, such hand coding may be time consuming and tedious. Therefore, it is desirable to provide a technique by which such curves may be automatically generated from a relatively limited amount of base data. The following section describes such a technique for use with the presently described interactive character system.

Figure 22:
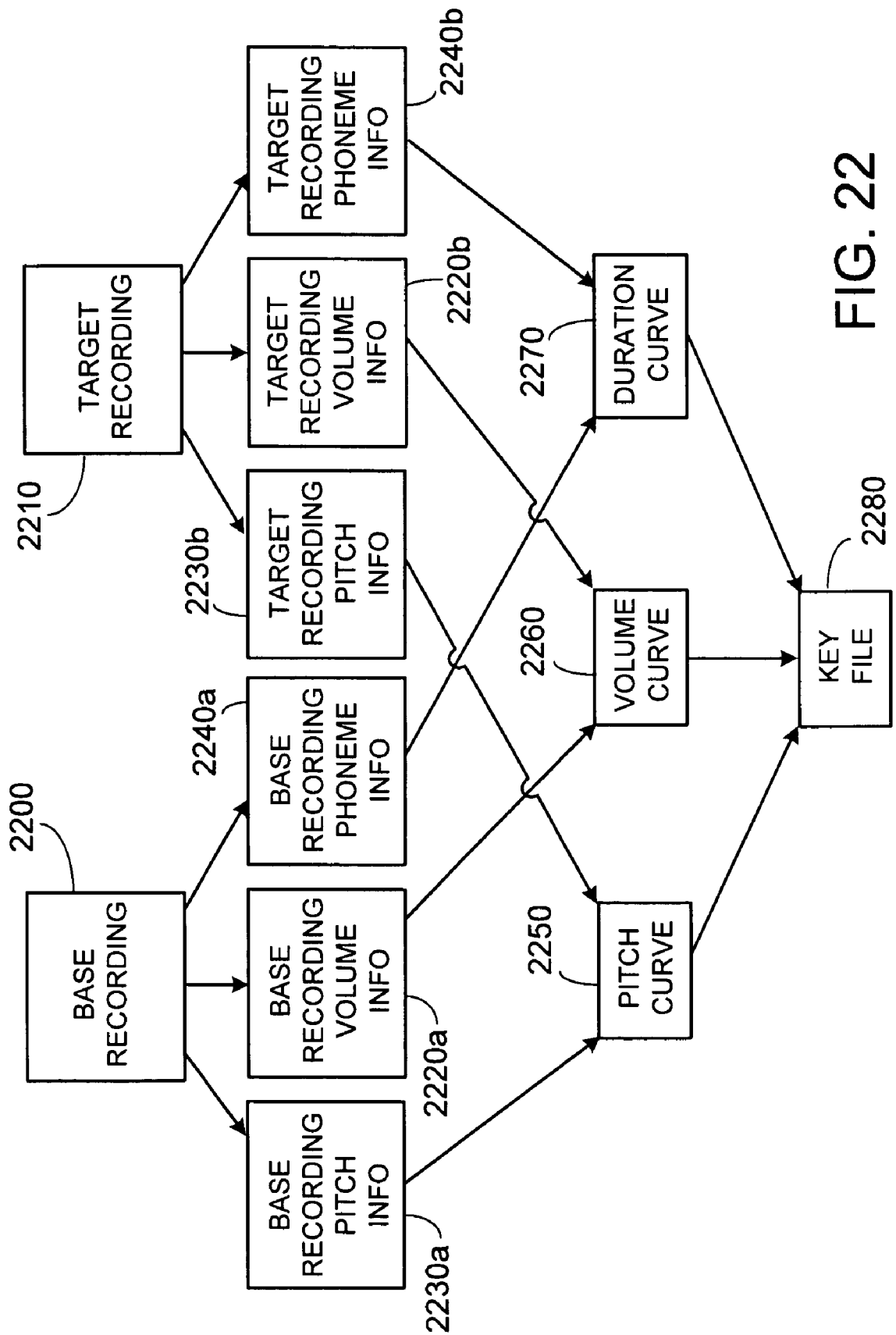

Using this technique, the author of a character may generate duration, pitch, and volume modification curves for a particular sound, word or phrase. This is done by using two recorded samples of the sound word or phrase—a "base" recording spoken in a neutral voice and "target" recording spoken with a desired intonation—and imputing modification curve values based on the differences between these curves. When these modification curves are sent to the Sound Manipulation system along with the base speech recording, the Sound Manipulation System can generates a new speech signal that sounds similar to the target speech recording a) Generating the Pitch, Duration, and Intensity Modification Curves We now describe in more detail the automatic generation of pitch, duration and intensity modification curves. Referring now to FIG. 22, a standard intensity analysis and a standard pitch analysis are performed on both the "base" (2200) and "target" (2210) speech recordings. The intensity analysis for each recording produces a sequence 2220 of (time, intensity) pairs with the intensity (i.e., volume) expressed in dB. The pitch analysis for each recording produces a sequence 2230 of (time, pitch) pairs with the pitch expressed in Hz. In addition, each sound recording is analyzed, e.g. by the character author, to mark individual phonemes represented in the recording. A set 2240 of intervals corresponding to individual phonemes are labeled appropriately. Systems for analyzing sound recording in this way are widely available. One such system is the speech analysis software tool Praat, available at http://www.fon.hum.uva.nl/praat/. The pitch information 2230 from the base and target recordings is then combined to produce a pitch modification curve 2250 for use by an interactive character. Similarly, the volume information 2220 from the base and target recordings is used to generate a volume modification curve 2260, and the phoneme information 2240 for the base and target recordings is used to generate a duration modification curve 2270. The results are stored in a key file 2280. We now describe exemplary techniques for generating these modification curves.

(1) Generating the Duration Modification Curve

Figure 23:
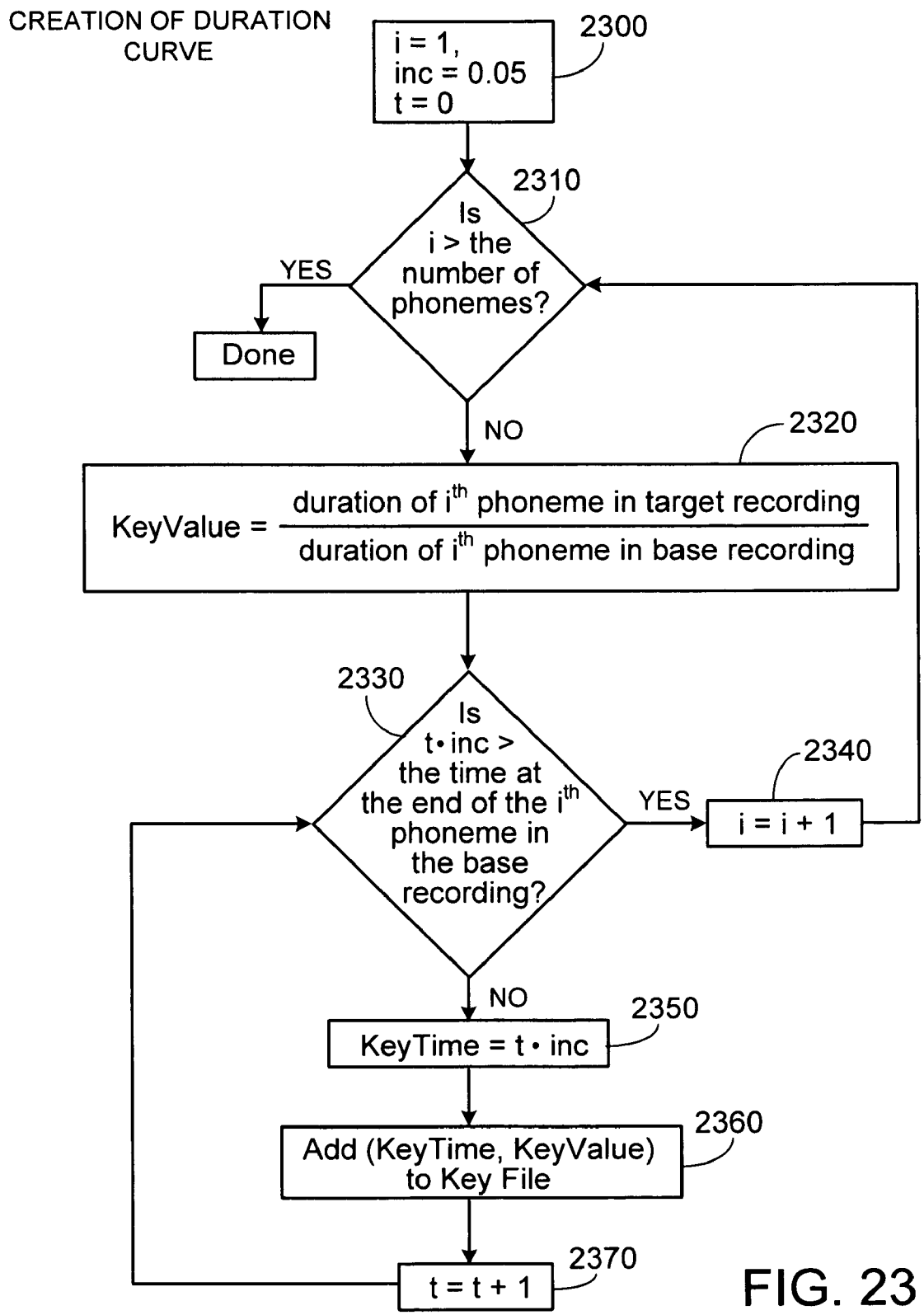

We now describe how the duration modification curve is generated in a preferred embodiment. Referring now to FIG. 23, first counters i, inc, and t are initialized to 1, 0.05 and 0, respectively (step 2300). Then i is compared to the number of phonemes in the speech recordings (step 2310). If i is greater than the number of phonemes, all of the phonemes have been processed, and the process ends. Otherwise, the variable keyvalue is set equal to the ratio of durations of the ith phoneme in the target and base recordings (step 2320). Next, i*inc is compared to the time at the end of the ith phoneme in the base recording (step 2330). If it is greater, then i is incremented by 1 (step 2340), and control returns to step 2310. If not, then keytime is set equal to t*inc (step 2350) and the pair (keytime, keyvalue) is added to the keyfile (containing the duration modification curve) (step 2360). Next, t is incremented by 1 (step 2370), and control returns to step 2330. The result of this process is a duration modification curve with values for every increment of inc seconds (here 0.05).

(2) Generating the Pitch Curve

We now describe how a pitch modification curve may be created in the key file.

First, the times of the (time, pitch) pairs in the target recording's pitch analysis file are converted to a time corresponding to the phoneme timing of the base recording using the formula $$basetime = \begin{cases} targettime \dfrac{basephone_n}{targetphone_n} & \text{if } n = 1 \\ basephone_{n-1} + (targettime - targetphone_{n-1}) \\ \qquad \dfrac{basephone_n - basephone_{n-1}}{targetphone_n - targetphone_{n-1}} & \text{otherwise} \end{cases}$$

where n is the number of the phoneme in the target recording that includes targettime, $targetphone_b$ is the end time of the $n^{th}$ phoneme in the target recording, and $basephone_n$ is the end time of the $n^{th}$ phoneme in the base recording. This results in a new set of (time, pitch) pairs that are used in the second step.

Second, for each keytime equal to a multiple of inc defined above, greater than or equal to 0 and less than or equal to the end time of the base recording, two values are calculated. The first value $p_1$ is the pitch value at time keytime of the base recording, calculated using linear interpolation of the data points in the base recording's pitch analysis file. The second value $p_2$ is the pitch value at keytime derived from linear interpolation of the new set of time-modified (time, pitch) pairs created above. A keyvalue is calculated by dividing $p_2$ by $p_1$. The (keytime, keyvalue) pair is then added as a point on the pitch modification curve.

(3) Generating the Volume Curve

A volume modification curve is created in the key file using the following steps.

First, the times of the (time, intensity) pairs in the target recording's intensity analysis file are converted to a time corresponding to the phoneme timing of the base recording using the formula $$basetime = \begin{cases} targettime \dfrac{basephone_n}{targetphone_n} & \text{if } n = 1 \\ basephone_{n-1} + (targettime - targetphone_{n-1}) \\ \qquad \dfrac{basephone_n - basephone_{n-1}}{targetphone_n - targetphone_{n-1}} & \text{otherwise} \end{cases}$$

where n is the number of the phoneme in the target recording that includes targettime, $targetphone_n$ is the end time of the $n^{th}$ phoneme in the target recording, and $basephone_n$ is the end time of the $n^{th}$ phoneme in the base recording. This results in a new set of (time, intensity) pairs that are used in the next step.

Second, for each keytime equal to a multiple of inc defined above, greater than or equal to 0 and less than or equal to the end time of the base recording, a keyvalue is calculated using the following sub-steps. Two values are calculated. The first value $v_1$ is the intensity value at time keytime of the base recording, calculated using linear interpolation of the data points in the base recording's intensity analysis file. The second value $v_2$ is the intensity value at keytime derived from linear interpolation of the new set of time-modified (time, intensity) pairs created above. A keyvalue is calculated using the formula $keyvalue = 10^{(v_2 - v_1)/10}$. Once the (keytime, keyvalue) pairs have been calculated, each key value is replaced with the average of the key value and the two preceding and two following key values in order to smooth the curve somewhat. These new (keytime, keyvalue) pairs are then added as points on the intensity modification curve.

b) Combining Speech Modifiers

A set of three specific modification curves and a scaling factor (as described above) can together be used to achieve an effect. For example, a given pitch curve, P1, duration curve, D1, volume curve, V1, and scale factor, S1, could correspond to making the speech sound "sad." Another set of curves <P2,D2,V2>and scale factor S2 might correspond to making the speech sound "lively." In this way, the sets of curves and scale factor can modify the output of the characters for various effects. Effects are not limited to emotional effects. For example, another effect is "bratty."

Sometimes, it may be useful to combine sets of curves into new combinations. For example, the speech starts out sad, and then ends up lively. Alternatively, it might be desirable to create an affect that is a combination of sad and lively. To combine modification curves in this way, each set of modification curves may be associated with an emphasis curve E of the same duration as the base recording. So, for example, E1 would be associated with the curves <P1,D1,V1>and E2 would be associated with the curves <P2,D2,V2>. E1 would have a high value at the beginning and taper off, while E2 would start low and go high later in time. By the combination method described below, the resulting speech would start sad and end lively.

The new pitch curve is made by sampling all of the pitch curves and emphasis curves at regular intervals (every 0.05 seconds in the preferred embodiment) and combining the pitch values $P_1(t), P_2(t), \ldots, P_n(t)$ and the emphasis values $E_1(t), E_2(t), \ldots, E_n(t)$ at each interval. In the preferred embodiment, these values are combined with the formula $keyvalue = P_1(t)^{E_1(t)} P_2(t)^{E_2(t)} \ldots P_n(t)^{E_n(t)}$. The new duration curve and new volume curve are made in the same way.

Other examples of combining effects together include combining two sets of curves to achieve a speech that is both "sad" and "angry" at the same time. For another example, a set of curves and a scale factor could be used to emphasize a certain part of the speech output.

c) Automatic Distortion Prevention

When speech modification curves are combined together as described above, the result is a new set of speech modification curves that have not be specifically created by the author of the character. This presents the possibility that such curves may produce sounds with undesirable artifacts or distortion. Because of this, it may be desirable for the Sound Manipulation System to process such derived curves to automatically modify them to reduce or eliminate distortion. We now describe a technique by which such automatic distortion reduction may be achieved.

In particular, before the system executes, a high clamping curve and a low clamping curve are created by the character author for a base speech recording. During the execution of the interactive character system, these curves are used to automatically modify pitch and duration modification curves before they are sent to the Sound Manipulation system to prevent them from exceeding limits defined by the high and low clamping curves.

(1) Creating the Clamping Curves

There are two clamping curves, a high curve H(t) and a low curve L(t). They have the same duration as the base sound recording. In the preferred embodiment, the high curve is the curve H(t) with the highest integer value such that when $H^{1/2}(t)$ is used as both the pitch modification curve and the duration modification curve, no unacceptable distortion is heard.

Likewise, in the preferred embodiment, the low clamping curve is the curve L(t) with the lowest integer value such that when $L^{1/2}(t)$ is used as both the pitch modification curve and the duration modification curve, no unacceptable distortion is heard. In the preferred embodiment, both of these curves are created manually using the author's determination of acceptable and unacceptable distortion. After these curves are created, they are utilized as follows by the Sound Manipulation System to prevent or reduce distortion of character voices.

(2) Using the Clamping Curves to Pull Back Modifications

Once a newly derived set of modification curves P(t) (pitch), D(t) (duration) and V(t) has been generated as described above (i.e., by combining respective triplets of modifications curves according to associated emphasis curves), the pitch and duration curves are modified as follows.

First, a function C(t) is generated (for values of t within the period of the sound recording) as follows.

If P(t)>1 and D(t)>1 then:

$$C(t) = \sqrt{\frac{\log(H(t))}{\log(D(t))} + \frac{\log^2(P(t))}{(2\log(D(t)))^2}} - \frac{\log(P(t))}{2\log(D(t))}$$

If $P(t) < 1$ and $D(t) < 1$ then:

$$C(t) = \sqrt{\frac{\log(L(t))}{\log(D(t))} + \frac{\log^2(P(t))}{(2\log(D(t)))^2}} - \frac{\log(P(t))}{2\log(D(t))}$$

If $\frac{P(t)-1}{|P(t)-1|} \neq \frac{D(t)-1}{|D(t)-1|}$ and $P(t)*D(t) > 1$ then:

$$C(t) = \frac{\log(H(t))}{\log(P(t)*D(t))}$$

If $\frac{P(t)-1}{|P(t)-1|} \neq \frac{D(t)-1}{|D(t)-1|}$ and $P(t)*D(t) < 1$ then:

$$C(t) = \frac{\log(L(t))}{\log(P(t)*D(t))}$$

Otherwise:

C(t)=1

Given this function C(t), a clamped pitch modification curve P'(t) is generated by raising each value in the unclamped curve P(t) to the power of the min(1, C(t)). Similarly, a clamped duration modification curve D'(t) is created by using the following formula:

$$D'(t) = \max\left(\min\left(D(t), \frac{H(t)}{P'(t)}\right), \frac{L(t)}{P'(t)}\right).$$

5. Example Behaviors using Singing

A singing behavior is an example of a behavior that uses a speech act. The singing behavior has the subgoal of singing high notes or low notes, long notes or short notes, soft notes or loud notes when directed to do so by the user. For each note to be sung, the behavior calls the speech act with a pointer to the speech recording to be sung, a duration curve which will modify the speech recording to be the desired duration, a pitch curve which will modify the speech recording to be the desired pitch, and a volume curve which will modify the speech recording to be the desired volume.

For each note sung, the singing behavior also sends parameters to the speech act describing the shape of the mouth for that note. The act uses this information to smoothly bring the mouth into the desired shape in coordination with the sound being sung.

6. Automated Partial Control of Speech Modification by the Emotion System

One important characteristic of a believable interactive character is the generation of speech sounds that appear to relate to the character's apparent emotional state. It is therefore desirable to utilize the emotional state of the character mind to modify the generation of speech sounds to generate emotionally appropriate sounds for particular emotional states.

Figure 24:
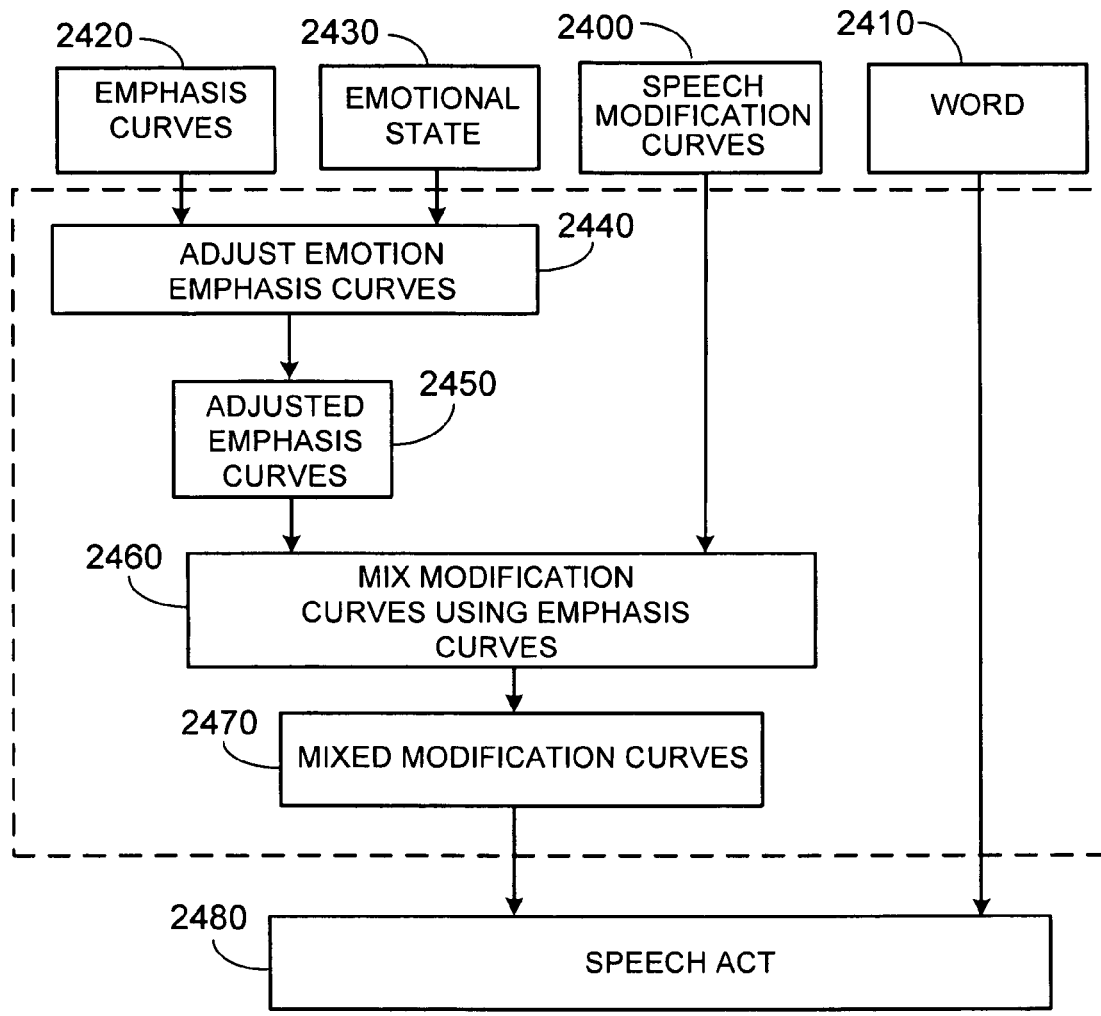

Referring now to FIG. 24, we describe a technique for utilizing the emotional state of a character mind to generate emotionally appropriate speech sounds for a character. To allow the emotion system to affect speech modification, speech recordings have a set of speech modification curves 2400 associated with each emotion or behavioral feature of the character. This is in addition to any other speech modification curves that have been created for the speech recordings—for example, for making a recording sound questioning or for stressing particular words in a phrase.

To speak, the character makes a call to one of the speech behaviors, passing in the word 2410 to be spoken and the emphasis curves 2420 associated with the word 2410. (Although we use here the example of modifying the sound of a single word, shorter sounds or longer phrases may also be utilized.) As explained in the above description of combining speech modifiers, there is one emphasis curve for each set of speech modification curves, and thus one for each potential emotional state of the character. Each emphasis curve has either been created by another behavior or has a default constant value of 0.0. The speech behavior then sets the emphasis curves associated with the character's current emotional state 2430 in proportion to the character's emotions or behavioral features, resulting in adjusted emphasis curves 2450 (step 2440). The speech behavior then mixes all of the speech modification curves 2400 using the resulting adjusted emphasis curves 2450 as described above in the discussion of combining speech modifiers (step 2460). The resulting set of mixed speech modification curves 2470 is then sent to the speech act 2480 along with the word 2410 to be spoken.

This technique may be better understood in view of the following example. A character might have a speech recording of the word, "dude." He might also have four sets of speech modification curves. One set of curves when applied to the base recording of "dude" might make the character sound angry. Another set might make him sound sad, another happy, and one frightened. The character has four emphasis curves associated with the four sets of modification curves, $E_a$, $E_s$, $E_h$, and $E_f$ respectively. When the character calls a speech behavior to say "dude," the behavior checks the character's emotional state. If, in this example, the character is very sad, the emphasis curves might be set to $E_a$=0.0, $E_s$=1.0, $E_h$=0.0, and $E_f$=0.0. After the speech modifiers are mixed using these emphasis curves in addition to the other emphasis curves and speech modification curves associated with the word "dude," the resulting modification curves are sent to the speech act. The speech signal produced by the speech act will have qualities of sadness.

A further example shows how more than one emotion can be mixed in at the same time. This example character might be very sad and a little frightened. By setting the curves to constant values Of $E_a$=0.0, $E_s$=0.7, $E_h$=0.0, and $E_f$=0.2, the speech signal that comes from the "dude" speech act will sound very sad with hints of fear.

C. Execution of the MSM

There are three entry points to the MSM: IssueAct, AbortAct and PerFrameExecution. The character minds call IssueAct and AbortAct when they want to request acts to be executed or aborted. Once per frame, the MSM's PerFrameExecution routines are executed to carry out most of the functions of the MSM. Simulated time is incremented in between each per frame invocation.

1. Issueact and Abortact

As shown in FIG. 2, a character mind has two commands that are issued to the MSM during the execution of a character mind: IssueAct and AbortAct. IssueAct is the mechanism the character mind uses to request that an act be executed. AbortAct is used to request that the MSM stop a previously issued act.

IssueAct is called with an ActType to be executed, arguments for the act's parameters, and the priority of the act in the Character Mind, and the Pending List for the act. Upon receiving the request, the MSM creates a new act and stores all of the information from the IssueAct call in the new act. It then stores the newly created act in the ActQueue. If the Pending List is empty, the MSM starts the act as described below.

An act can be aborted if it has not yet started executing, or if it has started executing and the act's CanAbort method returns true. So, when an AbortAct method is called on an act that has not started yet, i.e. it still has a non-empty Pending List, then MSM removes the act from the MSM as described below, and returns true. If it is called on an executing act, then the CanAbort method is first called. If that method returns true, the act is removed and the MSM returns true to the AbortAct call. Otherwise, the act remains in the ActQueue and the MSM returns false. The return value of true or false is used by the character mind to keep accurate track of what acts are executing. This information is used to create pending lists for future IssueAct calls.

2. Per Frame Execution

Each frame the MSM executes by first traversing the ActQueue and executing any acts that have empty pending lists. The process for executing an act is described below.

After executing each such act, it traverses the ActQueue and creates any new transitions that are needed, and then returns.

3. Starting an Act

The first step of starting an act is to take control of all of the act's required bundles, and failing the act if that is not possible.

The process for taking control of each required bundle is to examine the act at the head of the control queue of the bundle. If the bundle is a required bundle for that act and the act is not in the process of being removed, then the act that is starting is not able to take control of this bundle. In this case, an ActFailed callback is sent to the character mind and the act is removed, and the process of starting the act ends. (In general, the character's mind should be keeping track of which acts conflict with each other so as to avoid issuing conflicting acts like this when possible.) Otherwise, the act being started is placed at the head of the bundle's control queue that causes it to have control of the bundle.

After taking control of all of the required bundles, the optional bundles for the act are processed. For each optional bundle, the act is placed into the control queue for that bundle. It is placed after any acts for which the bundle is a required bundle and after any acts that have a higher priority. If it is at the head of the bundle, then it has control of the bundle, otherwise it is at the correct position in the control queue to take control of the bundle as the acts earlier in the queue end are aborted.

The third step of starting an act is to collect all of the character body's resource values and tangents at the current time. These are stored in an array to be used by the act's generator.

The act's generator is then run. The resource name, blend tree pairs that are returned by the generator are stored in the act to be evaluated during PerFrameExecution below.

Finally, the act's start time is set to be the time the act is starting, and the duration and ending time are set based on the parameters and duration of the motion produced by the generator

4. Executing an Act

The first step of executing an act is to execute the blend trees for that act to produce values for the resources controlled by this act for the current frame. The evaluation time for the blend trees is the current simulation time (which we will refer to as simtime) or the act's end time if that is before the current simtime.

To determine which resources are controlled by this act currently, the act's bundles are traversed to examine their control queues. A resource is controlled by this act if it is in a bundle that has this act as the head of its control queue. For each such resource, the act's blend trees for that resource are evaluated, and the value and tangent are stored in that resource in the character body.

If a transition has been created for this act and the start time of the transition is before the evaluation time, then the transition's blend trees are evaluated instead of the act's blend trees.

After evaluating the blend trees, the act is ended if necessary. If there is no transition for the act, the act is ended if the current simtime is greater than or equal to the act's end time. If there is a transition for the act, the act is ended if the current simtime is greater than or equal to the transition's end time.

Ending an act is done by sending an ActSucceeded callback to the character mind and removing the act as described below.

If the act has not ended, the act's AboutToEnd method is executed. This causes an AboutToEnd callback to be sent to the character mind if appropriate.

In addition to this, if the act is one of the types of speech acts, the first time it is executed the processing described in the above sections are executed and the Sound Manipulation System routines are executed on the scaled, restricted duration, pitch and volume curves. The resulting sound file is sent to the audio queues to be played in the coming frames.

5. Removing an Act

Removing an act is a four step process: mark the act as being removed, remove it from any other act's pending lists it is on, remove it from the ActQueue, and remove it from the bundles control queues.

The first step is to mark the act as being removed. This information is used when other acts are started as described above.

Next the act is removed from the pending lists of any other acts. If any of these removals result in an act's pending lists becoming empty, then that act is started as described above.

Next the act is removed from the ActQueue so it will not be executed in subsequent frames.

Finally, the act is removed from the control queues of all bundles it is on. If it is not the head of the control queue, it is simply removed. (This is often the case even for required bundles because of other acts starting in step two above.)

When the act is the head of the control queue it is being removed from, then control of the bundle must be smoothly transferred to the next act in the queue. This is done by creating a BlendNode for each resource in the bundle to blend from the line defined by the current value and tangent of that resource to the blend tree that is in the act taking control. These newly created BlendNodes replace the blend trees in the act that is resuming or taking over control of the bundle.

6. Creating New Transitions

Once per frame, the MSM creates any new transitions that are needed. It does this by traversing the ActQueue. For each act A1 in the ActQueue, a transition can be created if:

1. A1 has a pending list with a single element (act A2)
2. no transition has been created for A1
3. there is an entry in the table of transition creators for the entry (i,j) where i is the type of act A2 and j is the type of act A1.
4. the method CanTransition called on A2 returns true.

If a transition can be created from A2 to A1, then one is created by running transition creator from the table of transition creators. This transition creator creates a new transition object, sets the start time and end time of the transition object, and puts the transition in act A2. It may also set the entrance phase of act A1 and create blend trees for the transition by executing its generator.

IV. Character Body Module

Figure 25:
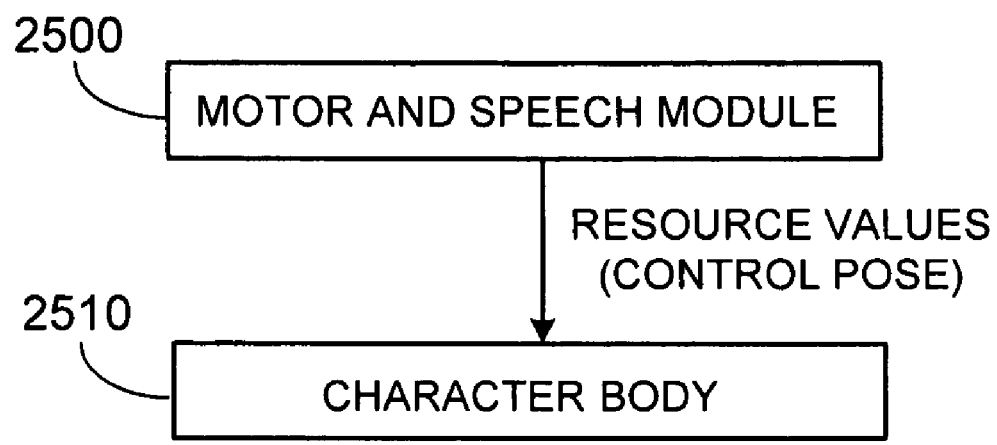
FIG. 25 shows elements of an exemplary interactive character system.

The Character Body Module takes body resource values from the Motor and Speech Module and calculates the position of the character's body. As shown in FIG. 25, the MSM 2500 provides values for each resource needed by the Character Body Module 2510.

Each frame of animation a new set of resource values is passed, resulting in a new body position. The sequence of such body positions over time is designed to convey the activities of the character, including emotions, actions, etc.

In the preferred embodiment, the Character Body Module is based on a construct we refer to as a Morphing Hose. Morphing Hoses can be single hoses, or more complex configurations of hoses and other elements. A single Morphing Hose is defined by a collection of polygons, some of which may be connected, with a controlling spline positioned relative to them. We refer to this collection of polygons as a "polygonal mesh." The polygonal mesh can have any desired topology and visual attributes such as colors or textures. One end of the spline is defined to be the "head" and the other end the "foot" of the spline. The polygonal mesh is displayed, whereas the spline is not. Some of the body resources control the spline.

Figure 26:
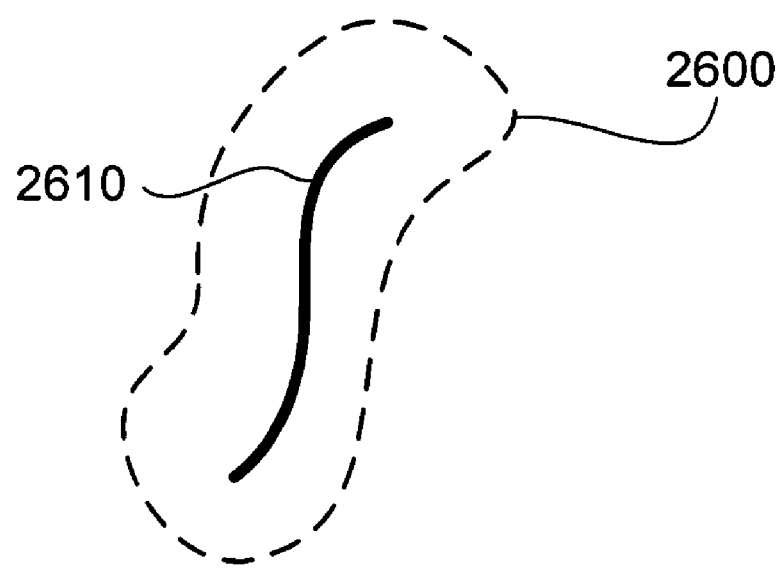
FIGS. 26-28 show diagrams of exemplary morphing hoses.

FIG. 26 shows a picture of a simple single hose body. The Figure shows only a two-dimensional representation of the outline of the three-dimensional polygonal mesh. The three-dimensional mesh 2600 extends around the spline 2610 in three dimensions.

Figure 27:
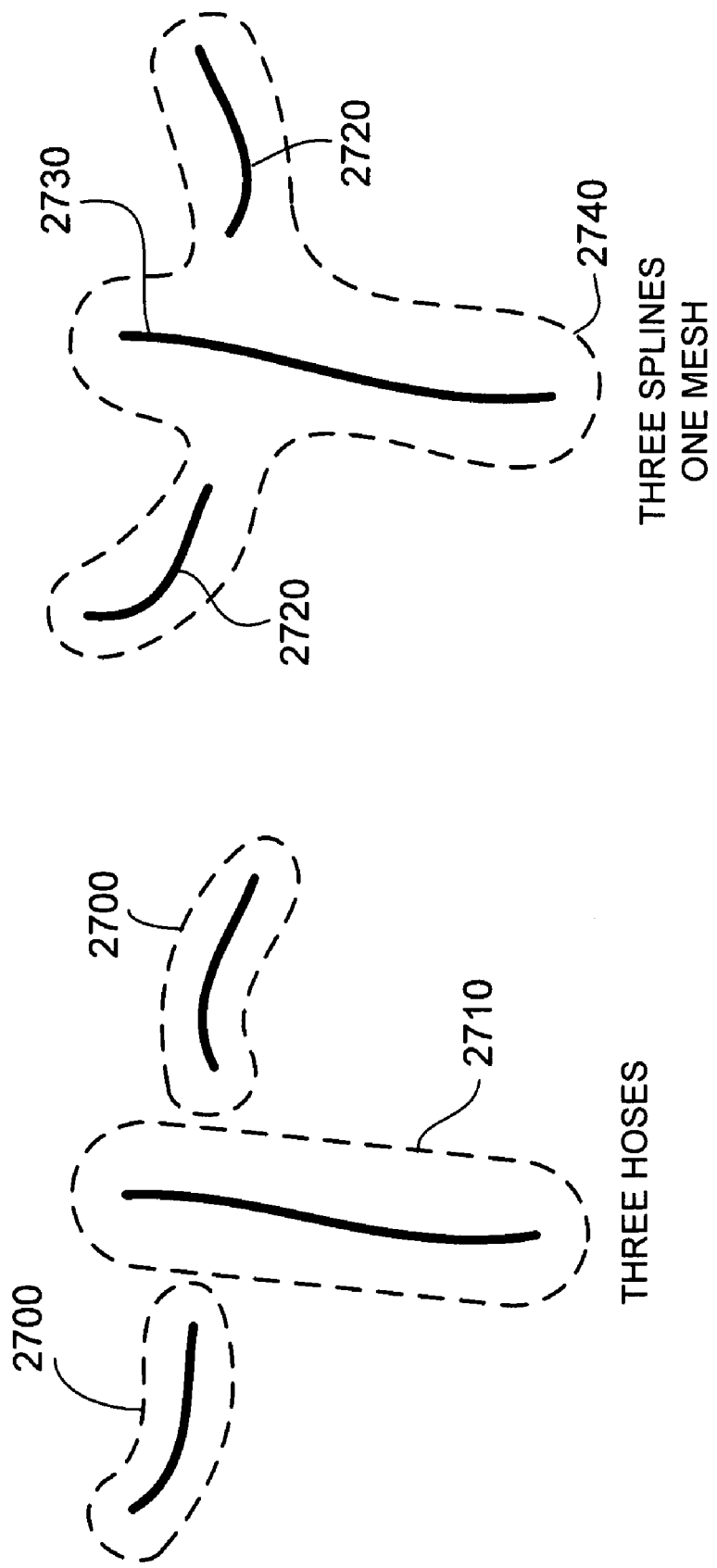

Character bodies can be more complex. For example, referring to FIG. 27, two hoses 2700 can be attached to a single larger hose 2710 to create the appearance of arms. Alternatively, two control splines 2720 could be added to a main body spline 2730, but the character may have only one polygonal mesh 2740 surrounding all three splines. Hierarchies of morphing hoses and traditional models can be created, allowing one to create, for example, a human figure with arms, legs and torso that can call all rotate along normal human joints and that can each squash and stretch and bend in the flexible and expressive ways that hand animated cartoon characters can.

Figure 28:
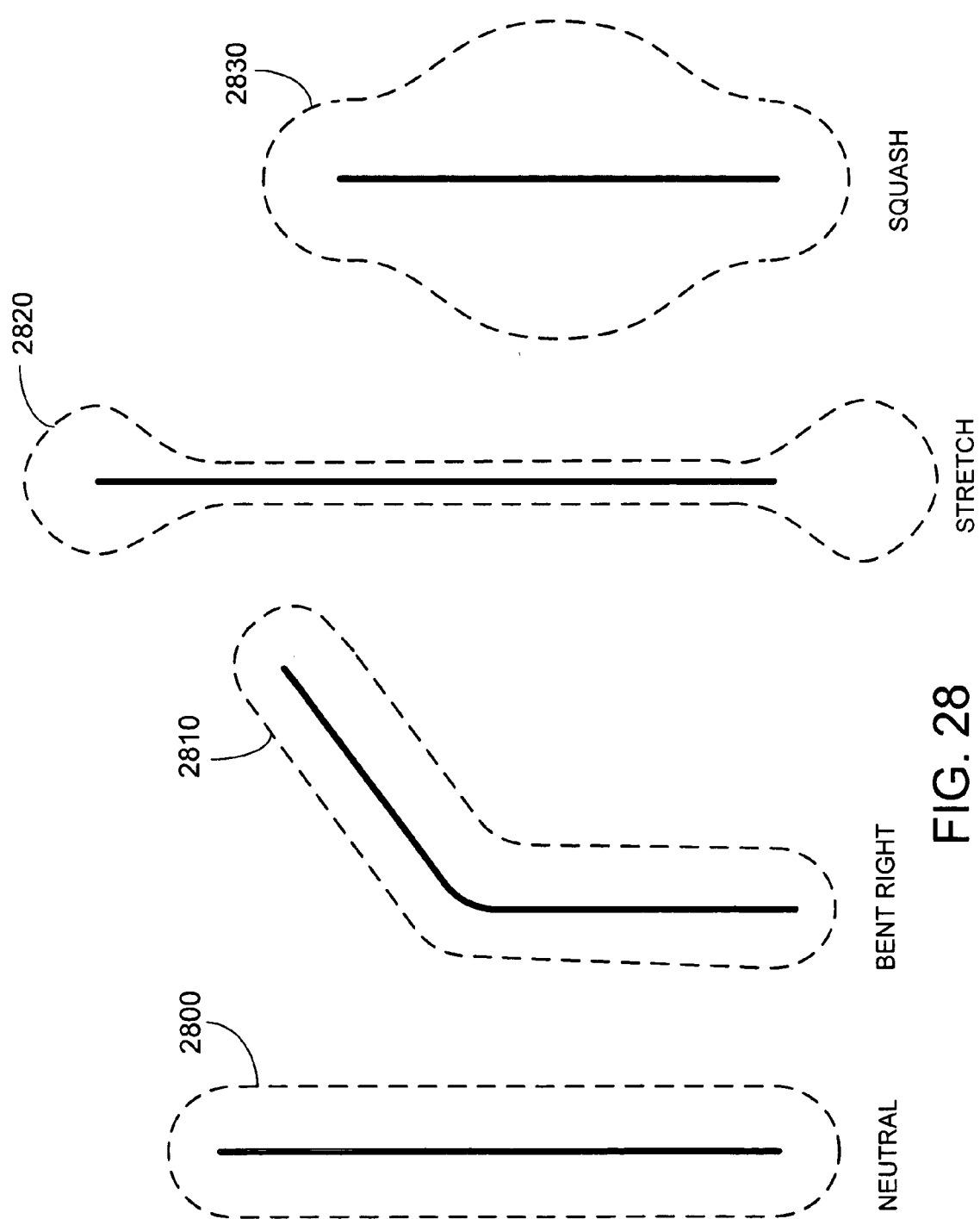
Figure 29:
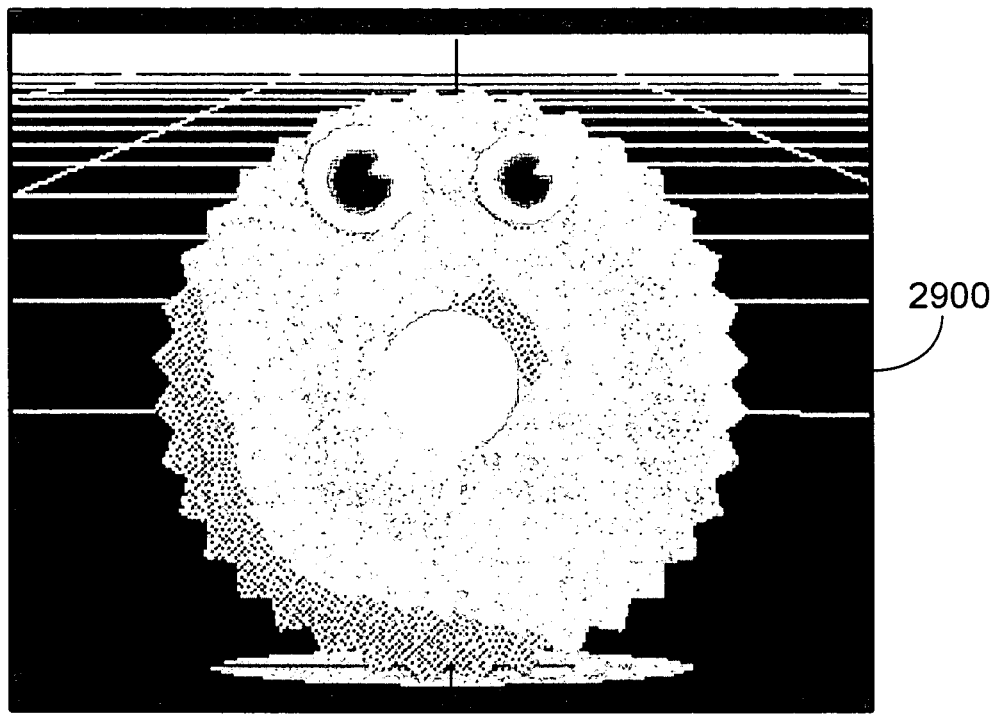
FIG. 29 shows a screen image of an exemplary interactive character.
Figure 30:
FIG. 30 shows a screen image of an exemplary interactive character in a simulated world.

In a preferred embodiment, a Morphing Hose has the property that the polygonal mesh bends and stretches and twists with the control spline. FIG. 28 shows an example with a single Morphing Hose character body in four poses: neutral 2800, bent to the right 2810, stretched 2820, and squashed 2830. Notice that morphing hoses attempt to create the impression of preserving volume. Thus the stretched out pose naturally thins the pose, while the squashed hose is fatter. FIGS. 29 and 30 show a more complex character body in a neutral 2900 and twisting 3000 position.

Morphing Hoses, including these manipulations of the character body, are designed to allow the body to be animated in a high quality, natural, and artistic manner, such as those present in traditional hand-drawn animation.

In a preferred embodiment, the appearance of a Morphing Hose can be modified to adopt the features of any one of several special poses, called morphs, which are deviations from the basic shape or position of the Morphing Hose. These morphs can be shown to a greater or lesser degree depending on the resource values for each morph. The value for each morph is the percentage of that morph to be added to the neutral (base) model.

Figure 31:
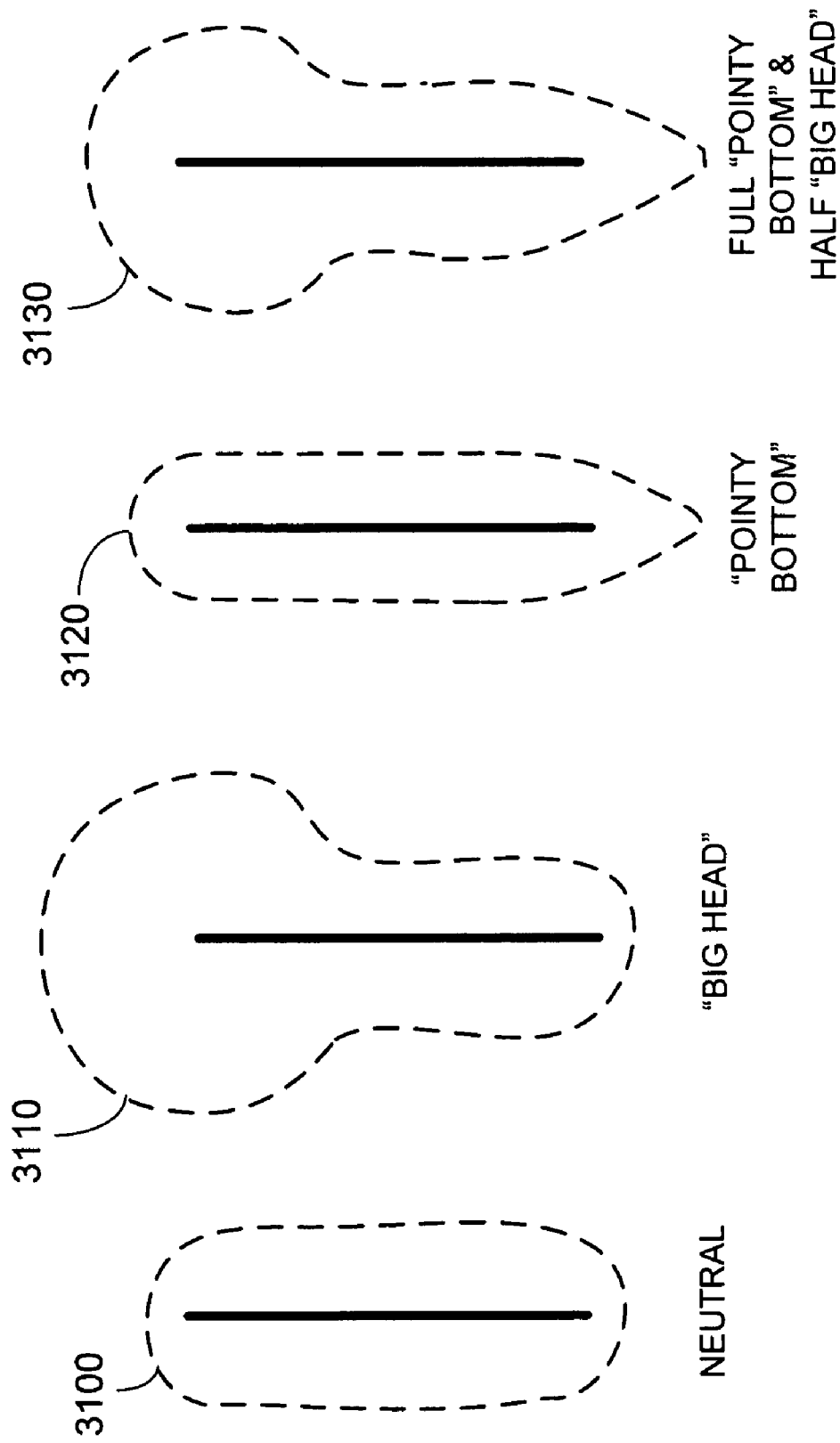
FIG. 31 shows diagrams of exemplary morphing hoses.

For example, a character could have a morph (call it "Big Head") that has a larger and rounder top than the normal appearance of the character body. Additionally, a character could have a morph (call it "Pointy Bottom") that has the body coming to a point at the bottom. The morphs each have a resource that tells the character body how much of each morph to use in the final shape or position of the character. FIG. 31 shows the neutral 3100, "Big Head" 3110, "Pointy Bottom" 3120 morphs, and combination morph 3130 of both "Big Head" and "Point Body.". Notice that the fourth shape 3130 is fully morphed to the "pointy Bottom" morph, but only half morphed to the "Big Head" morph. This results in a shape that is pointy at the bottom, but that has only a slightly enlarged head region.

Generally, resource values are used directly in the character body. Some resources are transformed into alternate representations. For example, sets of angles are sometimes converted into a three-dimensional tangent representation. As another example, several resources are sometimes combined into a transformation matrix.

The character body module is responsible for taking the values of the resources produced by the MSM for each frame and computing the positions of the vertices of the three-dimensional model for the character for that frame. The polygons defined by these vertices are then drawn to produce the character's pose for each frame. The positions of the vertices are also available as data to the other parts of the system.

Standard computer graphics models may be used for the character body module, such as hierarchical models used in many traditional computer games. In such a case, there would be one resource for each degree of freedom in the hierarchical model that the character mind needs to control.

In the preferred embodiment, the character body utilizes an animatable three-dimensional model called morphing hoses. The main goal of morphing hoses is to allow for organic shapes that are easy to control and that can move, squash and stretch in the natural ways that high quality character animation moves, squashes and stretches.

Conceptually, a single morphing hose is a skin or mesh wrapped around a flexible "bone." When the bone is bent, the skin bends with it. When the bone is squashed or stretched (potentially while it is bending), the skin squashes or stretches with it while automatically preserving its volume. As an added layer of control and expressiveness, multi-target morphs can be defined and controlled on a morphing hose.

A single morphing hose is defined by a collection of polygons, some of which may be connected, with a controlling spline positioned relative to them. We refer to this collection of polygons as a "polygonal mesh." The polygonal mesh can have any desired topology and visual attributes such as colors or textures. One end of the spline is defined to be the "head" and the other end the "foot" of the spline. The spline is not drawn.

Variations on this mesh can be created to be used as morph targets in the well-known technique of multi-target morphing. Each variation must have the same topology as the original model, but any number of the vertices can be moved or recolored using per-vertex coloring. A person of ordinary skill in the art will recognize that multi-target morphing techniques may be utilized to manipulate other aspect of the model as well.

Additionally, other 3D models can be specified to be attached to vertices in the morphing hose model. Each attachment has a transformation matrix between its attachment point and the attached model. This matrix is set-able. The attached models can be traditional 3D models or morphing hoses.

A morphing hose is controlled by setting the following controls: a scale factor for each created morph, values for the spline, and values for the transformation matrices of attached models.

The scale factor for each created morph is a percentage of that morph to be added to the base model.

The values for the spline are a head position and a foot position. Both the head and foot are defined as a location in 3-space, a tangent in 3-space, an angle of rotation ("twist") around the pointing axis, and a tangent length for the twist amount. There are also stretch center and stretch width parameters.

The control for an attached model is a set-able transformation matrix.

The shape of the resulting model is defined by the following process.

Starting with the base model position, we apply successive deformations as follows:

First perform multi-target morph on each vertex to get new positions for each vertex using the values for each morph.

Create twist and bend curves as hermite curves using the values and tangents controlled above. Create a stretch curve by computing the length of the bend curve and comparing it with the original length of the spline to compute a stretch amount. Then compute a Gaussian curve with the specified stretch center and stretch width. The curve can be moved along the spine by moving the location of the stretch center. The shape of the curve is affected with the stretch width; smaller widths move most of the body's volume away from the stretch center and towards the ends of the hose; larger stretch widths provide a more smooth distribution of the volume.

Next use the Y component along the spine in the neutral position of each vertex to sample the stretch, twist and bend curves (in the preferred embodiment, this is actually performed only once for each group of vertices that have approximately the same Y component). After the morphing, each vertex is first scaled in the XZ plane by the stretch term, then rotated around the Y axis by the twist term, then rotated so that the Y axis aligns with the tangent of the bend curve (spine), and finally translated along the bend curve to its proper position.

Finally, for each attached model the transformation that moved the point to its current location is transformed into matrix form. This matrix is composed with the set-able matrix, and the composed matrix is applied to all of the points of the attached model.

The resulting polygons of the model are rendered to the screen using a graphics API such as Direct3d or OpenGL available from Microsoft and Silicon Graphics.

V. Simulated World and User Body Modules

In the preferred embodiment, the simulated world is a three-dimensional model with static background images to give more visual richness. At times, the background images can move or change.

In the simulated world, the user may be represented by an avatar, such as a polygonal model of a hand. There may be multiple models that are switched between based on the activity the user is engaged in.

VI. User Interface Module

The user interface module permits the user to control his or her avatar in the simulated world. The user interface module may incorporate any input device that can provide data to a computer program. The data stream can be continuous or discrete. Examples of input devices that can provide data are: a computer mouse, a computer keyboard, a camera, a camera system with a computer vision program filtering the data, a sonar sensor, a microphone, a microphone in conjunction with a speech understanding system, a CAVE system, etc.

In the preferred embodiment, input is provided by a computer mouse. This input is interpreted to control the avatar of the user in the three dimensional world, which is represented as a disembodied hand.

The two-dimensional movements of the mouse are interpreted as movement in three dimensions using the context of the scene. For example, in a scene for playing a game of tag with two characters, the avatar is constrained to move along a two-dimensional plane just above the ground plane, and in a scene in which the user is helping a character sing by conducting, the avatar is constrained to move in a two dimensional plane in front of the character to allow for a natural conducting motion. Other interpretations of mouse movement exist depending on the geometry of the setting and the nature of the activity.

In each of these cases, if the avatar moves into a character, the interpretation of the movement is changed to cause the avatar to move on a plane immediately in front of the character. This gives the illusion of the avatar being "on" the character for physical interactions such as tickling or tagging the character.

This system also controls physical objects in the world. For example, it controls a bouncing ball that can be hit by the user or hit by the interactive character. This system computes those collision events, and performs normal simulated physics to move the ball each frame.

In the course of the interaction, the system may (through the normal audio routines) play sound effects or music associated with acts, events, or phases of an activity. For example, when the user hits a bouncing ball, a sound effect of a hitting ball is played.

VII. Display and Audio Routines

The display routines take polygons and other normal graphical information to be drawn each frame and renders that information to the display device.

The audio routines take buffers of audio produced elsewhere in the system. They mix these separate streams of audio and play them through the computer's audio play mechanisms.

VII. Example of Operation

We now discuss the operation of a particular exemplary embodiment of the invention.

Figure 32:
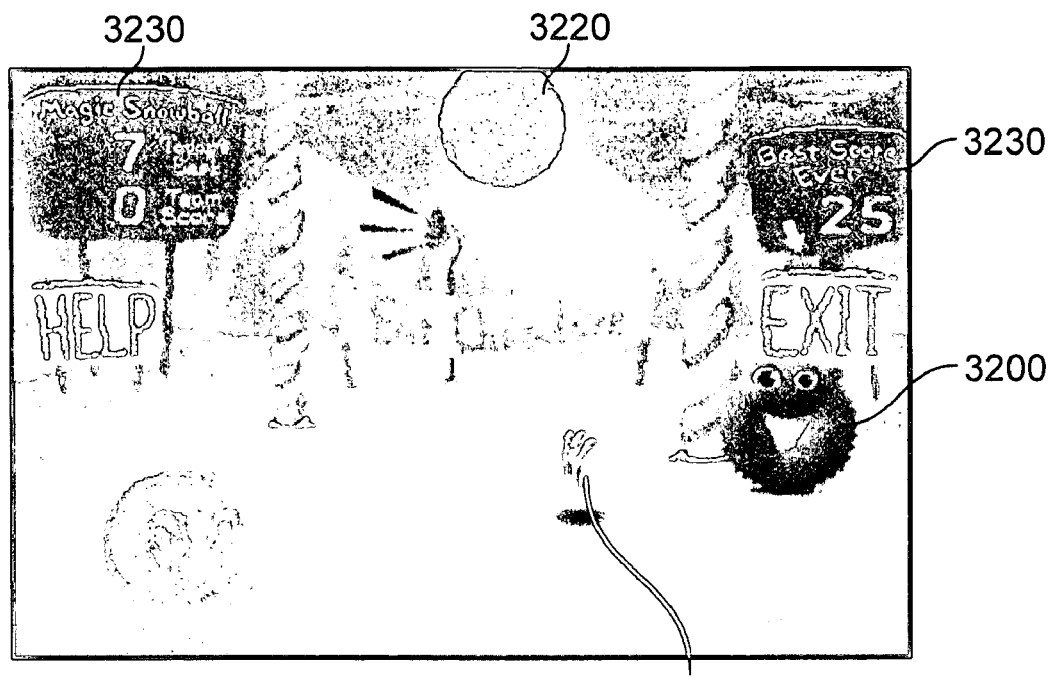
FIG. 32 shows a screen image of an exemplary interactive character in a simulated world.

Referring now to FIG. 32, a character world may contain one or more interactive characters 3200. The world may also contain a user avatar 3210, various inanimate objects and a basic appearance. The characters in the world can sense each other, the user avatar, the objects, and properties of the basic appearance (such as the extent of the physical space). The basic appearance of the world, the characters, user avatar and inanimate objects are all displayed on a computer screen. A person can interact with the system by using input devices such as a keyboard and a mouse. This input can control the user avatar or other aspects of the world.

In FIG. 32, the user avatar 3210 is in the shape of a hand. It can be controlled by the user using a mouse. Interactive character 3200 is in the form of a peanut butter cup. The ball 3220 in the figure is an object that can be hit by the user avatar and the character, and sensed by the character. The signs 3230 with current score and high scores can both be sensed by the character.

Figure 33:
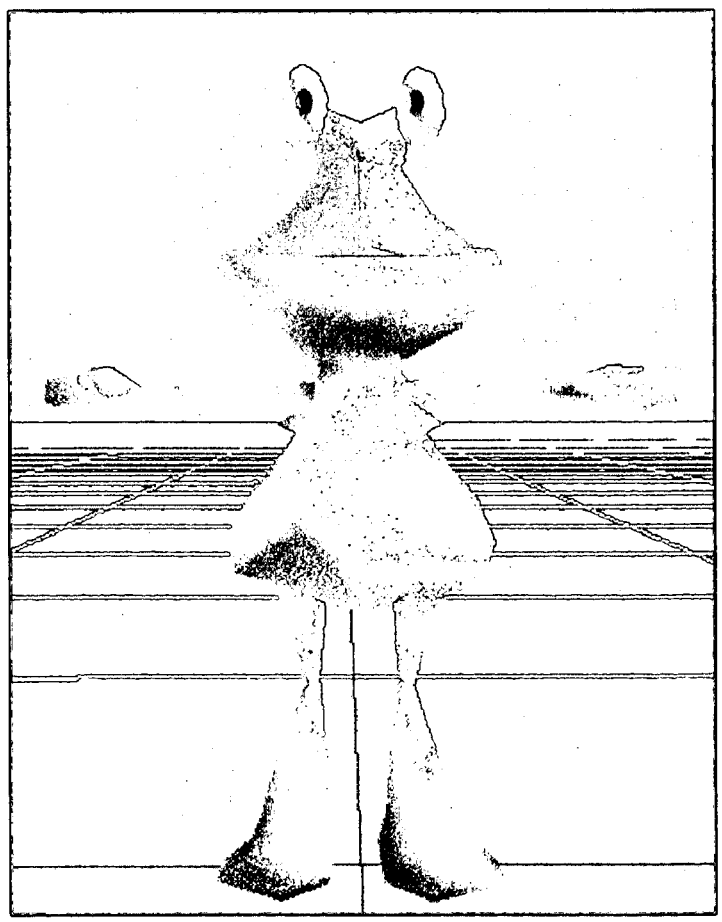
FIGS. 33-37 show screen images of exemplary interactive characters.

An alternative body form for an interactive character is shown in the FIG. 33.

The components of an interactive character include a physical body model which may include one or more morphing hoses; zero or more morph targets if the model contains a morphing hose; a number of recorded sound utterances; a number of pitch, duration and volume curve sets for each recorded sound utterance; a number of acts; and a number of goals and behaviors for those goals.

The interactive character 2900 in FIG. 29 has a physical body that is a single morphing hose with 6 attached rigid models. There are two attached rigid models for the eyes, two for the top eyelids and two for the bottom eyelids. The main body (except for the eyes) is the morphing hose. In the neutral state, the controlling spline of the morphing hose is positioned along the line segment from the bottom of the model to the top of the model, centered in the model from front to back and side to side.

Figure 34:
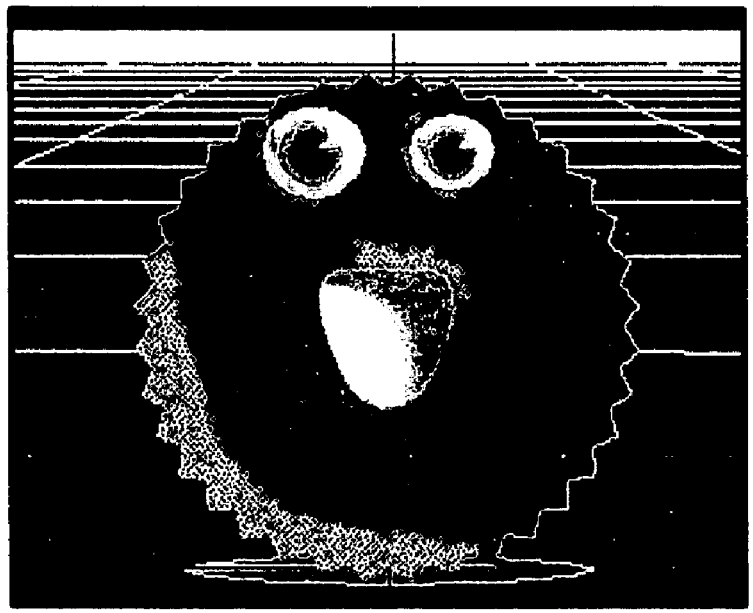
Figure 35:
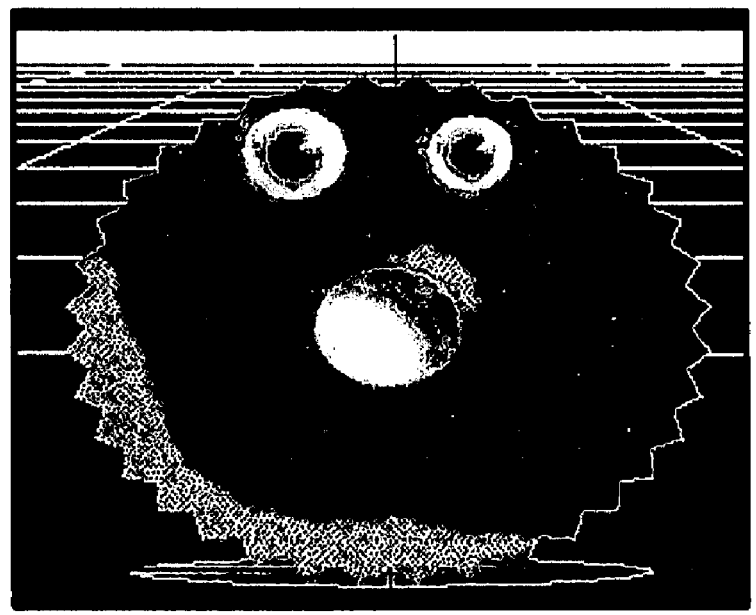
Figure 36:
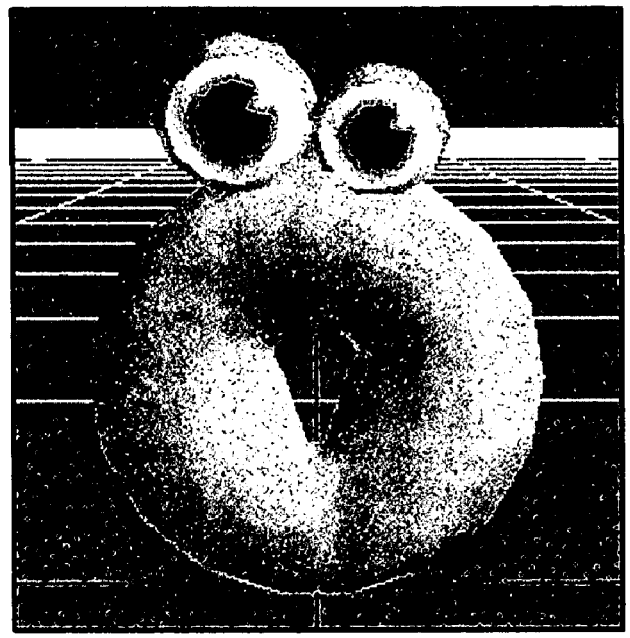
Figure 37:
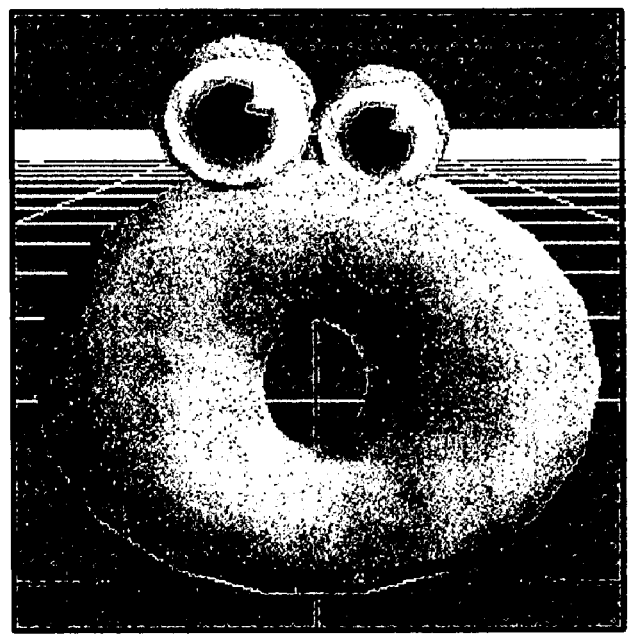

There are several morph targets in the character. Two important ones are the ones for breathing and smiling. FIG. 34 shows the morph target for the smiling act is one in which the vertices around the mouth have been moved into a smiling shape of the model. FIG. 35 shows the morph target for the breathing act is one in which many of the model's vertices have been moved to make it look like the character is holding a full breath. FIG. 36 shows an alternative morph target for an alternative character for the smiling act. FIG. 37 shows an alternative morph target for an alternative character for the breathing act.

The character also includes several recorded utterances that are pre-recorded by a voice talent who said them in the characteristic voice of the character. Two utterances are of the word "yes" said in a neutral way, and the phrase "it's my turn" said in a neutral way.

For each utterance the character can include a number of sets of pitch, duration and volume curves. For this character's "yes" utterance there are sets of curves that make the utterance sound happy, sets of curves to make it sound sad, sets of curves to change its intonation to that of a question, etc. For the "it's my turn utterance" there are sets of curves for each of the emotions, happy, sad, etc.; sets of curves to change its intonation into that of a question; and three sets of curves to add emphasis to the phrase—one to emphasize the word "it's", one to emphasize "my", and one to emphasize "turn".

Each of these pitch, duration and volume curve sets is created before the system is executed. They are created by the character author such that when they are applied to the recorded utterance using the sound manipulation system they produce the desired subjective effect in the modified speech.

An alternative method for creating the pitch, duration and volume curve sets is to use the method described in the section entitled deriving curves automatically.

The character includes several acts as well. LookWithHead and LookWithEyes are acts that use inverse kinematics to move the character's head and eyes respectively to track a target. Jump is an act described previously that makes the character perform one jump to a target. The character also includes a jump to jump transition as described previously that appropriately links the motion of two jump actions in sequence. Similarly, shuffle is an act that produces one shuffling step to a target location. A sequence of shuffles can be issued to move the character continuously. The character also includes a shuffle to shuffle transition that can appropriately link the motion of two shuffle acts in sequence. Squashdir is an act that can cause the character body to squash or stretch in any direction. Headlean is an act that can turn and tilt the character's head. Smile is an act that causes the character to increasingly apply larger percentages of its smile morph target until it reaches the desired amount, and then holds it there. This causes the character model to start smiling and hold the smile. Breathe applies increasing amounts of the breathe morph target over time until it reaches the desired amount and then applies decreasing amounts of the breathe morph target until it reaches zero. The character also includes acts to speak as described previously.

The character includes a number of goals and behaviors. Smile-when-cheerful is a top-level demon that runs concurrently with the character's other behaviors. Breath-periodically is a top-level goal and behavior that also runs concurrently. Handle_goal_success, handle_likely_goal_success, and the other emotion behaviors described previously are also top-level behaviors that run concurrently. Another top-level goal of the character is one to play a game with the user: play-magic-snowball. This is a game in which the character and user take turns hitting the ball to keep it from hitting the ground. The goal is marked persistent and the behavior includes two goals in sequence: watch-and-encourage-user and my-turn. The character also includes a passive goal, break-record, that is marked with a non-zero importance-of-success and importance-of-failure. The behavior for watch-and-encourage-user includes goals to watch the hand, watch the ball, and occasionally glance at the scoreboard. The behavior for my-turn includes a goal to monitor the hand position relative to the ball, as well as the two goals wait-to-hit-ball and hit-ball with accompanying behaviors that express respectively how the character waits when the user is in his way during his turn, and how he goes toward the ball and hits it when the user is not in his way.

We now describe the operation of the character in the world in a particular scenario. In this scenario, the user and the character are playing the game of taking turns hitting the ball into the air to keep it from hitting the ground. The system keeps track of how many times the character and user alternate hitting it in a row without it hitting the ground. This information is displayed on the screen as the "team score" as shown in FIG. 32. The system also keeps track of two high scores: today's high score, and the absolute high score. These are both displayed on the screen as "Today's Best" and "Best Score Ever" respectively.

At the beginning of the scenario, the user has just hit the ball with the hand avatar by colliding with it. The ball is moving away from the hand into the air. The hand is positioned below the ball. Today's Best score is 7, the Team Score just changed from 0 to 1 because of the user hitting the ball, and the Best Score Ever is 25. The character is executing the goal watch-and-encourage-user, and the acts LookWithHead and LookWithEyes are both executing with the hand avatar as the target of each look act.

A sensor in the character mind notices that the user just hit the ball. The information provided by the sensor causes a success test in the character mind to fire which, through the propagation of success, causes the goal watch-and-encourage-user to succeed. This causes the two executing look acts, LookWithHead, and LookWithEyes, to be aborted. This allows the next goal in the sequence to execute. This goal is the my-turn goal.

This goal is then pursued by expanding it and its subgoals. This gives rise to two acts to look at the ball with the head and eyes, and a behavior that monitors the hand's position relative to the ball. This behavior recognizes that the hand is still directly under the ball, which the character interprets as the user blocking him from hitting the ball. (One of the personality traits of the character is that he is polite. This is manifest in a number of small choices throughout his behavior. In this case, the character will defer to the user if he thinks the user is trying to hit the ball again.) Because the hand is directly under the ball, the character starts a wait-to-hit-ball behavior. This behavior issues acts to look at the hand, and then acts to look directly out of the screen. This is to connect with the user's avatar and the user outside of the screen. If the user continued to stay under the ball, this behavior would continue to watch the hand, watch the ball, look directly out of the screen, and do other goals, acts and behaviors that show that he is waiting to be able to hit the ball.

Instead of staying under the ball, though, at this point the user moves the hand out of the way. This causes a success test to cause the wait-to-hit-ball goal to succeed, which causes the goal and its subtree to be removed from the ABT. This causes the look act that is looking out of the screen to be aborted in the MSM.

This allows the goal hit-ball to execute to move the character under the ball and hit it. Over time this goal's behavior issues a sequence of shuffle acts toward the ball and then SquashDir and HeadLean acts to hit the ball.

Each of these acts is executed over time in the MSM. The look acts are IK acts that for each frame compute angles for the head and eyes to move them toward the position of their target that frame. On each frame this computation uses the position of the body, the position of the target, and the velocity and acceleration limits that are given as parameters to the act to compute a new angle. The angles are then turned into the appropriate form for the body part being controlled. For the head, the angles are converted into tangents and twist amount for the top of the spline of the character body's morphing hose. For the eyes, the angles are converted into a transformation matrix for each eye model to control how the eye is positioned relative to its attached vertex on the morphing hose skin.

The shuffle acts control the translation and rotation of the whole model as well as parameters that control the shape of the spline and twist of the morphing hose. The tangents and twist at the top of the spline are defined as an optional bundle of the shuffle act, so they can be overridden by the LookWithHead act or other acts that need to control the angle of the head. Transitions between subsequent shuffle acts cause the shuffle motion to be continuous and appropriately linked.

The behavior then issues a sequence of SquashDir acts to squash down, and then squash up to reach the ball, and a HeadLean act to hit the ball when his head is in position. These acts all control the shape and twist of the morphing hose spline.

The execution of the morphing hose positions the vertices of the character body each frame based on these controlling parameters along with others from other acts issued by the mind. An image of the character at one frame of this process can be seen in FIG. 30. In this frame, the character is in the middle of a movement in which his body is stretching, bending and twisting to hit the ball while the morphing hose automatically preserves volume. The eyes are attached rigid objects.

Figure 38:
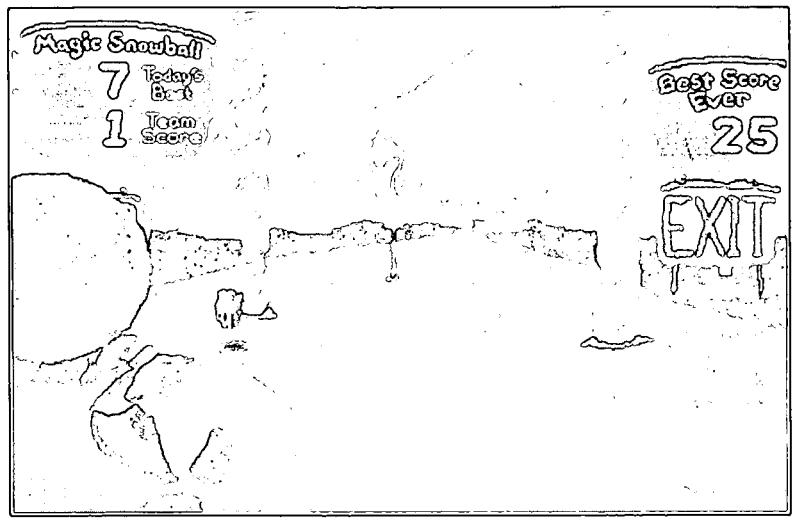
FIG. 38 shows a screen image of an exemplary interactive character in a simulated world.

An image of an alternative character at the same point in the scenario is shown in FIG. 38. The location of the ball and the position of the character hitting the ball are influenced by where the user hit the ball.

The goal hit-ball has a non-zero importance-of-success and importance-of-failure. The success of that goal is recorded by the character mind's reflection mechanism. Handle_goal_success then creates a happiness emotion. Hitting the ball also increases the score. Because the score is now close to the high score, Handle_likely_goal success computes a likelihood of success for the character's break-record goal, and this causes the creation of a hope emotion. The behavioral feature mapping creates an act cheerful behavioral feature from the happiness emotion and act_with_anticipation behavioral feature from the hope emotion.

A concurrently executing behavior for the smile-when-cheerful goal notices the creation of the act_cheerful behavioral feature by the firing of a demon. This behavior then issues a smile act. Next the demon in the behavior for breathe-periodically fires, causing the character to take one of his periodic breaths by issuing a breathe act. As described, both smiling and breathing are done by applying morphs to the model. The morph target for the smiling act is one in which the vertices around the mouth have been moved into a smiling shape of the model. The morph target for the breathing morph is one in which many of the model's vertices have been moved to make it look like the character is holding a full breath. The smile act applies increasing amounts of the smile morph over time, until it reaches the desired level of the smile, and then holds it there. The breathe act applies increasing amounts of the breathe morph to a full breath and then applies decreasing amounts of the breathe morph back to the neutral state. Since these acts are executing at the same time at this point, each of these morphs are applied together for a series of frames at their respective percentages each frame.

In the same frame as the issuing of the smile and breath acts, the behavior for the my-turn goal continues and starts a behavior to say "yes". The behavior queries the emotional state, and issues an act to say the word with the pitch, duration and volume curves created for happiness, and with a scale factor that is a function of the intensity of the act_cheerful behavioral feature.

The curves are each scaled by this scale factor.

After the curves are scaled, the mechanism for automatic distortion prevention is then applied.

The curves are then passed to the sound manipulation system to create the appropriate modified sound and play it. This results in a happy "yes!" to be said by the character.

The same act that does this processing, also controls the mouth morph and tilt of the eyelids. This is done using gestures that were created to synchronize tightly with the base recording and applying a time warp to the gestures that is derived from the final duration curve for the speech. This causes the motion of the mouth and eyelids to correspond tightly to the modified speech that is output.

Next the character starts executing its watch-and-encourage-user goal and behavior again. This causes it to move out of the way of the ball to give the user room, and then to turn to watch the user and the ball. Because of the act_cheerful behavioral feature, the acts to walk away are issued with shorter duration to cause the character to walk away faster. A SquashDir act is also issued to make the character stand a little taller to express the cheerfulness.

The behavior for watch-and-encourage-user also queries the act_with_anticipation behavioral feature. Since this feature is now non-zero, this behavior increase the frequency of changing what the character is looking at (the scoreboard, the hand and the ball), and increases the velocity of the eye and head motion for these glances to give a more nervous quality to the movement.

During this behavior the happiness emotion decays gradually. This decay causes lower intensity of the act_cheerful behavioral feature. This lowers the amount of the smile morph that is applied (and therefore the amount the character is smiling), the speed of the character, and the amount the character stretches upwards. Each of these gradually decreases as happiness decays.

After the user hits the ball with the hand, he stays under it. The character watches as before, but this time the user keeps the hand under the ball and hits it instead of allowing the character to take his turn.

This causes the hit-ball goal to fail, which causes a sadness emotion to be created and an accompanying act_glum. This situation, and the sadness emotion and act_glum behavioral feature cause the character to choose "it's my turn" to say.

It chooses to say it in a sad way and by emphasizing the word "my". It does this by using pitch, duration and volume curves that were created for this recording to express sadness, and separate pitch, duration and volume curves that were created to emphasize the word "my". The sadness curves are scaled by the amount chosen based on the character's current level of sadness. These curves are combined as described earlier, and automatic distortion prevention is applied to the curves. The resulting curves and the recording are sent to the sound manipulation system to create the appropriate modified sound and play it.

Figure 39:
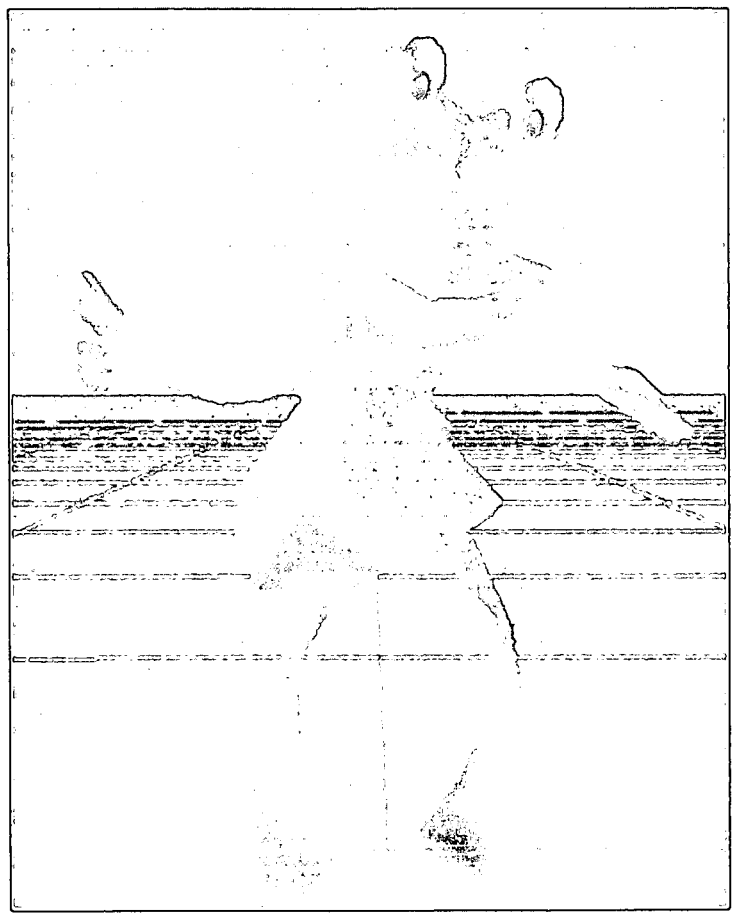
FIG. 39 shows a screen image of an exemplary interactive character.

Another possible character body is the one shown in FIG. 33. This character is made up of a hierarchy of morphing hoses and rigid models. There is a separate spline for each arm, each leg and the head. There is a single polygonal mesh for the hierarchy of morphing hoses. The eyes and eyelids are all rigid models that are attached to the mesh. An example of the character body moving is illustrated by FIG. 39 which shows a pose in which the model is in an appealing pose by bending, stretching and twisting the various morphing hoses while they automatically maintain the body parts' volume.

The interactive behavior and capabilities described in this exemplary embodiment show a range of qualities of the invention. The character is aware of the user, highly expressive, and has a specified personality. The character appears to be intelligent, and appears to have common sense knowledge, knowledge of social norms and social knowledge. For example, the character is aware of the user's avatar throughout, and shows awareness of the user outside the simulated world who is controlling the avatar. It also is aware of the social meaning of various user actions. For example the character shows awareness of turn taking; awareness that the hand's location appears to imply that the hand could be taking the character's turn; and that this might imply that the user is being mean to the character and not playing fair; etc. The character shows similar knowledge, awareness and intelligence when the character notices the user moving aside which socially and to some extent physically allows the character to take his turn. The character also shows intelligence, common sense and social knowledge when watching and encouraging the user during the user's turn and by being aware of personal space throughout, for example when moving out of the way to allow the user to hit the ball. The character also shows common sense, intelligence, social knowledge when he is aware of the meaning of the closeness to the high score and the increased importance of being careful to not miss as the team of he and the user get increasingly closer to reaching the high score.

IX. Delivery System

In many circumstances, it will be desirable to deliver code for presenting an interactive character to a user over a network. For example, a user may be viewing a web page and indicate an interest in viewing an interactive character presentation. We now describe methodologies suitable for delivering interactive character content to a user over a network.

Figure 40:
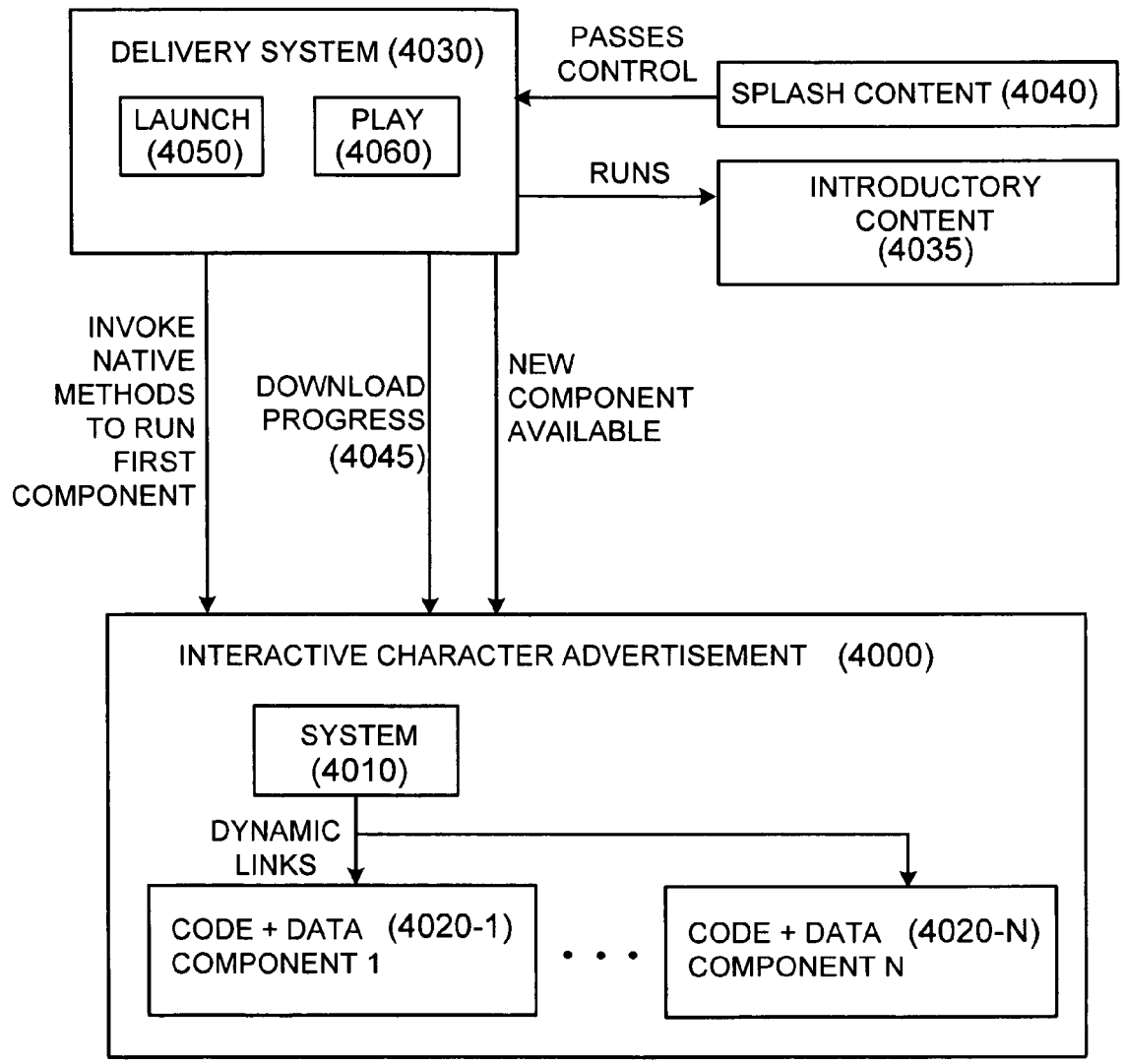
FIG. 40 shows elements of an exemplary content delivery system.

FIG. 40 is a functional diagram illustrating the operation of program modules in processing engine 115 according to an embodiment of the present invention. Interactive advertising program (AP) 4000 includes a system engine 4010 and one or more code/data components 4020-1 through 4020-N. These modules together include native code (i.e. code that can be executed directly by the hardware of processing engine 115) and data for presenting interactive content (e.g., an interactive advertisement), to a user. The number of components in AP 4000 depends on the size and nature of the AP. The system engine includes "essential" code that is necessary for the other code/data components to operate. For example, it may include a set of dynamically linked libraries (DLLs) that implement core interactive systems including animation, rendering, audio, speech, and various behavioral systems. In some embodiments, a system engine may be unnecessary.

As will be explained in more detail below, system engine 4010 and code/data components 4020 are designed for streaming operation. That is, they are designed to be loaded onto processing engine 115 incrementally (e.g., from server 125) so that code or data from certain code/data components may be utilized to begin presenting interactive content before all of the code/data components 4020 have been loaded into processing engine 115. This technique permits the apparent download time of AP 4000 to be dramatically reduced.

Also shown in FIG. 40 is delivery system (DS) 4030. DS 4030 represents non-native code (e.g., Java code or Flash animation) that may be executed in browser system 130 during the download of advertising program 200. DS 4030 displays introductory content 4035 to the user. Because DS 4030 is non-native code, it will typically be unnecessary for the user to grant permission to run this code, whereas it may be necessary for the user to grant permission before the native code in advertising program 4000 may be run. By downloading and running delivery system 4030 before the downloading of advertising program 4000, the moment when the customer grants permission for installation and execution of native code may be delayed until the first native code component is ready to be run, without having to delay presentation of information to the user during this period.

DS 230 includes two applets Launch 4050 and Play 4060. The Launch applet is responsible for streaming and installation of native code, and the Play applet is responsible for communication with native code. These applets will be described in more detail below.

The download of the DS itself may also be covered up by the running of an even smaller Java applet (or Flash movie or the like) (splash applet 4040) during the download of DS. Once the DS is downloaded, the splash applet 4040 passes control to the DS.

In addition to displaying the introductory content 4035 to the user, the DS 4030 is also responsible for coordinating the downloading of AP 4000. After the first component of the AP 4000 had been downloaded, DS invokes the native methods that run that component. In the preferred embodiment this is the system engine 4010. However, if that is not used, then the first component will be the first code/data component 4020-1.

After the first AP component has been downloaded, the DS continues to coordinate the downloading of additional AP components. As such modules are being downloaded, the DS sends download progress messages 4045 to the AP 4000 reporting on the download progress of any remaining components. This allows AP 4000, to alter its behavior depending on download performance. For example, if the download is slow, the AP 4000 can compensate for this dynamically to prevent earlier segments from "running out" before new ones are in place. When a component has finished downloading, the DS sends an availability message to the AP. This permits the AP code to dynamically link with the new content as soon as it is available.

Figure 41:
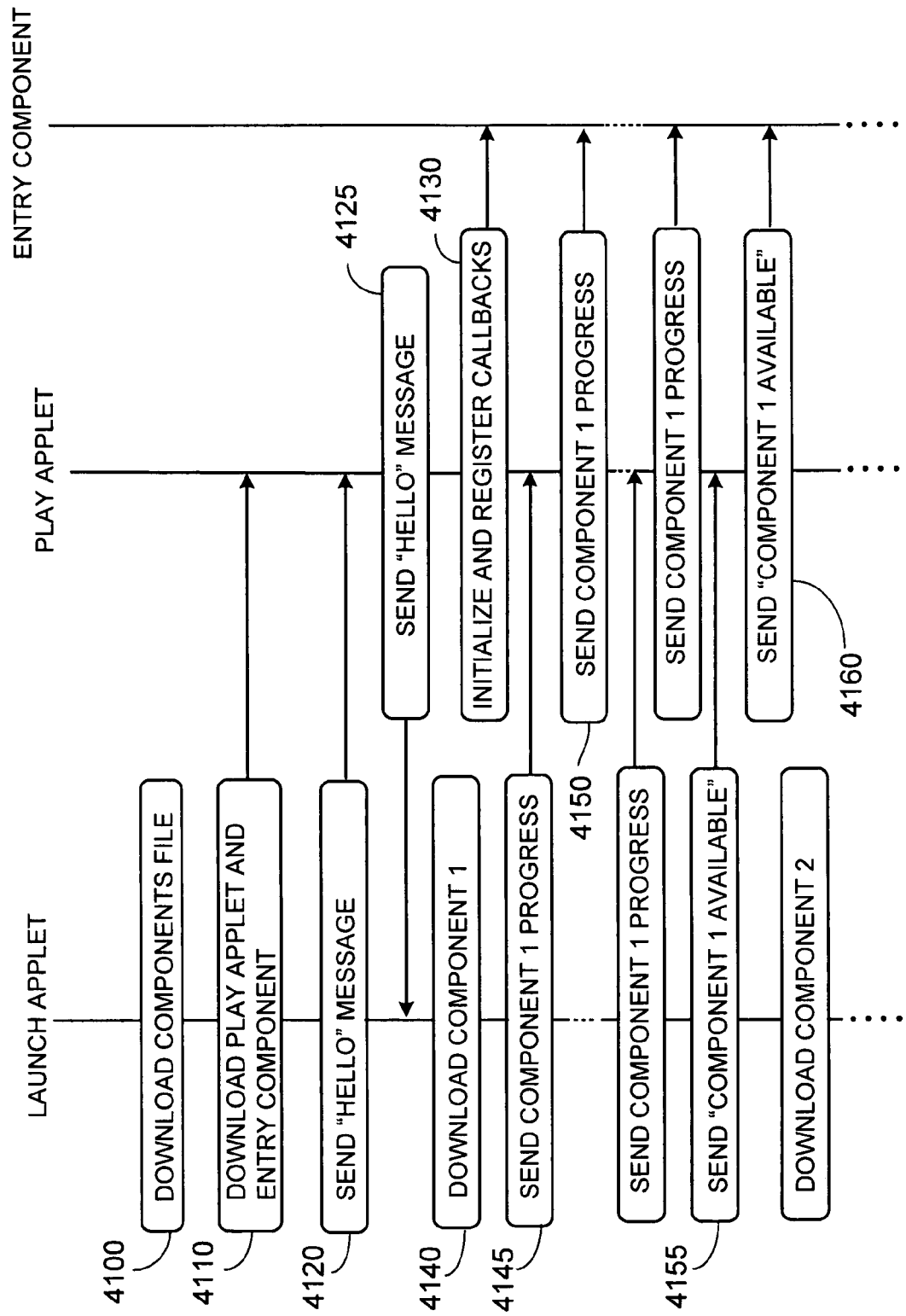
FIGS. 41-42 are flowcharts.

We now describe in more detail the operation of Launch applet 4050 and Play applet 4060. Referring now to FIG. 41, when the user first visits a web page containing the Launch applet, the following sequence of events occur:

1. The Launch applet downloads a "components file". This file specifies what components are to be downloaded, including the Play applet and the native code libraries, along with associated information described below (step 4100).

2. The Launch applet downloads the Play applet and a small native code library called the "Entry component". These are installed as described below and the Play applet is executed (step 4110).

3. The Launch and Play applets create a communication channel and exchange messages to establish contact (steps 4120, 4125).

4. The Play applet invokes an initialization routine in the Entry component and registers callbacks that permit native code to contact the Play applet (step 4130).

5. The Launch applet downloads additional components one at a time, notifying the Play applet periodically with download progress messages, which the Play applet forwards to the Entry component (steps 4140, 4145, 4150).

6. When a component download is complete, it is installed as described below. The Launch applet sends a "component availability" message to the Play applet (step 4155), which forwards it to the Entry component (step 4160). If the component contains code, the Entry DLL can dynamically link with it and execute it at any time thereafter.

A. Applet Security

In order for the Launch and Play applets to work as described above, it may be necessary to be able to execute native code from the Play applet. The Netscape Navigator and Microsoft Internet Explorer browsers differ significantly in their applet security models and how calls to native code segments are handled. We shall now briefly summarize these security models and sketch their impact on the implementation of the Launch and Play applets.

Both Netscape and Internet Explorer impose constraints on the actions that can be taken by ordinary applets. For example, ordinary applets cannot directly read from or write to the file system, communicate with arbitrary servers on the network, or invoke methods in native code libraries. Ordinary applets are permitted to communicate with the server from which they originate, and they can communicate with other applets that originate from that server.

Applets can gain additional privileges if they are digitally signed to authenticate their origin and prevent tampering. The nature of these privileges and the manner in which they are acquired differ significantly in Netscape and Internet Explorer.

1. Netscape Applet Security

The Netscape Navigator applet security model is based on capabilities: a signed applet must obtain permission from the user to acquire specific capabilities like accessing the file system, communicating with arbitrary network hosts, or invoking native methods.

In the Netscape security model a single permission request can be used to acquire both file system access and native method capabilities, but a separate permission request is required to gain unrestricted network communication capabilities. In addition, non-local applets cannot directly invoke native methods.

A preferred Netscape Navigator based implementation of the Launch and Play applets addresses these restrictions as follows:

The Launch applet is signed. Before installing the downloaded code/data, it requests file system access privileges. Because it is desirable to postpone presentation of the permission request to the user (so that they have time to experience the web site more fully), the Launch applet buffers downloaded content until the Play applet, the Entry component, and the first additional component have fully downloaded.

The Play applet is locally installed by the Launch applet, so it can obtain native method capabilities after requesting permission from the user. Methods for doing this are described in Mark Roulo, "Reduce the launch time of your applets: Store them on Client Machines." JavaWorld. June 1997, http://wwwjavaworld.com/javaworld/jw-06-1997/jw-06plugins-2.html. Acquiring native method capabilities also permits the Play applet to access the local file system.

The Launch and Play applets do not originate from the same server, so they are unable to communicate using typical inter-applet communication techniques. Since both applets can access the file system, they communicate by reading and writing shared files.

2. Internet Explorer Applet Security

A preferred Internet Explorer based applet security model is trust-based: when a signed applet is loaded, the user is informed of the identity of the applet author and asked to provide blanket permission for a wide range of capabilities. The applet itself does not specifically request permission from the user.

The Internet Explorer implementation of the Launch and Play applets is adapted to this security model as follows:

The Launch applet is unsigned, so that the user is not immediately presented with a permission dialog box. This allows the user to experience the web site more fully, and makes it more likely that the user will grant permission when asked.

Since the Launch applet is unsigned, it is unable to install the downloaded content. So it buffers the downloaded content until the Play applet is running. It then uses conventional inter-applet communication techniques to transfer the downloaded content to the Play applet for installation. Such techniques are described, e.g., in John D. Mitchell. "Java Tip 3." Java World. March 1996, http://www.javaworld.com/javaworld/javatips/ jwjavatip3.html, "Inter-Applet Communication on the Same Page." Real's Java How-to, http://www.rgagnon. com/iavadetails/iava-0022.html, and "Inter-Applet Communication Across Different Frames." Real's Java How-to, http://www.rgagnon.com/javadetails/java-0023.html The Play applet is signed and configured for permanent installation by the Java Package Manager of Internet Explorer. The Launch applet does not directly install the Play applet, but simply loads an HTML page containing a reference to it. When the page is loaded, the browser prompts the user to grant permission and then installs the Play applet. Such installation eliminates the need for permission dialogs in successive sessions.

B. Downloading Mechanisms

The Launch applet is responsible for downloading the Entry component, and all successive components. Each of these components can consist of multiple files. The files making up each component are specified in the "components file", which includes the following information for each file:

The file name
The file length
The file type
A version number
An MD5 checksum

The file type is a string that specifies how the file should be installed. For example, the Entry component is a native code library that is loaded by the Play applet, so it must be installed in a certain directory where the browser can find it.

The version number permits revised versions of components to be delivered to the end user while avoiding duplicate downloading of components that have previously been installed. When a component is installed, the version number is recorded on the user's file system. After downloading the components file, the Launch applet compares the version numbers it specifies against the version numbers of any components installed on the user's system. Components that have not yet been installed or that are out-of-date are enqueued for downloading.

A novel mechanism is used to record and check component version numbers on the user's file system. In the Internet Explorer implementation, the Launch applet is unsigned, and therefore does not have permission to directly access the file system. However, it can load Java class files that may have been written during a previous session in which components were installed. Each component therefore includes a precompiled Java class file that defines a variable containing the version number of that component. When a component is installed, the corresponding class file is installed in a directory in the user's CLASSPATH, so that it can be located by the Java class loader in future sessions. The same mechanism is employed in the Netscape implementation even though the Netscape Launch applet is signed. This permits the Launch applet to postpone presentation of the permission dialog that is needed to access the file system. Postponing the permission dialog permits users to experience the web site more fully while the downloads progress, making it more likely that permission will be granted.

The components file specifies an MD5 checksum for each file. These checksums have the property that it is infeasible to modify the contents of the file while preserving the checksum. The checksums are used by the Internet Explorer implementation of the Play applet to verify that the content provided by the Launch applet is authentic. The Play applet fetches the components file from a trusted server and computes the checksums of the files provided by the Launch applet prior to installation. This makes it infeasible for a rogue applet to trick the Play applet into installing arbitrary content.

C. Alternative Embodiment: A Single Java Applet

The embodiment described above employs two applets: the Launch applet downloads the Entry component, and the Play applet invokes the native methods contained therein. However it is also possible to download, install, and invoke native methods in the Entry component using a single applet. Although Netscape Navigator prohibits non-local applets from invoking native methods, the entire applet need not be locally installed. Instead, one can install only those classes that directly invoke native methods. Such classes are loaded by the system class loader rather than the applet class loader, so they are afforded broader privileges. Techniques for doing this are described in Steve Small, "Escape the Sandbox: Access Native Methods from an Applet," JavaWorld. October 1998, http://www.javaworld.com/jw-10-1998/jw-10-apptowin32.html.

D. Alternative Embodiment: Background Fetcher

In an alternative embodiment, the DS need not present any content to the user during the downloading of the first component of the AP. In this embodiment, the DS runs in the background while the user continues to use a web browser to view a web site. The AP 100 will run on (or within) this web site after the first component of the AP 100 is downloaded and ready. Because the DS runs in the background, the user's interactive experience with the web site is not interrupted before the AP is able to begin operation.

We now present a mechanism for downloading components of the AP without significantly affecting the throughput or latency of simultaneous browsing by the web browser user. Although this mechanism is described in the context of downloading the AP, it may be utilized for downloading any programs or data in a web client application such as an applet, browser plugin, or browser script.

This mechanism provides several benefits, among which are:

A web client application can prefetch new content without the user's knowledge while the user browses other content. When the new content has been downloaded it can be viewed with low latency.

This mechanism makes maximal usage of network bandwidth by downloading content when the user's network connection would otherwise be idle.

The basic operation of this mechanism is as follows. When the user requests (or a server initiates) downloading of certain large files (e.g., files known to be large enough to require noticeable download time), the files are downloaded using an applet called the "Fetcher." The Petcher's downloading operation is capable of being temporarily suspended if, during the download process, the user makes intervening requests to download content. The Fetcher's download process can then be restarted after the intervening download has completed. In this way, the download of a large file or collection of files can be performed without interfering with or noticeably affecting subsequent download processes.

Instances of the Fetcher can be embedded in any number of pages on a web site, along with a list of files to be downloaded (for example, a list of URLs). The basic operation of the Fetcher is as follows. When the first instance of the Fetcher applet is activated, it spawns a download thread that begins downloading the files on the list of files to be downloaded. The Fetcher continues downloading these files until all of the files have been downloaded, or until a "deactivation" method associated with the Fetcher has been invoked. If the deactivation method is invoked, the Fetcher suspends downloading of files. This suspension lasts until an "activation" method associated with the Fetcher is invoked. Invocation of this method causes downloading to continue where it left off. If the deactivation method is invoked once again, the Fetcher suspends downloading until the activation method is also once more invoked, etc.

As the downloaded files are received by the Fetcher, they are buffered in memory as described below for subsequent use by other web client applications. These applications can obtain the downloaded content from the Fetcher using the content transfer mechanism described below.

In order for the Fetcher to avoid interfering with subsequent user-initiated downloads, it is useful for the Fetcher's deactivation method to be invoked when user action causes new content to be downloaded, and for the activation method to be invoked when the new content has completed downloading.

The invocation of the deactivation method can be done by programming an event handler associated with an HTML document to invoke the deactivation method in response to a user's action. For example, if the user clicks on a link in the currently displayed document (or manually enters a URL into the web browser), the document's onUnload() event handler is invoked. This event handler can be programmed to invoke the Fetcher's deactivation method. Alternatively, if the user submits a form or performs some other browsing action that has an associated event handler, the associated event handler can invoke the Fetcher's deactivation method.

The deactivation method may also be invoked when non-HTML files are being displayed. For example, a user may trigger a download request when a Flash movie is being displayed. In that case, the Flash movie can issue an FSCommand() action that invokes the Fetcher's deactivation method. In general, the deactivation method can be invoked by any kind of user browsing activity that can be detected by a scripting language that can invoke the Fetcher's deactivation method.

When the new content has been downloaded, the Fetcher's activation method can be invoked to restart the download. In the case of an HTML document, the document's onLoad() event handler is executed when the document (and any embedded images) finishes loading. This event handler can be programmed to invoke the Fetcher's activation method. If the new content is not an HTML document, then analogous techniques may be used. For example, if new content is a Flash movie, an FSCommand() action in the final frame of the movie can invoke the Fetcher's activation method. Alternatively, JavaScript or VBScript can poll the Flash player via its PercentLoaded() method to determine when a movie has been fully downloaded, and then subsequently invoke the Fetcher's activation method. In general, the activation method can be invoked in response to the completion of any content download that can be detected by a scripting language that can invoke the Fetcher's activation method.

These techniques can also be used to prevent the initial instance of the Fetcher from commencing downloads before the web page containing the Fetcher has fully loaded.

Sometimes, the Fetcher is invoked from a web site that employs multiple frames. In this case, it may be desirable for the Fetcher not to initially become active until all of the frames are loaded. The Fetcher may be designed to wait to be notified by each of the framed documents that it has completed loading (using the techniques described above) before beginning to download files. For example, if web pages A and B are displayed simultaneously in separate frames, the onLoad() event handler in page A can notify an instance of the Fetcher in page B when page A has completed loading.

Sometimes, the user may, while the Fetcher is downloading, load a second page that includes a separate instance of the Fetcher. In this case, the Fetcher can be deactivated (as described above) when the user clicks the link. When the newly downloaded page activates its instance of the Fetcher (i.e. when the new pages is fully loaded), the new instance is able to access the state of the previous instance (which is stored in static variables) and communicate with its download thread. The new instance directs the download thread to continue processing where the prior instance left off, enqueueing the files it is tasked with downloading behind those already being downloaded by the prior instance.

Once the Fetcher downloads content, it may be accessed by other web client applications. This may be done in a variety of ways. For example, a separate applet can obtain pointers to the Fetcher's download buffers using well-known inter-applet communication techniques. Alternatively, a browser scripting language such as JavaScript or VBScript can invoke a method in the Fetcher applet to obtain the downloaded data. The data can then be transferred to a plugin or other web client application. However, direct content transfer is not necessary to obtain a benefit. The Fetcher employs HTTP for downloads (e.g. using a Java URLConnection), so the downloads are cached by the web browser. When the downloads are complete, the user can browse the new content with low latency because the content is in the browser cache. Other web client applications that employ HTTP (such as applets or plugins) can also access the cached data with low latency.

Figure 42:
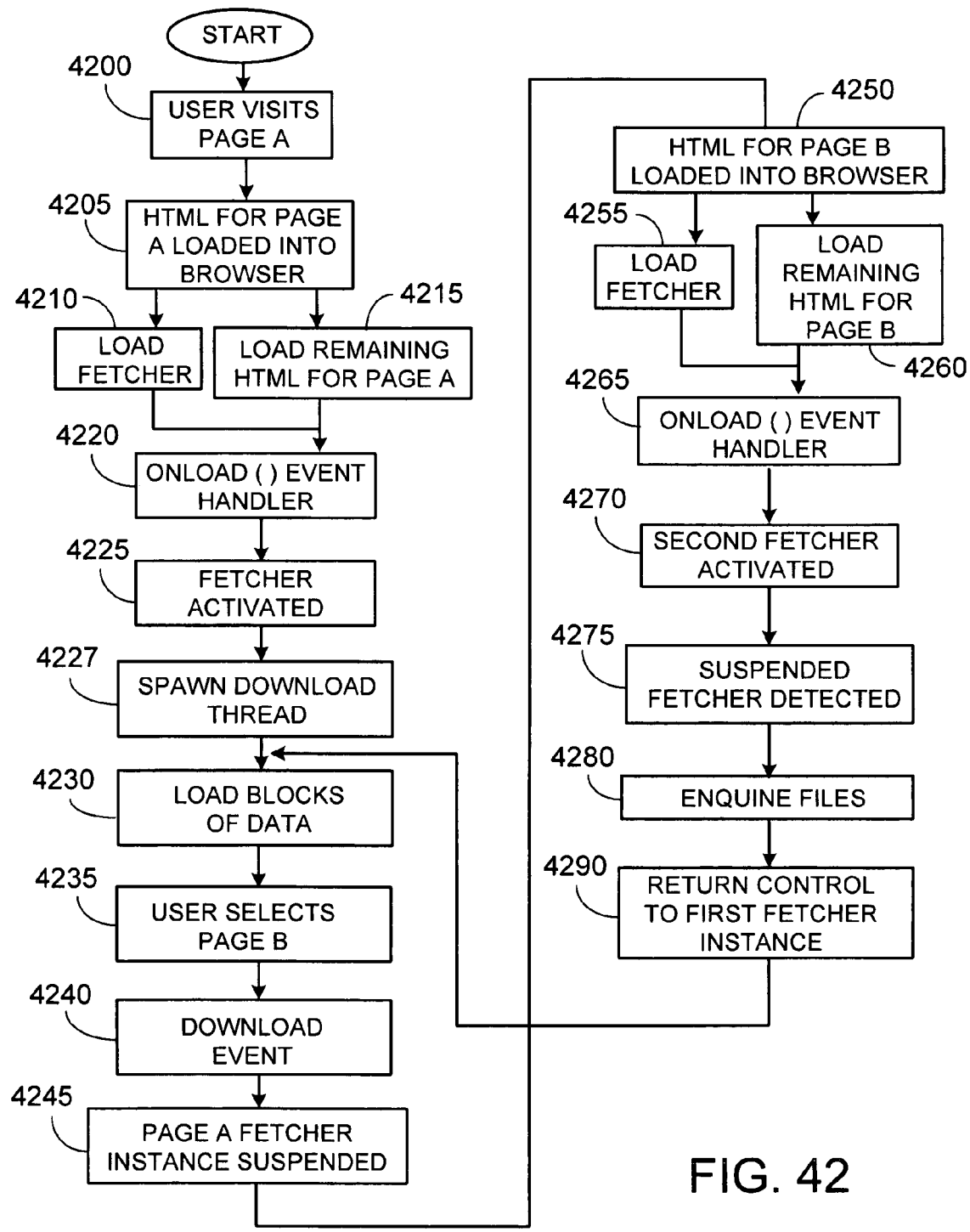

Referring now to FIG. 42, an example operation of the Fetcher applet will be described, in which a user visits a web page "A" containing an instance of the Fetcher applet, and then clicks a link to a web page "B" containing another instance of the Fetcher.

First, the user visits page A (e.g. by clicking a link to it) (step 4200). This causes the HTML for page A to be loaded into the user's web browser (step 4205). As the browser interprets the downloaded HTML code, it encounters a command to load the Fetcher applet, which it does (step 4210). As the Fetcher begins to execute, the remaining images and imbedded content in the HTML code are downloaded (step 4215). When the downloading process for page A is complete, the browser executes the onLoad() event handler for page A (step 4220). This causes the Fetcher applet to activate (step 4225). The applet enqueues the content it is responsible for downloading, and spawns a download thread (step 4227). The download thread operates by downloading successive blocks of data from a server (based on what is in the queue) until download is complete, or until its deactivation method is executed (step 4230).

In this example, the user clicks on a link to page B before step 4230 is completed (step 4235). This causes the onUnload() event handler for page A to execute (step 4240), which results in the deactivation method for the page A Fetcher instance being executed, and the page A Fetcher instance being suspended (step 4245). Now the HTML for page B downloads (step 4250), and a second instance of the Fetcher is loaded (step 4255). The remaining images and other embedded content of page B are download (step 4260), after which the onLoad() event handler for page B executes (step 4265). This causes the second instance of the Fetcher to be activated (step 4270). This second instance determines that a suspended instance of the Fetcher already exists (step 4275). So it enqueues the files it is responsible for loading (step 4280), and returns control to the download thread of the page A Fetcher instance at step 4230 (step 4290).

The embodiment of the Fetcher described above uses a scriptable activation/deactivation mechanism to avoid adversely impacting user browsing activity. Alternatively the Fetcher may monitor download throughput to detect user browsing activity and reduces its download activity accordingly. The Fetcher monitors download throughput by downloading content in moderately sized chunks (e.g. one to four kilobytes). The time required to download each chunk is repeatedly measured and compared to previous measurements to determine the "maximum throughput" and the "current throughput". Several downloading strategies can be employed:

Downloads can always proceed at a fixed percentage of the estimated maximum throughput. This has the advantage of limiting impact on user browsing activity, but it has the disadvantage that network bandwidth is not fully utilized when the user is idle.

If the current throughput is less than the maximum throughput, it is likely that user browsing activity is occurring. Downloading can be largely suspended (or reduced to a very low rate) until current throughput rises to match the maximum throughput, indicating cessation of user browsing activity. Chunks must be downloaded occasionally to continue measuring current throughput, of course.

If user browsing activity is suspected, download activity can be reduced but not completely suspended. This strategy is more robust, since a drop in throughput might not be due to user browsing activity (e.g. it could indicate network congestion).

This alternative embodiment can advantageously dynamically adapt to any kind of network usage, for example network usage that occurs outside the web browser (e.g., file transfers using an FTP client or Napster).

Alternatively, the Fetcher applet may accurately measure network usage using low-level operating system calls. For example, in Windows it is possible to determine modem throughput precisely by reading the value of a certain key in the Windows Registry. Such system calls can be accomplished if the Fetcher is implemented as a browser plugin (such as an ActiveX content handler), an authenticated applet, or an authenticated .NET application. Such an implementation is appropriate for web sites whose users are accustomed to downloading and installing browser plugins or authenticated code.

When such an embodiment of the Fetcher is first encountered, the user is required to install it or grant certain permissions. Subsequently the Fetcher operates in the same manner as the first alternative embodiment, except that maximum and current network throughput are precisely measure by invoking low-level system calls, rather than being estimated. This permits more accurate and timely detection of user-initiated downloads, leading to less adverse impact on user browsing activity.

E. Alternative Embodiment: Browser Plugin

Persons skilled in the art can readily adapt streaming native code for use in browser plugins (including ActiveX components and .NET applications). Browser plugins, such as the Flash and QuickTime players, are applications that can be directly embedded in a web page using <OBJECT> or <EMBED> tags. When such a tag is encountered, the browser checks whether the referenced plugin has previously been installed. If not, the code is downloaded and the user is prompted for permission to install it (or installs it manually by running the downloaded code). Browser plugins are usually designed to act as content handlers, and often employ data streaming to begin displaying content before it has fully downloaded. Streaming native code offers several benefits for plugin applications, including the following:

The initial plugin download can be quite small, reducing user perceived latency. Additional plugin code can be streamed as needed.

Data streams for some plugins, such as Flash and Shockwave, can include program scripts. These scripts must be interpreted or compiled after download, which can impose a severe performance penalty. Streaming native code permits such scripts to be compiled to native code before being delivered to the end user, which can yield better performance.

F. Other Embodiments: Non Web Based Applications

Persons skilled in the art can also adapt streaming native code for use in non-Web-based applications. For example, a standalone executable can download and dynamically link with native code libraries. Using the techniques described herein, a computer or console game could download newly released game levels from a server, allowing the user to play earlier levels while later levels are downloaded in the background. Other embodiments include streaming media players in which native code is treated as a media type.

G. Streaming Coordination

As previously mentioned, the embodiments described herein may be advantageously used for interactive-content delivery on the web and broadband media platforms. Therefore, it is desirable for streaming code execution to coordinate with the download process to make the user's experience of the code execution as seamless as possible. In particular, such coordination permits the native code to adapt its behavior to the progress of the streaming downloads. For example, an interactive entertainment system that uses streaming native code can shorten or prolong early portions of the experience based on the streaming rate of successive portions.

We shall now describe an exemplary streaming coordination mechanisms, followed by a detailed example illustrating execution control mechanisms and dynamic adaptation mechanisms for streaming native code.

As illustrated in FIG. 41, component availability messages are relayed from the Launch applet to the Play applet to the Entry component. The Entry component records information on component availability and makes it available to other native code components. This state is used to control dynamic linking; for example, the Entry component avoids dynamically linking with additional native code components until they have fully downloaded, and additional components similarly avoid dynamically linking with libraries that are still being streamed.

The executing native code may also use this information to adjust its behavior. For example, in a preferred embodiment, component availability information may be used to control the user's movement through a virtual theme park. In particular, a component might contain the code for executing an activity in a particular room, and while that component has not been downloaded, the entrance to that room is be represented by a closed door. During this time, the user interface does not allow the user to go through this door, and therefore the body of code for the activity beyond the door is not invoked. When streaming of that component completes, the new code is linked with the executing code, the drawing of the door is replaced with an open door, and the UI is instructed to allow the user to go through the door. Whenever the user chooses to go through the door, the newly streamed code executes to present the new activity.

In addition, component download progress messages may be relayed from the Launch applet to the Play applet to the Entry component, and this process information recorded and made available to other components in much the same manner as component availability information.

In the preferred embodiment, this information, both component availability and download progress, may be further conveyed to characters in an interactive on-screen world created by the downloaded native code, which adapt their interactive behavior based on it. The information is made available to the characters using sensors in the interactive character system.

Figure 43:
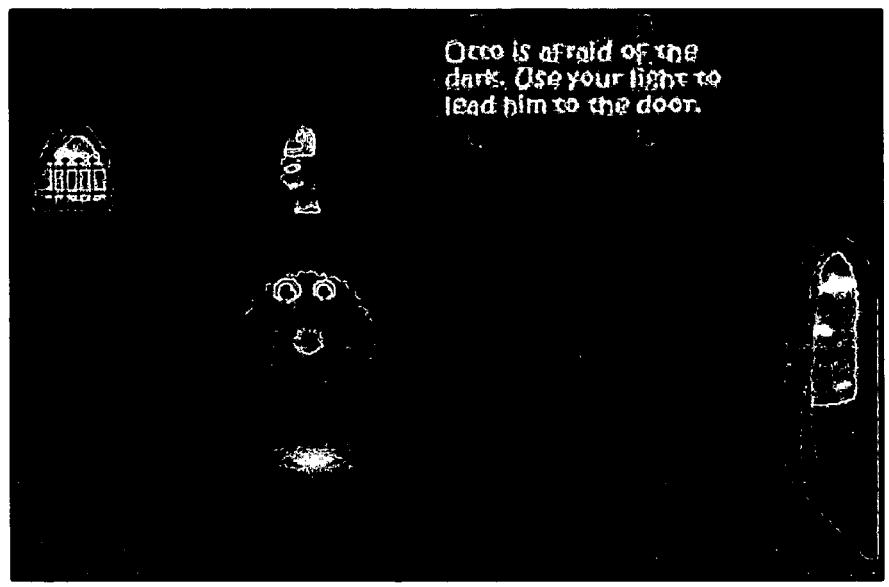
FIGS. 43-44 show screen images of an exemplary interactive character in a simulated world.
Figure 44:

Both FIG. 43 and FIG. 44 show an example of scene from an on-screen world in which characters may adapt their behavior in response to download progress. In this scene, the user helps a frightened character representing a Peanut Butter Cup find his way out of a dark room by shining a flashlight to lead the way. An image from an execution of this scene is shown in FIG. 43. In another embodiment, the user helps a frightened character named Otto find his way out of a dark room by shining a flashlight to lead the way. An image from an execution of this scene is shown in FIG. 44.

This scene is implemented as a native code component that adapts its behavior to the download progress of the next component. Otto permits himself to be led partway to the exit, but he refuses to proceed beyond a distance proportional to the percentage of the next component that has currently downloaded. When the user attempts to lead him beyond that point, Otto directs the audio system to play the sound effect of a mouse squeaking, to which he then fearfully reacts, either freezing or retreating to a distant corner of the room. In this way the user is challenged to continue playing with Otto until the next scene is available, yet the user is unaware that he is being forced to wait. When the next component is available, Otto permits the user to lead him all the way to the exit, seizing the initiative if necessary to move the experience forward.

X. Application: Animating a Product for Advertising Purposes

One particular application of the above described interactive character display system is use of the system for displaying advertising to a user. In particular, the system may be used to present an interactive character to a user that is in the form of a particular product to be advertised, for example a piece of candy. Because the system permits creation of such a character that is fully autonomous, highly reactive, highly expressive and has a specified personality, as well as appearing to be intelligent, appearing to have common sense, appearing to have social knowledge, and appearing to have knowledge of social norms, users may be much more willing to spend time interacting with such a character than with other types of interactive advertising media. Moreover, the user may develop emotional responses to the character (i.e., in response to the character's own emotionality with respect to the user) that may create goodwill and positive associations in the user.

For example, a user may be browsing a web page dedicated to a particular commercial product. During the user's interaction with the web page, the web server may cause software for an interactive character display system to be seamlessly downloaded without noticeable delay onto the user's personal computer using the downloading and streaming code techniques described above. The software may display a simulated world to the user including the aforementioned interactive and autonomous animated product. The user may, e.g., play games with the product, or have other types of interactions with the product that are interesting or enjoyable to the user. The interactive character may track the motion of the user's avatar with its eyes, and may respond to user behaviors in the environment.

Alternatively, the interactive product character could be represented as a robot, e.g., at a shopping mall, that interacted with real-world users in a similar fashion.

XI. Summary, Ramifications and Scope

Although the above description includes many specificities, these should not be construed as limitations on the scope of the invention, but merely as illustrations of some of the presently preferred embodiments. Many other embodiments of the invention are possible. For example, in alternative embodiments, characters are embodied in alternative media such as computer graphics, virtual reality, audio, video, film, or text. For simplicity of understanding, the preferred embodiments include only a specific number of characters. However, it is obvious that many more characters may be implemented in alternative embodiments.

It is also anticipated that characters will be represented as realistic or cartoonish human beings, animals, robots, or fantasy creatures. Additionally, the system of the invention may be adapted to interact with users via various input/output devices, such as a joystick, mouse, keyboard, speech understanding system, speech production system, vision system, motion capture system, display monitor, or data glove.

The preferred embodiment includes one user interface for controlling a single user avatar. In alternative embodiments, there may be multiple user avatars, and each avatar may be directed through more than one interface. Each user interface may also be usable to control more than one avatar. In addition, a user interface may be utilized to provide inputs directly to the minds of one or more characters. For example, a user interface could be utilized to directly control the emotional state of the character. The invention also supports characters that do not interact with a user avatar at all. For example, a character may be directed through an abstract script stored in memory. Alternatively, multiple characters may interact with each.

The preferred embodiment includes a particular animation techniques for animating the characters. However, these techniques may be replaced by any animation system that executes acts generated by character minds and provides Sensory information to the character minds. In addition, embodiments of the present invention may include systems that utilize multiple animation techniques.

The present invention may be implemented on a variety of hardware platforms and configurations. For example, the system of the invention may be implemented on a single standalone computer. In embodiments that include multiple computers communicating over a network, the different elements of the system, e.g., the character minds, the MSM, and the user interface, may be distributed among these computers in any way that allows each client application to communicate with the other client applications. Additionally, the present invention supports other communication paradigms between applications including network protocols, such as TCP/IP, and inter-application communication methods, such as OLE.

Each character mind has a set of constructs that it uses to generate, evaluate, and execute behaviors. In the preferred embodiment, these constructs include an ABT for representing pending behaviors, goals, and acts, and a Behavior Library that is a set of behaviors used to achieve goals, and a Working Memory that is a repository of data that is used to store elements of the state of the character mind. However, the present invention is not limited to these constructs or techniques. Many alternative constructs may be used to generate, evaluate, and execute behaviors.

These alternative constructs include, but are not limited to: static tree structures, dynamic tree structures which are modifiable at run time; representations of pending behaviors other than a tree; any interpreted or compiled programming language to implement scripts; any finite state machine or set of finite state machines to represent behavioral states; other constructs for representing interacts between characters, such as state machines with parameterized states, sets of state variables and preconditions defined on the variables, push down automata, or Turing machines.

Other constructs that may be utilized with the present invention are described in the following publications that are hereby incorporated by reference:

Jim Blythe and W. Scott Reilly. "Integrating reactive and deliberative planning for agents." Technical Report CMU-CS-93-135, School of Computer Science, Carnegie Mellon University, May 1993.

Phoebe Sengers. "Anti-boxology: agent design in cultural context." Ph.D. Thesis. Technical Report CMU-CS-98-151. School of Computer Science, Carnegie Mellon University, Pittsburgh, Pa. 1998.

A. Bryan Loyall and Joseph Bates. "Personality-Rich Believable Agents That Use Language", Proceedings of the First International Conference on Autonomous Agents, February 1997, Marina del Rey, Calif.

A. Bryan Loyall. "Some Requirements and Approaches for Natural Language in a Believable Agent", Lecture Notes in Artificial Intelligence, Creating Personalities for Synthetic Actors, Towards Autonomous Personality Agents, Springer-Verlag, New York, 1997

Paul Boersma (1993): "Accurate short-term analysis of the fundamental frequency and the harmonics-to-noise ratio of a sampled sound", Proceedings of the Institute of Phonetic Sciences of the University of Amsterdam 17: 97-110.

Jaime G. Carbonell, Jim Blythe, Oren Etzioni, Yolanda Gil, Robert Joseph, Dan Kahn, Craig Knoblock, Steven Minton, Alicia Perez, Scott Reilly, Manuela Veloso, and Mei Wang. "PRODIGY4.0: The manual and tutorial." Technical Report CMU-CS-92-150, School of Computer Science, Carnegie Mellon University, June 1992.

A. Bryan Loyall and Joseph Bates. "Real-time Control of Animated Broad Agents", Proceedings of the Fifteenth Annual Conference of the Cognitive Science Society, Boulder, Colo., June 1993.

Ken Perlin. "Real Time Responsive Animation with Personality", IEEE Transactions on Visualization and Computer Graphics; Vol 1 No. 1.

Ken Perlin and Athomas Goldberg. "Improv: A System for Scripting Interactive Actors in Virtual Worlds", Computer Graphics; Vol. 29 No. 3.

Ken Perlin. "Layered Compositing of Facial Expression", ACM SIGGRAPH 97 Technical Sketch.

Allen Newell. Unified Theories of Cognition. Harvard University Press. Cambridge, Mass. 1990.

Rosenbloom, P. S., Laird, J. E. & Newell, A. (Eds.). (1993). The Soar Papers: Research on Integrated Intelligence (Volumes One and Two). Cambridge, Mass.: MIT Press.

Tambe, M., Jones, R., Laird, J. E., Rosenbloom, P. S., and Schwamb, K., 1994 Building believable agents for simulation environments: Extended Abstract In AAAI Spring Symposium on "Believable Agents".

Hill, R., Chen, J., Gratch, J., Rosenbloom, P., and Tambe, M., 1997. Intelligent agents for the synthetic battlefield: A company of rotary wing aircraft. Innovative Applications of Artificial Intelligence (IAAI-97)

Blumberg, Bruce (1996). Old Tricks, New Dogs: Ethology and Interactive Creatures. PhD Dissertation. MIT Media Lab.

Blumberg, B. and T. Galyean (1995). Multi-level Direction of Autonomous Creatures for Real-Time Virtual Environments. In: Proceedings of SIGGRAPH 95.

F. Sebastian Grassia Believable Automatically Synthesized Motion by Knowledge-Enhanced Motion Transformation. Ph.D. Thesis. Technical Report CMU-CS-00-163, School of Computer Science, Carnegie Mellon University, Pittsburgh, Pa. 2000.

Zoran Popovic. Motion Transformation by Physically Based Spacetime Optimization. Ph.D. Thesis. Technical Report CMU-CS-99-106, School of Computer Science, Carnegie Mellon University, Pittsburgh, Pa. 1999.

Charles Rose, Michael F. Cohen and Bobby Bodenheimer. "Verbs and Adverbs: Multidimensional Motion Interpolation", IEEE Computer Graphics & Applications, 18(5), pp. 3240 (September-October 1998)

Janet E. Cahn. Generating Expression in Synthesized Speech. Master's Thesis, Massachusetts Institute of Technology. May 1989.

Janet E. Cahn. A Computational Memory and Processing Model for Prosody. Doctoral dissertation. Massachusetts Institute of Technology. October 1998.

Breazeal, C. (2000), "Sociable Machines: Expressive Social Exchange Between Humans and Robots", Doctoral Dissertation. Massachusetts Institute of Technology Department of Electrical Engineering and Computer Science.

Petros Faloutsos, Michiel van de Panne and Demetri Terzopoulos "Composable Controllers for Physics-based Character Animation". Proceedings of ACM SIGGRAPH 2001, Los Angeles, August 2001.

It will become apparent to those skilled in the art (in view of the present specification) that the present invention can be usefully employed in a great variety of applications, including but not limited to the following categories of applications: computer, video, and on-line games; software toys; interactive mechanical (robot) toys; educational software; on-line social environments and virtual worlds; interactive stories; other forms of interactive entertainment; simulated training environments; interactive theme park and museum exhibits; user interfaces and help systems; computer-based, on-line, or web-based company representatives, including marketing, customer service, or sales representatives; interactive web tour guides; and interactive personal assistants.

Therefore, the scope of the invention should be determined not by the examples given, but by the appended claims and their legal equivalents.

What is claimed is:

1. A method for controlling the voice of a synthetic character, which is autonomous and interacts with others in a shared environment, comprising:

providing speech data corresponding to at least a part of an intended communication generated by the character;

creating modified speech data by modifying, by an automatically determined amount, at least one of the pitch or duration of at least a portion of the speech data;

generating speech sounds associated with the character using the modified speech data; and associating a representation of an emotional state with the character; and wherein creating modified speech data comprises modifying the speech data based on the emotional state representation and wherein the emotional state representation is determined at least in part by interaction of the character with others in a shared environment.

2. A method for controlling the voice of a synthetic character that is autonomous and interacts with others in a shared environment, such character having an associated mental state that changes over time at least in part as a function of said mental state, said mental state comprising a dynamic perceptual state that depends on said shared environment, said shared environment including the entities with which the character is interacting, and an action state defining actions to be taken by the character, the method comprising:

providing speech data corresponding to at least a part of an intended communication generated by the character;

creating modified speech data by modifying, by an automatically determined amount, at least one of the pitch or duration of at least a portion of the speech data, such modification based at least in part on at least a portion of said mental state; and generating speech sounds associated with the character using the modified speech data;

wherein the mental state is determined at least in part by interaction of the character with others in a shared environment.

3. The method of claim 2 wherein said modification of pitch or duration is performed at least in part using the Synchronous Overlap and Add class of techniques.

4. The method of claim 2 wherein said interactive synthetic character is displayed within an interactive entertainment product.

5. The method of claim 2 wherein said mental state further comprises a defined emotional state.

6. The method of claim 5 wherein said modification of pitch or duration is based at least in part on the degree of intensity of said defined emotional state.

7. The method of claim 5 wherein said modification of pitch or duration is performed at least in part using the Synchronous Overlap and Add class of techniques.

8. The method of claim 2 wherein said mental state further comprises a defined motivational or goal state.

9. The method of claim 8 wherein said modification of pitch or duration is performed at least in part using the Synchronous Overlap and Add class of techniques.

10. The method of claim 8 wherein said mental state further comprises a defined emotional state.

11. The method of claim 10 wherein said modification of pitch or duration is based at least in part on the degree of intensity of said defined emotional state.

12. The method of claim 11 further comprising changing said emotional state in response to a failure or success of a motivation or goal present in said motivational or goal state.

13. The method of claim 8 wherein said motivation or goal state comprises a plurality of goals and subgoals or motivations and submotivations ordered at least in part in a hierarchical relationship.

14. The method of claim 13 wherein said mental state further comprises a defined emotional state.

15. The method of claim 14 wherein said modification of pitch or duration is based at least in part on the degree of intensity of said defined emotional state.

16. The method of claim 15 further comprising changing said emotional state in response to a failure or success of a motivation or goal present in said motivational or goal state.

17. The method of claim 2, wherein said speech sounds have a natural quality such as might be displayed by a living animal or person.

18. The method of claim 17, wherein said speech sounds are generated in coordination with movement of said synthetic character so that said coordination has a natural quality such as might be displayed by a living animal, person, or imaginary living creature.

19. The method of claim 18 wherein said interactive synthetic character is displayed within an interactive entertainment product.

20. The method of claim 18 wherein said mental state further comprises a defined emotional state.

21. The method of claim 20 wherein said modification of pitch or duration is based at least in part on the degree of intensity of said defined emotional state.

22. The method of claim 20 wherein said modification of pitch or duration is performed at least in part using the Synchronous Overlap and Add class of techniques.

23. The method of claim 18 wherein said mental state further comprises a defined motivational or goal state.

24. The method of claim 23 wherein said modification of pitch or duration is performed at least in part using the Synchronous Overlap and Add class of techniques.

25. The method of claim 23 wherein said mental state further comprises a defined emotional state.

26. The method of claim 25 wherein said modification of pitch or duration is based at least in part on the degree of intensity of said defined emotional state.

27. The method of claim 26 further comprising changing said emotional state in response to a failure or success of a motivation or goal present in said motivational or goal state.

28. The method of claim 23 wherein said motivation or goal state comprises a plurality of goals and subgoals or motivations and submotivations ordered at least in part in a hierarchical relationship.

29. The method of claim 28 wherein said mental state further comprises a defined emotional state.

30. The method of claim 29 wherein said modification of pitch or duration is based at least in part on the degree of intensity of said defined emotional state.

31. The method of claim 30 further comprising changing said emotional state in response to a failure or success of a motivation or goal present in said motivational or goal state.

32. The method of claim 18 wherein said modification of pitch or duration is performed at least in part using the Synchronous Overlap and Add class of techniques.

33. A method for controlling the voice of a synthetic character, which is autonomous and interacts with others in a shared environment, comprising:
   providing speech data corresponding to at least a part of an intended communication generated by the character;
   creating modified speech data by modifying, by an automatically determined amount, at least one of the pitch or duration of at least a portion of the speech data; and
   generating speech sounds associated with the character using the modified speech data; wherein the character has a specified personality; and
   wherein the automatically determined amount is determined, at least in part, by a state of the character that depends, at least in part, on interaction of the character with others in the shared environment.

34. A method for controlling the voice of a synthetic character, which is autonomous and interacts with others in a shared environment, comprising:
   providing speech data corresponding to at least a part of an intended communication generated by the character;
   creating modified speech data by modifying, by an automatically determined amount, at least one of the pitch or duration of at least a portion of the speech data; and
   generating speech sounds associated with the character using the modified speech data; wherein the character is highly expressive, highly reactive and has a specified personality
   wherein the automatically determined amount is determined, at least in part, by a state of the character that depends, at least in part, on interaction of the character with others in the shared environment.

35. A method for controlling the voice of a synthetic character, which is autonomous and interacts with others in a shared environment, comprising:
   providing speech data corresponding to at least a part of an intended communication generated by the character;
   creating modified speech data by modifying, by an automatically determined amount, at least one of the pitch or duration of at least a portion of the speech data; and
   generating speech sounds associated with the character using the modified speech data, wherein the character is highly reactive and has at least one of the following group of characteristics: highly expressive, appearing to be intelligent, exhibiting common sense, exhibiting social knowledge, exhibiting knowledge of social norms, having a specified personality wherein the automatically determined amount is determined, at least in part, by a state of the character that depends, at least in part, on interaction of the character with others in the shared environment.

36. A computer readable medium encoding computer readable instructions for controlling the voice of a synthetic character, which is autonomous and interacts with others in a shared environment, that cause a processor to perform steps comprising:

providing speech data corresponding to at least a part of an intended communication generated by the character;

creating modified speech data by modifying, by an automatically determined amount, at least one of the pitch or duration of at least a portion of the speech data; and associating a representation of an emotional state with the character; and wherein the instructions for creating modified speech data comprise instructions for modifying the speech data based on the emotional state representation and wherein the emotional state representation is determined at least in part by interaction of the character with others in a shared environment.

37. A computer readable medium encoding computer readable instructions for controlling the voice of a synthetic character, which is autonomous and interacts with others in a shared environment, that cause a processor to perform steps comprising:

providing speech data corresponding to at least a part of an intended communication generated by the character;

creating modified speech data by modifying, by an automatically determined amount, at least one of the pitch or duration of at least a portion of the speech data; and generating speech sounds associated with the character using the modified speech data, wherein the character is highly expressive wherein the automatically determined amount is determined, at least in part, by a state of the character that depends, at least in part, on interaction of the character with others in the shared environment.

38. A computer readable medium encoding computer readable instructions for controlling a synthetic character that is autonomous and interacts with others in a shared environment, such character having an associated mental state that changes over time at least in part as a function of said mental state, said mental state comprising a dynamic perceptual state that depends on said shared environment, said shared environment including the entities with which the character is interacting, and an action state defining actions to be taken by the character, that cause a processor to perform steps comprising:

providing speech data corresponding to at least a part of an intended communication generated by the character;

creating modified speech data by modifying, by an automatically determined amount, at least one of the pitch or duration of at least a portion of the speech data, such modification based at least in part on at least a portion of said mental state; and generating speech sounds associated with the character using the modified speech data wherein the mental state is determined at least in part by interaction of the character with others in a shared environment.

39. The computer readable medium of claim 38 wherein said modification of pitch or duration is performed at least in part using the Synchronous Overlap and Add class of techniques.

40. The computer readable medium of claim 38 wherein said interactive synthetic character is displayed within an interactive entertainment product.

41. The computer readable medium of claim 38 wherein said mental state further comprises a defined emotional state.

42. The computer readable medium of claim 41 wherein said modification of pitch or duration is based at least in part on the degree of intensity of said defined emotional state.

43. The computer readable medium of claim 41 wherein said modification of pitch or duration is performed at least in part using the Synchronous Overlap and Add class of techniques.

44. The computer readable medium of claim 38 wherein said mental state further comprises a defined motivational or goal state.

45. The computer readable medium of claim 44 wherein said modification of pitch or duration is performed at least in part using the Synchronous Overlap and Add class of techniques.

46. The computer readable medium of claim 44 wherein said mental state further comprises a defined emotional state.

47. The computer readable medium of claim 46 wherein said modification of pitch or duration is based at least in part on the degree of intensity of said defined emotional state.

48. The computer readable medium of claim 47 further comprising instructions that cause a processor to perform the step of changing said emotional state in response to a failure or success of a motivation or goal present in said motivational or goal state.

49. The computer readable medium of claim 44 wherein said motivation or goal state comprises a plurality of goals and subgoals or motivations and submotivations ordered at least in part in a hierarchical relationship.

50. The computer readable medium of claim 49 wherein said mental state further comprises a defined emotional state.

51. The computer readable medium of claim 50 wherein said modification of pitch or duration is based at least in part on the degree of intensity of said defined emotional state.

52. The computer readable medium of claim 51 further comprising instructions that cause a processor to perform the step of changing said emotional state in response to a failure or success of a motivation or goal present in said motivational or goal state.

53. The computer readable medium of claim 38, wherein said speech sounds have a natural quality such as might be displayed by a living animal or person.

54. The computer readable medium of claim 53, wherein generating said speech sounds comprises generating said speech sounds in coordination with movement of said synthetic character so that said coordination has a natural quality such as might be displayed by a living animal, person, or imaginary living creature.

55. The computer readable medium of claim 54 wherein said modification of pitch or duration is performed at least in part using the Synchronous Overlap and Add class of techniques.

56. The computer readable medium of claim 54 wherein said interactive synthetic character is displayed within an interactive entertainment product.

57. The computer readable medium of claim 54 wherein said mental state further comprises a defined emotional state.

58. The computer readable medium of claim 57 wherein said modification of pitch or duration is based at least in part on the degree of intensity of said defined emotional state.

59. The computer readable medium of claim 57 wherein said modification of pitch or duration is performed at least in part using the Synchronous Overlap and Add class of techniques.

60. The computer readable medium of claim 54 wherein said mental state further comprises a defined motivational or goal state.

61. The computer readable medium of claim 60 wherein said modification of pitch or duration is performed at least in part using the Synchronous Overlap and Add class of techniques.

62. The computer readable medium of claim 60 wherein said mental state further comprises a defined emotional state.

63. The computer readable medium of claim 62 wherein said modification of pitch or duration is based at least in part on the degree of intensity of said defined emotional state.

64. The computer readable medium of claim 63 further comprising instructions that cause a processor to perform the step of changing said emotional state in response to a failure or success of a motivation or goal present in said motivational or goal state.

65. The computer readable medium of claim 60 wherein said motivation or goal state comprises a plurality of goals and subgoals or motivations and submotivations ordered at least in part in a hierarchical relationship.

66. The computer readable medium of claim 65 wherein said mental state further comprises a defined emotional state.

67. The computer readable medium of claim 66 wherein said modification of pitch or duration is based at least in part on the degree of intensity of said defined emotional state.

68. The computer readable medium of claim 67 further comprising instructions for changing said emotional state in response to a failure or success of a motivation or goal present in said motivational or goal state.

69. A computer readable medium encoding computer readable instructions for controlling the voice of a synthetic character, which is autonomous and interacts with others in a shared environment, that cause a processor to perform steps comprising:
providing speech data corresponding to at least a part of an intended communication generated by the character;
creating modified speech data by modifying, by an automatically determined amount, at least one of the pitch or duration of at least a portion of the speech data; and
generating speech sounds associated with the character using the modified speech data;
wherein the character has a specified personality; and
wherein the automatically determined amount is determined, at least in part, by a state of the character that depends, at least in part, on interaction of the character with others in the shared environment.

70. A computer readable medium encoding computer readable instructions for controlling the voice of a synthetic character, which is autonomous and interacts with others in a shared environment, that cause a processor to perform steps comprising:
providing speech data corresponding to at least a part of an intended communication generated by the character;
creating modified speech data by modifying, by an automatically determined amount, at least one of the pitch or duration of at least a portion of the speech data; and
generating speech sounds associated with the character using the modified speech data;
wherein the character is highly expressive, highly reactive and has a specified personality; and
wherein the automatically determined amount is determined, at least in part, by a state of the character that depends, at least in part, on interaction of the character with others in the shared environment.

71. A computer readable medium encoding computer readable instructions for controlling the voice of a synthetic character, which is autonomous and interacts with others in a shared environment, that cause a processor to perform steps comprising:
providing speech data corresponding to at least a part of an intended communication generated by the character;
creating modified speech data by modifying, by an automatically determined amount, at least one of the pitch or duration of at least a portion of the speech data; and
generating speech sounds associated with the character using the modified speech data, wherein the character is highly reactive and has at least one of the following group of characteristics: highly expressive, appearing to be intelligent, exhibiting common sense, exhibiting social knowledge, exhibiting knowledge of social norms, having a specified personality;
wherein the automatically determined amount is determined, at least in part, by a state of the character that depends, at least in part, on interaction of the character with others in the shared environment.

* * * * *

UNITED STATES PATENT AND TRADEMARK OFFICE
CERTIFICATE OF CORRECTION

PATENT NO. : 7,478,047 B2 Page 1 of 1
APPLICATION NO. : 10/415851
DATED : January 13, 2009
INVENTOR(S) : Loyall et al.

It is certified that error appears in the above-identified patent and that said Letters Patent is hereby corrected as shown below:

Title page, Patent term adjustment should read -- five hundred twenty (520) days. --

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,478,047 B2 Page 1 of 1
APPLICATION NO. : 10/415851
DATED : January 13, 2009
INVENTOR(S) : Loyall et al.

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by 520 days Delete the phrase "by 520 days" and insert -- by 786 days --

Signed and Sealed this

First Day of June, 2010

David J. Kappos
*Director of the United States Patent and Trademark Office*